(12) United States Patent
Ouderkirk et al.

(10) Patent No.: US 11,567,252 B2
(45) Date of Patent: Jan. 31, 2023

(54) POLARIZATION SENSITIVE BEAM SPLITTER

(71) Applicant: META PLATFORMS TECHNOLOGIES, LLC, Menlo Park, CA (US)

(72) Inventors: Andrew John Ouderkirk, Kirkland, WA (US); Tanya Malhotra, Redmond, WA (US); Weichuan Gao, Redmond, WA (US); Ying Geng, Bellevue, WA (US); Babak Amirsolaimani, Remond, WA (US)

(73) Assignee: META PLATFORMS TECHNOLOGIES, LLC, Menlo Park, CA (US)

( * ) Notice: Subject to any disclaimer, the term of this patent is extended or adjusted under 35 U.S.C. 154(b) by 0 days.

(21) Appl. No.: 17/505,368

(22) Filed: Oct. 19, 2021

(65) Prior Publication Data
US 2022/0035158 A1 Feb. 3, 2022

Related U.S. Application Data

(63) Continuation of application No. 16/874,134, filed on May 14, 2020, now Pat. No. 11,150,473.
(Continued)

(51) Int. Cl.
  *G02B 27/01* (2006.01)
  *G02B 5/30* (2006.01)
  (Continued)

(52) U.S. Cl.
  CPC ......... *G02B 5/3025* (2013.01); *G02B 5/3016* (2013.01); *G02B 27/0101* (2013.01);
  (Continued)

(58) Field of Classification Search
  CPC .................................................. G02B 27/0101
  See application file for complete search history.

(56) References Cited

U.S. PATENT DOCUMENTS 6,995,917 B1  2/2006  Sampsell et al.
8,964,298 B2  2/2015  Haddick et al.
(Continued)

OTHER PUBLICATIONS

Non-Final Office Action dated Sep. 19, 2022 for U.S. Appl. No. 16/874,259, filed May 14, 2020, 18 pages.
(Continued)

*Primary Examiner* — Sang V Nguyen
(74) *Attorney, Agent, or Firm* — Morgan, Lewis & Bockius LLP

(57) ABSTRACT

An optical device includes a first polarization selective reflector; a second polarization selective reflector positioned relative to the first polarization selective reflector so that the first polarization selective reflector directs first light having a first nonplanar polarization toward the second polarization selective reflector and the second polarization selective reflector directs at least a portion of the first light toward the first polarization selective reflector as second light. The optical device includes a first reflector positioned relative to the first polarization selective reflector so that the first polarization selective reflector directs at least a portion of the second light having a second nonplanar polarization toward the first reflector as third light.

18 Claims, 24 Drawing Sheets

Related U.S. Application Data

(60) Provisional application No. 62/850,473, filed on May 20, 2019.

(51) Int. Cl.
  *H04N 9/31* (2006.01)
  *G02B 27/28* (2006.01)
  *G03H 1/02* (2006.01)

(52) U.S. Cl.
  CPC ....... *G02B 27/0172* (2013.01); *G02B 27/283* (2013.01); *G03H 1/0248* (2013.01); *H04N 9/3102* (2013.01); *G02B 2027/0178* (2013.01); *G03H 2001/0264* (2013.01)

(56) References Cited

U.S. PATENT DOCUMENTS

| | | | | |
|---|---|---|---|---|
| 10,962,844 | B1* | 3/2021 | Smyth | G02B 26/0808 |
| 11,150,473 | B2 | 10/2021 | Ouderkirk et al. | |
| 2001/0003473 | A1 | 6/2001 | Galabova et al. | |
| 2007/0177275 | A1* | 8/2007 | McGuire | G02B 17/08 |
| | | | | 359/630 |
| 2007/0252954 | A1 | 11/2007 | McGuire, Jr. et al. | |
| 2008/0285129 | A1* | 11/2008 | Magarill | G02B 27/145 |
| | | | | 359/629 |
| 2010/0110386 | A1 | 5/2010 | Handschy et al. | |
| 2011/0273770 | A1* | 11/2011 | Poon | G02B 27/283 |
| | | | | 359/485.03 |
| 2017/0092177 | A1 | 3/2017 | Kobayashi et al. | |
| 2019/0353906 | A1 | 11/2019 | Gollier et al. | |

OTHER PUBLICATIONS

Non-Final Office Action dated Jun. 23, 2022 for U.S. Appl. No. 16/874,099, filed May 14, 2020, 13 pages.
Non-Final Office Action dated Jun. 23, 2022 for U.S. Appl. No. 16/874,115, filed May 14, 2020, 12 pages.
Non-Final Office Action dated Jun. 24, 2022 for U.S. Appl. No. 16/874,265, filed May 14, 2020, 13 pages.
International Search Report and Written Opinion for International Application No. PCT/US2020/033642, dated Oct. 16, 2020, 17 Pages.
Invitation to pay Additional Fees for International Application No. PCT/US2020/033642, dated Aug. 14, 2020, 12 pages.

* cited by examiner

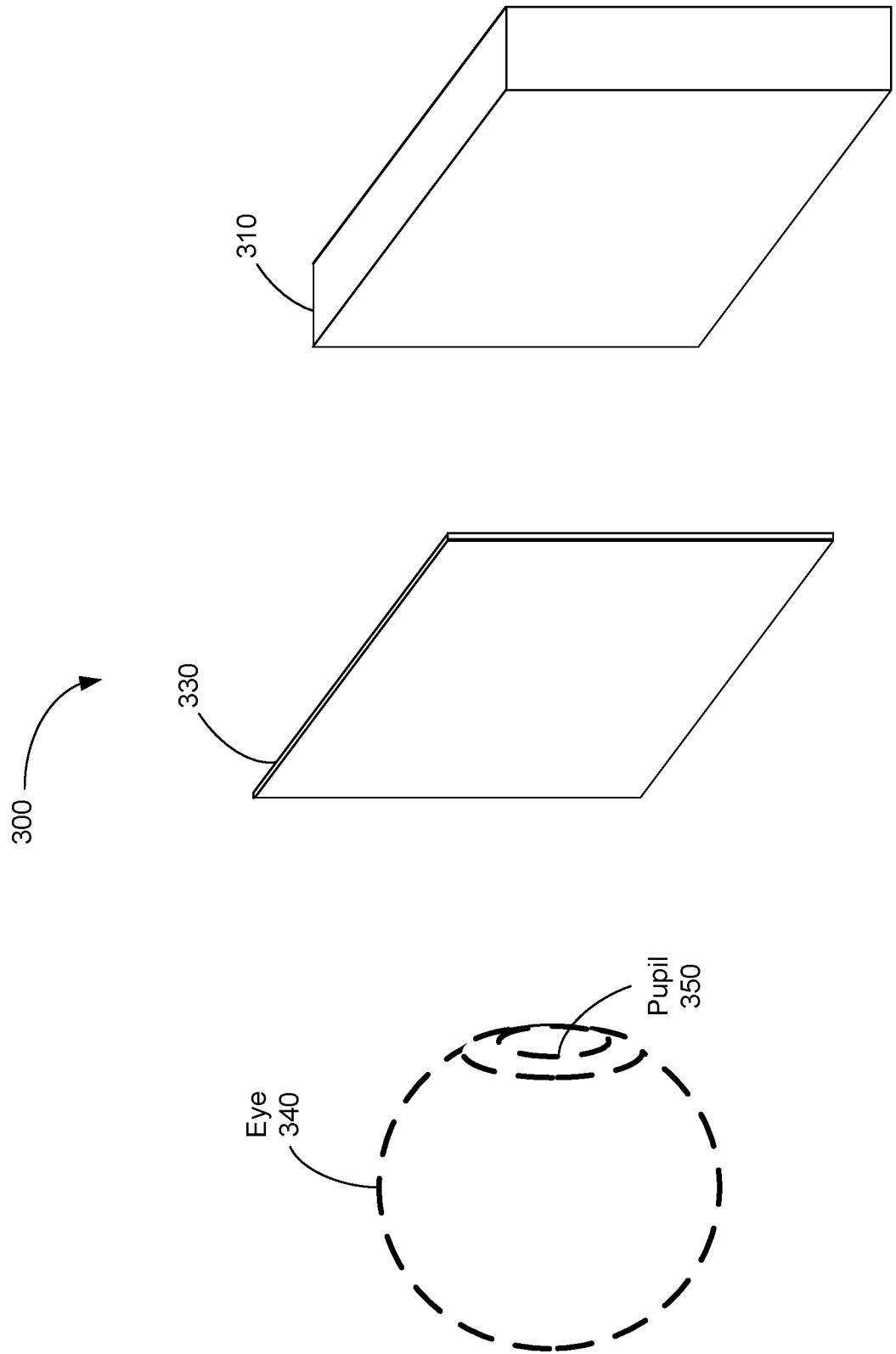

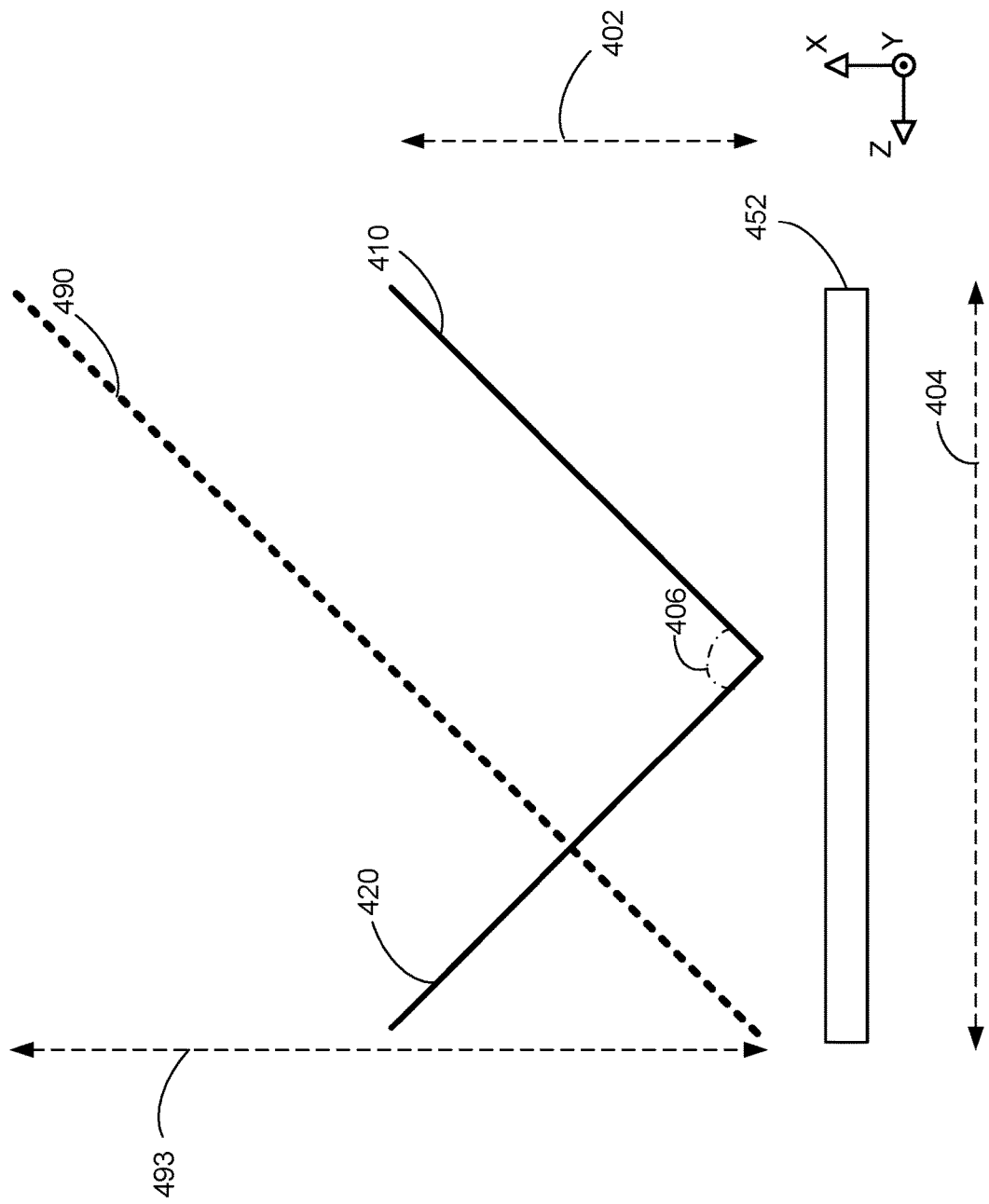

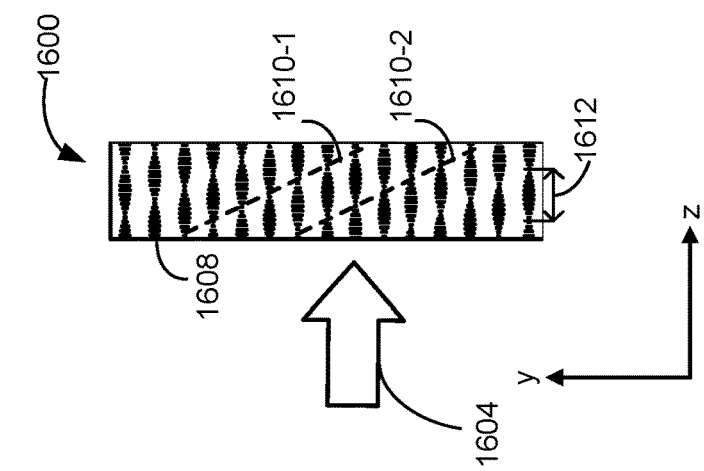
Figure 16C
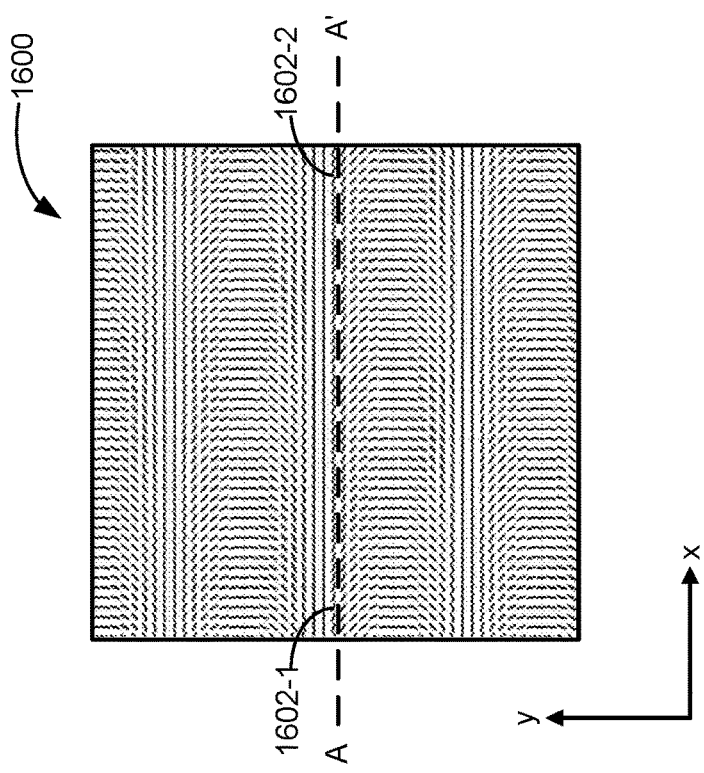
Figure 16B
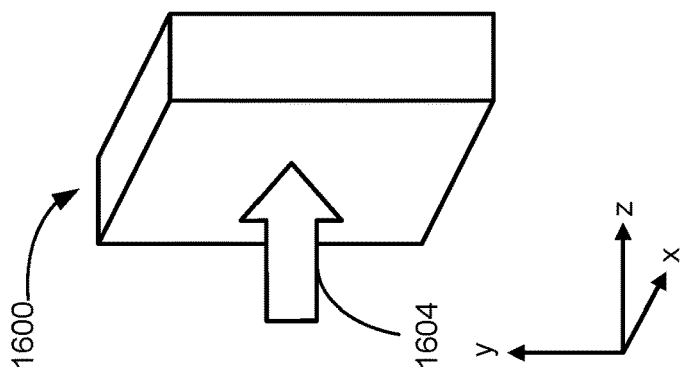
Figure 16A
Figure 16D

POLARIZATION SENSITIVE BEAM SPLITTER

RELATED APPLICATIONS

This application is a continuation application of U.S. patent application Ser. No. 16/874,134, filed May 14, 2020, which claims the benefit of, and priority to, U.S. Provisional Patent Application No. 62/850,473, filed May 20, 2019, both of which are incorporated by reference herein in their entireties. This application is related to U.S. patent application Ser. No. 16/874,099, entitled "Split Prism Illuminator For Spatial Light Modulator," filed May 14, 2020, U.S. patent application Ser. No. 16/874,115, entitled "Compact Spatial Light Modulator Projection System," filed May 14, 2020, U.S. patent application Ser. No. 16/874,259, entitled "Compact Spatial Light Modulator Illumination System," filed May 14, 2020, and U.S. patent application Ser. No. 16/874,265, entitled "Polarizing Beam Splitter Assembly," filed May 14, 2020. All of these applications are incorporated by reference herein in their entireties.

TECHNICAL FIELD

This relates generally to head-mounted display devices, and more specifically to optical components used in head-mounted display devices.

BACKGROUND

Head-mounted display devices (also called herein head-mounted displays) are gaining popularity as means for providing visual information to users.

However, the size and weight of conventional head-mounted display device have limited application of head-mounted display devices.

SUMMARY

Accordingly, there is a need for head-mounted display devices that are more compact and lightweight. Compact head-mounted display devices would also improve user satisfaction with such devices.

The deficiencies and other problems are reduced or eliminated by the disclosed devices, systems, and methods.

In accordance with some embodiments, an optical device includes a first polarization selective reflector positioned in a first orientation so that the first polarization selective reflector receives first light in a first direction, redirects a first portion, of the first light, having a first polarization to a second direction that is non-parallel to the first direction; and receives second light in a third direction and transmit a first portion, of the second light, having a second polarization orthogonal to the first polarization. The optical device includes a second polarization selective reflector positioned in a second orientation non-parallel to the first orientation, and adjacent to the first polarization selective reflector so that the second polarization selective reflector receives third light in a fourth direction; redirects a first portion, of the third light, having the first polarization to a fifth direction that is non-parallel to the fourth direction; and receives fourth light in a sixth direction and transmit a first portion, of the fourth light having the second polarization.

In some embodiments, the second direction is orthogonal to the first direction and the fifth direction is orthogonal to the third direction.

In some embodiments, the first polarization selective reflector is further configured to transmit a second portion, of the first light, having the second polarization; and the second polarization selective reflector is further configured to receive, and transmit, the second portion, of the first light having the second polarization.

In some embodiments, the optical device further includes a third reflector configured to receive from the second polarization selective reflector the second portion of the first light, and redirect the second portion of the first light back to the second polarization selective reflector as the second light.

In some embodiments, the optical device further includes a light source configured to output the first light having the first polarization.

In some embodiments, the optical device further includes an optical integrator configured receive the first light and redirect the first light such that the first light transmitted by the optical integrator has a smaller divergence than the first light incident on the optical integrator. In some embodiments, the optical device further includes a Fresnel reflector optically coupled with the first polarization selective reflector, the Fresnel reflector configured to receive the first light output by the light source and redirect the first light toward the first polarization selective reflector. In some embodiments, the Fresnel reflector is configured to expand a beam size of the first light.

In some embodiments, the optical device further includes a waveplate disposed between the third reflector and the second polarization selective reflector. In some embodiments, the waveplate is configured to convert linearly polarized light to circularly polarized light and to convert circularly polarized light to linearly polarized light (e.g., a quarter-wave plate).

In some embodiments, the first polarization selective reflector is further configured to reflect a second portion, of the second light, having the first polarization in a seventh direction distinct from the third direction; and the second polarization selective reflector is further configured to reflect a second portion, of the fourth light, having the first polarization, in an eighth direction distinct from the sixth direction.

In some embodiments, the optical device further includes a reflective spatial light modulator optically coupled with the first polarization selective reflector and the second polarization selective reflector, the reflective spatial light modulator configured to: receive, on a first region of the reflective spatial light modulator, the first portion of the first light having the first polarization and reflect the first portion of the first light as the second light. The reflective spatial light modulator is also configured to receive, on a second region adjacent to the first region of the reflective spatial light modulator, the first portion of the third light having the first polarization and reflect the first portion of the third light as the fourth light.

In some embodiments, the reflective spatial light modulator includes a reflective surface and a plurality of pixels, a respective pixel in the plurality of pixels having respective modulating elements. In some embodiments, reflecting the first portion of the first light as the second light and reflecting the first portion of the third light as the fourth light includes modulating, by the respective modulating elements, polarization of the first portion of the first light and the first portion of the third light.

In some embodiments, the reflective spatial light modulator is a Liquid Crystal on Silicon (LCoS) display.

In some embodiments, the first polarization selective reflector in the first orientation and the second polarization selective reflector in the second orientation define an angle that is approximately 90 degrees. In some embodiments, the angle is more or less than 90 degrees. The first polarization selective reflector and the second polarization selective reflector are coupled to each other.

In some embodiments, the optical device further includes a prism defining a first facet and a second facet. The first polarization selective reflector is disposed on the first facet and the second polarization selective reflector is disposed on the second facet. In some embodiments, the first polarization selective reflector and the second polarization selective reflector are selected from the group consisting of: a wire grid polarizer, a birefringent optical film reflective polarizer, a cholesteric reflective polarizer, and a MacNeille polarizer.

In some embodiments, the optical device further includes a first light source configured to output the first light having the first polarization; and a second light source configured to output the third light having the first polarization.

In some embodiments, the optical device further includes a first Fresnel reflector optically coupled with the first polarization selective reflector configured to receive the first light output by the first light source; and redirect the first light toward the first polarization selective reflector in the first direction. The optical device further includes a second Fresnel reflector optically coupled with the second polarization selective reflector configured to receive the third light output by the second light source and redirect the third light toward the second polarization selective reflector in the fourth direction.

In some embodiments, the fourth direction is substantially parallel to the first direction. In some embodiments, the fifth direction is substantially parallel to the second direction. In some embodiments, the fifth direction is non-parallel to the second direction.

In accordance with some embodiments, a method includes, with a first polarization selective reflector positioned in a first orientation, receiving first light in a first direction; redirecting a first portion, of the first light, having a first polarization to a second direction that is non-parallel to the first direction. The method includes receiving second light in a third direction, transmit a first portion, of the second light having a second polarization orthogonal to the first polarization. The method also includes, with a second polarization selective reflector positioned in a second orientation non-parallel to the first orientation, and adjacent to the first polarization selective reflector, receiving third light in a fourth direction; redirecting a first portion, of the third light, having the first polarization to a fifth direction that is non-parallel to the fourth direction; and receiving fourth light in a sixth direction, transmit a first portion, of the fourth light having the second polarization.

In accordance with some embodiments, a method of making an optical assembly includes placing a first polarization selective reflector in a first orientation; and placing a second polarization selective reflector in a second orientation non-parallel, and adjacent, to the first orientation. In some embodiments, the optical assembly includes a polarization beam splitter.

In accordance with some embodiments, an optical device includes a first polarization selective reflector, a second polarization selective reflector; and a third reflector. The first polarization selective reflector is configured to receive first light and redirect a first portion, of the first light, having a first polarization and transmit a second portion, of the first light, having a second polarization orthogonal to the first polarization. The second polarization selective reflector is configured to receive from the first polarization selective reflector, and transmit to the third reflector, the second portion of the first light. The third reflector is configured to receive from the second polarization selective reflector, and redirect back to the second polarization selective reflector, the second portion of the first light; and the second polarization selective reflector is further configured to receive light from the third reflector and redirect at least a portion of light, the redirected portion having the first polarization.

In accordance with some embodiments, an optical device includes a first polarization selective reflector positioned relative to a spatial light modulator; and a first reflective assembly positioned relative to the first polarization selective reflector so that the first polarization selective reflector receives first light from the spatial light modulator and directs at least a portion of the first light having a first polarization toward the first reflective assembly as second light. The first reflective assembly receives the second light from the first polarization selective reflector and directs at least a portion of the second light toward the first polarization selective reflector as third light having a second polarization. The second polarization is distinct from the first polarization.

In some embodiments, the spatial light modulator is positioned in a first direction from the first polarization selective reflector, and the first reflective assembly is positioned in a second direction from the first polarization selective reflector. In some embodiments, illumination light enters the optical device in a third direction from the first polarization selective reflector; and a waveguide is positioned in a fourth direction from the first polarization selective reflector. The first direction and the second direction are distinct from each other.

In some embodiments, the first direction is perpendicular to the third direction; and the second direction is perpendicular to the fourth direction. In some embodiments, the spatial light modulator and the first reflective assembly are located in opposite directions from the first polarization selective reflector. In some embodiments, the second direction is perpendicular to the third direction; and the first direction is perpendicular to the fourth direction. In some embodiments, the waveguide and the first reflective assembly are located in opposite directions from the first polarization selective reflector.

In some embodiments, the optical device further includes a first reflector. The first reflector defines an opening, and the first reflector is positioned relative to the spatial light modulator so that the spatial light modulator receives light that has (i) passed through the opening of the first reflector and (ii) subsequently reflected off the first reflector. In some embodiments, a second polarization selective reflector is disposed adjacent to the waveguide. The second polarization selective reflector is configured (e.g., by orienting a polarization axis of the second polarization selective reflector) to reflect light having a polarization different (e.g., orthogonal) from a polarization of light reflected by the first polarization selective reflector.

In some embodiments, the optical device further includes a second polarization selective reflector disposed adjacent to the waveguide. The second polarization selective reflector is configured (e.g., by orienting a polarization axis of the second polarization selective reflector) to reflect light having a polarization identical to a polarization of light reflected by the first polarization selective reflector.

In some embodiments, a first plane defined by (e.g., containing) the first polarization selective reflector intersects a second plane defined by (e.g., containing) the spatial light modulator at a first acute angle.

In some embodiments, the first reflective assembly includes a polarization retarder and a reflective lens.

In some embodiments, a projection of the first polarization selective reflector on a plane defined by the spatial light modulator has a rectangular shape. In some embodiments, a height of the projection is greater than a width of the projection so that a field of view of the spatial light modulator along the height dimension is larger than a field of view along the width dimension.

In some embodiments, the first polarization selective reflector is at substantially 45-degree angle relative to the plane defined by the spatial light modulator. the optical device comprises a first prism and a second prism.

In some embodiments, at least a portion of the first prism has a trapezoidal cross-section having a first edge, a second edge, a third edge, a fourth edge. The first edge is perpendicular to the second edge; the second prism is a right-angle prism having a hypotenuse; and the first polarization selective reflector is disposed between the first prism and the second prism, parallel to the hypotenuse of the second prism and the fourth edge of the first prism. In some embodiments, a length of the hypotenuse is equal to a length of the third edge.

In some embodiments, the first reflective assembly is positioned relative to the spatial light modulator so that the first polarization selective reflector directs the second light toward the first reflective assembly by transmitting the second light.

In some embodiments, the first reflective assembly is positioned relative to the spatial light modulator so that the first polarization selective reflector directs the second light having the first polarization toward the first reflective assembly by reflecting the second light.

In some embodiments, the first reflective assembly includes a reflector and a polarization retarder disposed adjacent to the reflector.

In some embodiments, the polarization retarder includes a quarter-wave plate. In some embodiments, the polarization retarder is disposed on a first surface of a lens and the reflector includes a reflective coating disposed on an opposing second surface of the lens.

In accordance to some embodiments, a method includes directing, using a first polarization selective reflector, first light from a spatial light modulator toward a first reflector assembly. The method includes receiving, using the first reflector assembly, the first light and directing at least a portion of the first light toward the first polarization selective reflector as second light. The method also includes receiving, using the first polarization selective reflector, the second light and directing at least a portion of the second light toward a waveguide (e.g., as third light). The first light has a first polarization, and the second light has a second polarization distinct from the first polarization (e.g., the second polarization is orthogonal to the first polarization).

In some embodiments, the first polarization selective reflector transmits the first light toward the first reflector assembly. In some embodiments, the first polarization selective reflector reflects the first light toward the first reflector assembly.

In accordance to some embodiments, an optical device includes a first polarization selective reflector, a second polarization selective reflector positioned relative to the first polarization selective reflector so that the first polarization selective reflector directs first light (e.g., impinging on the first polarization selective reflector and having a first polarization) toward the second polarization selective reflector and the second polarization selective reflector directs at least a portion of the first light toward the first polarization selective reflector as second light. The optical device includes a first reflector positioned relative to the first polarization selective reflector so that the first polarization selective reflector directs at least a portion of the second light received from the second polarization selective reflector toward the first reflector as third light and the first reflector directs at least a portion of third light (e.g., back) toward the first polarization selective reflector.

In some embodiments, the first reflector is aspherical.

In some embodiments, the first reflector is aspherical to provide uniform illumination at the spatial light modulator.

In some embodiments, the first polarization selective reflector is configured to direct the portion of the third light from the first reflector toward a spatial light modulator. In some embodiments, the optical device further includes a second reflector positioned relative to the first polarization selective reflector so that light from the spatial light modulator is directed by the first polarization selective reflector toward the second reflector and the second reflector directs at least a portion of the light from the spatial light modulator towards the first polarization selective reflector. In some embodiments, the second reflector projects at least a portion of the light from the spatial light modulator.

In some embodiments, the second polarization selective reflector is positioned in a first orientation substantially parallel to a plane that perpendicularly intersects an optical axis of the first reflector. The second polarization selective reflector is configured (e.g., by orienting a polarization axis of the second polarization selective reflector) to reflect light having a polarization different from (e.g., orthogonal to) a polarization of light reflected by the first polarization selective reflector.

In some embodiments, the first polarization selective reflector directs the first light (having the first polarization) toward the second polarization selective reflector by transmitting the first light. In some embodiments, the second light directed toward the first polarization selective reflector by the second polarization selective reflector is transmitted through the first polarization selective reflector. In some embodiments, the first polarization selective reflector directs the portion of the third light from the first reflector toward a spatial light modulator by reflecting the portion of the third light.

In some embodiments, the first polarization selective reflector has a first surface and an opposing second surface, the first reflector faces the first surface, and the second polarization selective reflector faces the second surface.

In some embodiments, the second polarization selective reflector is positioned in a second orientation substantially orthogonal to a plane that perpendicularly intersects an optical axis of the first reflector. In some embodiments, the second polarization selective reflector is configured (e.g., by orienting a polarization axis of the second polarization selective reflector) to reflect light having an identical polarization as light reflected by the first polarization selective reflector. In some embodiments, (e.g., FIG. 14E) the first polarization selective reflector has a first surface and an opposite second surface, both the first reflector and the second polarization selective reflector face the first surface.

In some embodiments, the first polarization selective reflector directs the first light (having the first polarization) toward the second polarization selective reflector by reflecting the first light toward the second polarization selective reflector.

In some embodiments, the portion of the second light directed toward the first polarization selective reflector by the second polarization selective reflector is reflected by the first polarization selective reflector toward the first reflector.

In some embodiments, the first polarization selective reflector directs the portion of the third light from the first reflector toward the spatial light modulator by transmitting the portion of the third light.

In some embodiments, the first polarization selective reflector has a first surface and an opposing second surface, and the first surface of the first polarization selective reflector faces both the first reflector and the second polarization selective reflector.

In some embodiments, the first reflector includes structures configured to scatter the portion of the third light directed toward the first polarization selective reflector.

In some embodiments, a first plane defined by (e.g., containing) the first polarization selective reflector intersects, at a first acute angle, with a second plane defined by (e.g., containing) the second polarization selective reflector, and intersects, at a second acute angle, with a third plane defined by (e.g., containing) the first reflector.

In some embodiments, the optical device further includes a first polarization retarder disposed adjacent to the first reflector.

In some embodiments, the first reflector defines a first opening so that the first light received by the first polarization selective reflector has passed through the first opening.

In some embodiments, an illumination system includes any optical device described herein, a light source, a homogenizing device configured to condition light from the light source as output light. The illumination system includes a diverting optic positioned to direct the output light into the optical device through the first opening.

In some embodiments, the first polarization retarder defines a second opening aligned with the first opening of the first reflector.

In accordance to some embodiments, a method includes directing, using a first polarization selective reflector, first light toward a second polarization selective reflector. The method includes receiving, using the second polarization selective reflector, the first light and directing at least a portion of the first light toward the first polarization selective reflector as second light. The method includes receiving, using the first polarization selective reflector, the second light and directing at least a portion of the second light toward a first reflector as third light. The method also includes receiving, using the first reflector, the third light and directing at least a portion of the third light toward the first polarization selective reflector as fourth light. The method includes receiving, using the first polarization selective reflector, the fourth light and directing at least a portion of the fourth light to illuminate a spatial light modulator.

In accordance to some embodiments, an optical device includes a first polarization selective reflector; a second polarization selective reflector positioned relative to the first polarization selective reflector so that the first polarization selective reflector directs first light having a first nonplanar polarization (e.g., a circular polarization or an elliptical polarization) toward the second polarization selective reflector and the second polarization selective reflector directs at least a portion of the first light toward the first polarization selective reflector as second light. The optical device also includes a first reflector positioned relative to the first polarization selective reflector so that the first polarization selective reflector directs at least a portion of the second light (received from the second polarization selective reflector) having a second nonplanar polarization toward the first reflector as third light. In some embodiments, the first reflector directs at least a portion of third light toward the first polarization selective reflector.

In some embodiments, the first polarization selective reflector or the second polarization selective reflector is a polarization element that includes a metasurface, resonant structures, a chiral layer, or a birefringent material.

In some embodiments, the first reflector directs at least a portion of third light having the first nonplanar polarization toward the first polarization selective reflector, and the first polarization selective reflector is configured to direct the portion of the third light from the first reflector toward a spatial light modulator as illumination light.

In some embodiments, the first polarization selective reflector is a liquid crystal based polarization selective element. In some embodiments, the liquid crystal based polarization selective element includes a polarization volume hologram (described with respect to FIGS. 16A-16D). In some embodiments, the liquid crystal based polarization selective element includes cholesteric liquid crystals.

In some embodiments, the optical device further includes a first reflective assembly positioned relative to the first polarization selective reflector so that the first polarization selective reflector receives first imaging light from a spatial light modulator and directs at least a portion of the first imaging light having a third nonplanar polarization toward the first reflective assembly as second imaging light. The first reflective assembly receives the second imaging light from the first polarization selective reflector and directs at least a portion of the second imaging light toward the first polarization selective reflector as third imaging light having a fourth nonplanar polarization. The third nonplanar polarization is distinct from the fourth nonplanar polarization.

In some embodiments, the second polarization selective reflector is positioned in a first orientation that is substantially parallel to a plane that perpendicularly intersects an optical axis of the first reflector, and the second polarization selective reflector is configured (e.g., by orienting a polarization axis of the second polarization selective reflector) to reflect light having a polarization different from a polarization of light reflected by the first polarization selective reflector.

In some embodiments, a first plane defined by the first polarization selective reflector intersects, at a first acute angle, with a second plane defined by the second polarization selective reflector, and intersects, at a second acute angle, with a third plane defined by the first reflector.

In some embodiments, the first reflector defines a first opening so that the first light received by the first polarization selective reflector has passed through the first opening.

In some embodiments, an illumination system includes any optical device described herein, a light source; a homogenizing device configured to condition light from the light source as output light; and a diverting optic positioned to direct the output light into the optical device through the first opening.

In accordance to some embodiments, an optical device includes a first polarization selective reflector positioned relative to a spatial light modulator; and a first reflective assembly positioned relative to the first polarization selective reflector so that the first polarization selective reflector receives first light from the spatial light modulator and directs at least a portion of the first light having a first nonplanar polarization toward the first reflective assembly as second light. The first reflective assembly receives the second light from the first polarization selective reflector and directs at least a portion of the second light having a second nonplanar polarization toward the first polarization selective reflector as third light. The second nonplanar polarization is distinct from the first nonplanar polarization.

In some embodiments, the first polarization selective reflector is a polarization element that includes a metasurface, resonant structures, a chiral layer, or a birefringent material.

In some embodiments, the first polarization selective reflector is a liquid crystal based polarization selective element.

In some embodiments, the optical device further includes a first reflector. In some embodiments, the first reflector defines an opening. The first reflector is positioned relative to the spatial light modulator so that the spatial light modulator receives light that has (i) passed through the opening of the first reflector and (ii) subsequently reflected off the first reflector.

In some embodiments, the optical device further includes a second polarization selective reflector disposed adjacent to a waveguide. The second polarization selective reflector is configured to reflect light having a polarization different from a polarization of light reflected by the first polarization selective reflector.

In some embodiments, the optical device further includes a second polarization selective reflector disposed adjacent to a waveguide. The second polarization selective reflector is configured (e.g., by orienting a polarization axis of the second polarization selective reflector) to reflect light having a polarization identical to a polarization of light reflected by the first polarization selective reflector.

In some embodiments, a projection of the first polarization selective reflector on a plane defined by the spatial light modulator has a rectangular shape.

In accordance with some embodiments, an optical device includes a first polarization selective reflector positioned in a first orientation so that the first polarization selective reflector receives first light in a first direction; redirects a first portion, of the first light, having a first nonplanar polarization to a second direction that is non-parallel to the first direction. The first polarization selective reflector receives second light in a third direction and transmit a first portion, of the second light, having a second nonplanar polarization orthogonal to the first nonplanar polarization. The optical device includes a second polarization selective reflector positioned in a second orientation non-parallel to the first orientation so that the second polarization selective reflector receives third light in a fourth direction; redirects a first portion, of the third light, having the first nonplanar polarization to a fifth direction that is non-parallel to the fourth direction; and receives fourth light in a sixth direction and transmit a first portion, of the fourth light having the second nonplanar polarization. In some embodiments, the first orientation is adjacent to the first polarization selective reflector.

In some embodiments, the optical device further includes a third reflector configured to receive from the second polarization selective reflector a second portion of the first light transmitted by the first polarization selective reflector, and redirect the second portion of the first light back to the second polarization selective reflector as the second light.

In some embodiments, the optical device further includes a Fresnel reflector optically coupled with the first polarization selective reflector, the Fresnel reflector configured to receive the first light output by a first light source; and redirect the first light toward the first polarization selective reflector.

In accordance to some embodiments, an optical device includes a first polarization selective reflector; and a second polarization selective reflector positioned relative to the first polarization selective reflector so that the first polarization selective reflector directs first light having a first polarization toward the second polarization selective reflector and the second polarization selective reflector directs second light having a second polarization toward the first polarization selective reflector. A first plane defined by the first polarization selective reflector intersects a second plane defined by the second polarization selective reflector at a first angle.

In some embodiments, the second light is a portion of the first light.

In some embodiments, the first angle is an acute angle, and the first angle is measured from a portion of the first plane that directs the first light to a portion of the second plane that directs the second light.

In some embodiments, the first angle is approximately 45°.

In some embodiments, the optical device further comprises a prism assembly. The first polarization selective reflector is disposed along a diagonal (e.g., an inner diagonal) of the prism assembly. In some embodiments, the diagonal is an inner diagonal of the prism assembly.

In some embodiments, the first polarization selective reflector is configured (e.g., by orienting a polarization axis of the first polarization selective reflector) to reflect light having a polarization different from a polarization of light reflected by the second polarization selective reflector.

In some embodiments, the optical device further includes a first prism, the second polarization selective reflector is disposed on a first surface of the first prism, and light enters the optical device at a second surface parallel to the first surface.

In some embodiments, the first polarization selective reflector is configured (e.g., by orienting a polarization axis of the first polarization selective reflector) to reflect light having a polarization identical to a polarization of light reflected by the second polarization selective reflector.

In some embodiments, the optical device further includes a first prism. The second polarization selective reflector is disposed on a first surface of the first prism, and light enters the first prism at a second surface perpendicular to the first surface.

In some embodiments, a projection of the first polarization selective reflector on a plane defined by a spatial light modulator is rectangular.

In some embodiments, the first polarization selective reflector is positioned relative to a spatial light modulator to direct third light having a third polarization, distinct from the first polarization, along a first direction to the spatial light modulator and the second polarization selective reflector is positioned relative to the first polarization selective reflector to direct fourth light having the third polarization along the first direction to the spatial light modulator.

In some embodiments, a projection of the first polarization selective reflector on a plane defined by a spatial light modulator has a first width. In some embodiments, a height of the first polarization selective reflector is larger than the first width, and the height is orthogonal to the first width.

In some embodiments, the first angle is approximately 90 degrees. In some embodiments, the angle is more or less than 90 degrees.

In some embodiments, the optical device further includes a first prism. The first polarization selective reflector is disposed on a first surface of the first prism and the second polarization selective reflector is disposed on a second surface of the first prism.

In some embodiments, the optical device further includes a second prism and a third prism. The second prism is in contact with the second polarization selective reflector, and the third prism is in contact with the first polarization selective reflector.

In some embodiments, the first polarization selective reflector is configured to direct first light having a first nonplanar polarization (e.g., a circular polarization or an elliptical polarization) toward the second polarization selective reflector and the second polarization selective reflector is configured to direct second light having a second nonplanar polarization toward the first polarization selective reflector.

In some embodiments, the first polarization selective reflector is configured to direct first light having a first nonplanar polarization (e.g., a circular polarization or an elliptical polarization) toward the second polarization selective reflector and the second polarization selective reflector is configured to direct second light having a second nonplanar polarization toward the first polarization selective reflector.

In some embodiments, at least one of the first polarization selective reflector or the second polarization selective reflector is either (i) a liquid crystal based polarization selective element, or (ii) a polarization selective element that includes a metasurface, resonant structures, a chiral layer, or a birefringent material.

In some embodiments, the first angle is an acute angle, the first angle is measured from a portion of the first plane that directs the first light to a portion of the second plane that directs the second light, and the first polarization selective reflector is disposed along a diagonal of the optical device.

In accordance to some embodiments, a method includes coupling a first polarization selective reflector to a second polarization selective reflector so that a first plane defined by the first polarization selective reflector intersects, at a first angle, a second plane defined by the second polarization selective reflector so that the first polarization selective reflector is configured to direct first light having a first polarization toward the second polarization selective reflector and the second polarization selective reflector is configured to direct second light having a second polarization toward the first polarization selective reflector.

In some embodiments, coupling the first polarization selective reflector to the second polarization selective reflector includes disposing the second polarization selective reflector on a first surface of a prism and disposing the second polarization selective reflector on a second surface of the prism. In some embodiments, the first angle is approximately 90 degrees; and the first polarization is identical to the second polarization. In some embodiments, the angle is more or less than 90 degrees.

In some embodiments, coupling the first polarization selective reflector to the second polarization selective reflector includes disposing the first polarization selective reflector on a first surface of a first prism and disposing the second polarization selective reflector on a second surface of the first prism. The first angle is an acute angle, and the method also includes attaching a second prism to the first surface of the first prism so that the first polarization selective reflector is disposed along a diagonal of a prism assembly that includes the first prism and the second prism.

In some embodiments, the first polarization selective reflector includes an element selected from the group consisting of a wire grid polarizer, a MacNeille polarizer, a liquid crystal based polarization selective element, and a polarization element that includes a metasurface, resonant structures, or a chiral layer.

Thus, the disclosed embodiments provide devices and methods that provide more compact and lightweight head-mounted display devices.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIG. 3 is an isometric view of a display device in accordance with some embodiments.

FIG. 4D is a schematic diagram comparing dimensions of polarization selective reflectors in accordance with some embodiments.

FIGS. 16A-16D are schematic diagrams illustrating a polarization volume holographic grating in accordance with some embodiments.

Figure 1:
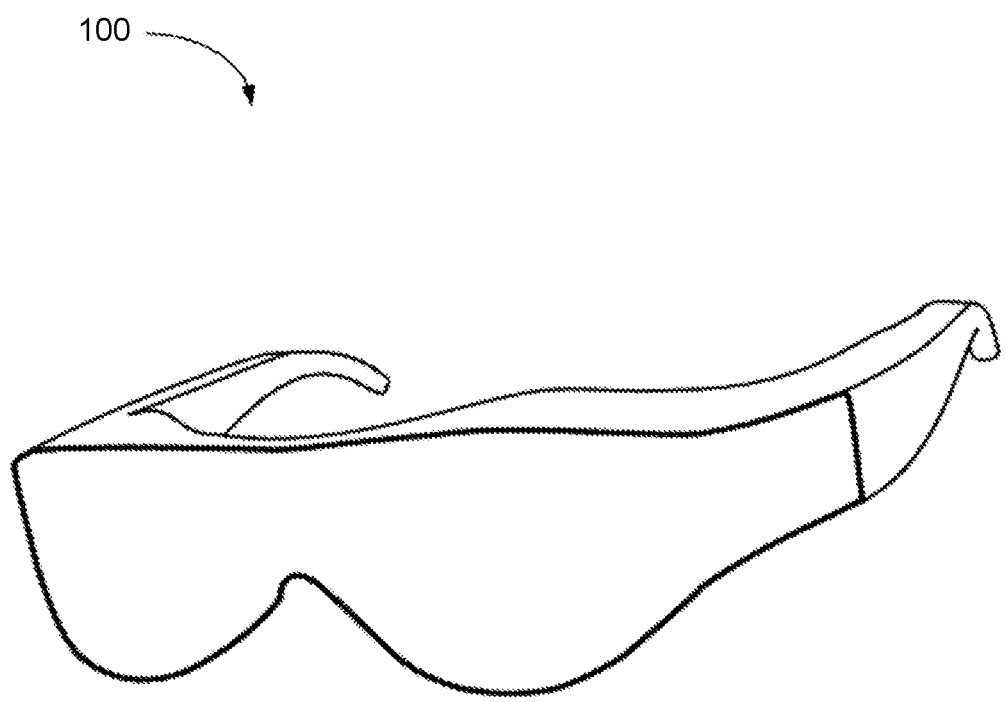
FIG. 1 is a perspective view of a display device in accordance with some embodiments.

These figures are not drawn to scale unless indicated otherwise.

DETAILED DESCRIPTION

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first region could be termed a second region, and, similarly, a second region could be termed a first region, without departing from the scope of the various described embodiments. The first region and the second region are both regions, but they are not the same region.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "exemplary" is used herein in the sense of "serving as an example, instance, or illustration" and not in the sense of "representing the best of its kind."

Embodiments described herein may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

FIG. 1 illustrates display device 100 in accordance with some embodiments. In some embodiments, display device 100 is configured to be worn on the head of a user (e.g., by having the form of spectacles or eyeglasses, as shown in FIG. 1) or to be included as part of a helmet that is to be worn by the user. When display device 100 is configured to be worn on a head of a user or to be included as part of a helmet or headset, display device 100 is called a head-mounted display. Alternatively, display device 100 is configured for placement in proximity of an eye or eyes of the user at a fixed location, without being head-mounted (e.g., display device 100 is mounted in a vehicle, such as a car or an airplane, for placement in front of an eye or eyes of the user). As shown in FIG. 1, display device 100 includes display 110. Display 110 is configured for presenting visual content (e.g., augmented reality content, virtual reality content, mixed reality content, or any combination thereof) to a user.

In some embodiments, display device 100 includes one or more components described below with respect to FIG. 2. In some embodiments, display device 100 includes additional components not shown in FIG. 2.

Figure 2:
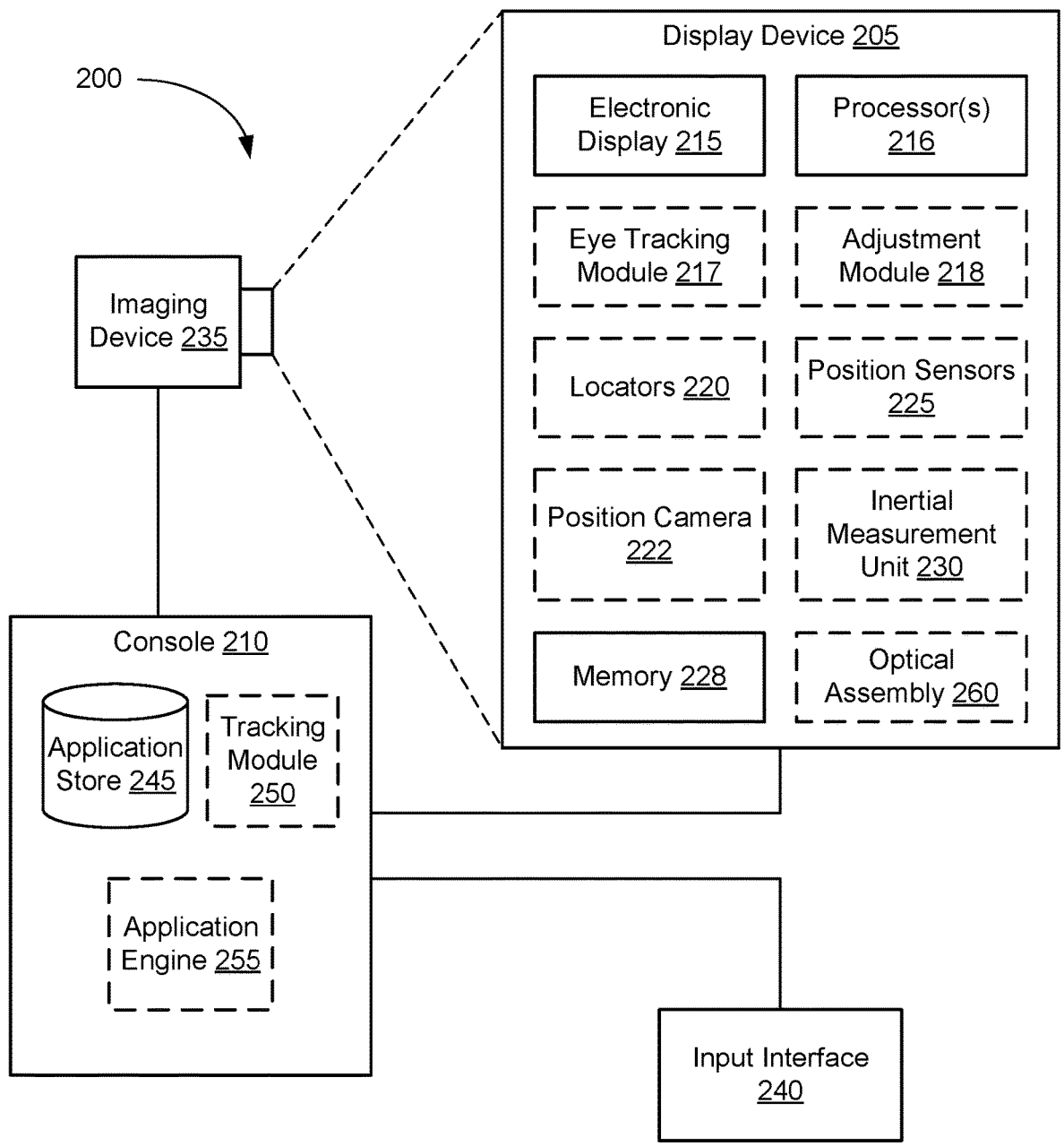
FIG. 2 is a block diagram of a system including a display device in accordance with some embodiments.

FIG. 2 is a block diagram of system 200 in accordance with some embodiments. The system 200 shown in FIG. 2 includes display device 205 (which corresponds to display device 100 shown in FIG. 1), imaging device 235, and input interface 240 that are each coupled to console 210. While FIG. 2 shows an example of system 200 including one display device 205, imaging device 235, and input interface 240, in other embodiments, any number of these components may be included in system 200. For example, there may be multiple display devices 205 each having an associated input interface 240 and being monitored by one or more imaging devices 235, with each display device 205, input interface 240, and imaging device 235 communicating with console 210. In alternative configurations, different and/or additional components may be included in system 200. For example, in some embodiments, console 210 is connected via a network (e.g., the Internet) to system 200 or is self-contained as part of display device 205 (e.g., physically located inside display device 205). In some embodiments, display device 205 is used to create mixed reality by adding in a view of the real surroundings. Thus, display device 205 and system 200 described here can deliver virtual reality, mixed reality, and/or augmented reality.

In some embodiments, as shown in FIG. 1, display device 205 is a head-mounted display that presents media to a user. Examples of media presented by display device 205 include one or more images, video, audio, haptics, or some combination thereof. In some embodiments, audio is presented via an external device (e.g., speakers and/or headphones) that receives audio information from display device 205, console 210, or both, and presents audio data based on the audio information. In some embodiments, display device 205 immerses a user in a virtual environment.

In some embodiments, display device 205 also acts as an augmented reality (AR) headset. In these embodiments, display device 205 can augment views of a physical, real-world environment with computer-generated elements (e.g., images, video, sound, haptics, etc.). Moreover, in some embodiments, display device 205 is able to cycle between different types of operation. Thus, display device 205 operate as a virtual reality (VR) device, an AR device, as glasses or some combination thereof (e.g., glasses with no optical correction, glasses optically corrected for the user, sunglasses, or some combination thereof) based on instructions from application engine 255.

Display device 205 includes electronic display 215, one or more processors 216, eye tracking module 217, adjustment module 218, one or more locators 220, one or more position sensors 225, one or more position cameras 222, memory 228, inertial measurement unit (IMU) 230, or a subset or superset thereof (e.g., display device 205 with electronic display 215, one or more processors 216, and memory 228, without any other listed components). Some embodiments of display device 205 have different modules than those described here. Similarly, the functions can be distributed among the modules in a different manner than is described here.

One or more processors 216 (e.g., processing units or cores) execute instructions stored in memory 228. Memory 228 includes high-speed random access memory, such as DRAM, SRAM, DDR RAM, or other random access solid state memory devices; and may include non-volatile memory, such as one or more magnetic disk storage devices, optical disk storage devices, flash memory devices, or other non-volatile solid state storage devices. Memory 228, or alternately the non-volatile memory device(s) within memory 228, includes a non-transitory computer readable storage medium. In some embodiments, memory 228 or the computer readable storage medium of memory 228 stores programs, modules and data structures, and/or instructions for displaying one or more images on electronic display 215.

Electronic display 215 displays images to the user in accordance with data received from console 210 and/or processor(s) 216. In various embodiments, electronic display 215 may comprise a single adjustable electronic display element or multiple adjustable electronic displays elements (e.g., a display for each eye of a user).

In some embodiments, the display element includes one or more light emission devices and a corresponding array of emission intensity array. An emission intensity array is an array of electro-optic pixels, opto-electronic pixels, some other array of devices that dynamically adjust the amount of light transmitted by each device, or some combination thereof. These pixels are placed behind one or more lenses. In some embodiments, the emission intensity array is an array of liquid crystal based pixels in an LCD (a Liquid Crystal Display). Examples of the light emission devices include: an organic light emitting diode, an active-matrix organic light-emitting diode, a light emitting diode, some type of device capable of being placed in a flexible display, or some combination thereof. The light emission devices include devices that are capable of generating visible light (e.g., red, green, blue, etc.) used for image generation. The emission intensity array is configured to selectively attenuate individual light emission devices, groups of light emission devices, or some combination thereof. Alternatively, when the light emission devices are configured to selectively attenuate individual emission devices and/or groups of light emission devices, the display element includes an array of such light emission devices without a separate emission intensity array.

One or more lenses direct light from the arrays of light emission devices (optionally through the emission intensity arrays) to locations within each eyebox and ultimately to the back of the user's retina(s). An eyebox is a region that is occupied by an eye of a user located proximate to display device 205 (e.g., a user wearing display device 205) for viewing images from display device 205. In some cases, the eyebox is represented as a 10 mm×10 mm square. In some embodiments, the one or more lenses include one or more coatings, such as anti-reflective coatings.

In some embodiments, the display element includes an infrared (IR) detector array that detects IR light that is retro-reflected from the retinas of a viewing user, from the surface of the corneas, lenses of the eyes, or some combination thereof. The IR detector array includes an IR sensor or a plurality of IR sensors that each correspond to a different position of a pupil of the viewing user's eye. In alternate embodiments, other eye tracking systems may also be employed.

Eye tracking module 217 determines locations of each pupil of a user's eyes. In some embodiments, eye tracking module 217 instructs electronic display 215 to illuminate the eyebox with IR light (e.g., via IR emission devices in the display element).

A portion of the emitted IR light will pass through the viewing user's pupil and be retro-reflected from the retina toward the IR detector array, which is used for determining the location of the pupil. Alternatively, the reflection off of the surfaces of the eye is also used to determine the location of the pupil. The IR detector array scans for retro-reflection and identifies which IR emission devices are active when retro-reflection is detected. Eye tracking module 217 may use a tracking lookup table and the identified IR emission devices to determine the pupil locations for each eye. The tracking lookup table maps received signals on the IR detector array to locations (corresponding to pupil locations) in each eyebox. In some embodiments, the tracking lookup table is generated via a calibration procedure (e.g., user looks at various known reference points in an image and eye tracking module 217 maps the locations of the user's pupil while looking at the reference points to corresponding signals received on the IR tracking array). As mentioned above, in some embodiments, system 200 may use other eye tracking systems than the embedded IR one described above.

Adjustment module 218 generates an image frame based on the determined locations of the pupils. In some embodiments, this sends a discrete image to the display such that will tile subimages together thus a coherent stitched image will appear on the back of the retina. Adjustment module 218 adjusts an output (i.e. the generated image frame) of electronic display 215 based on the detected locations of the pupils. Adjustment module 218 instructs portions of electronic display 215 to pass image light to the determined locations of the pupils. In some embodiments, adjustment module 218 also instructs the electronic display not to pass image light to positions other than the determined locations of the pupils. Adjustment module 218 may, for example, block and/or stop light emission devices whose image light falls outside of the determined pupil locations, allow other light emission devices to emit image light that falls within the determined pupil locations, translate and/or rotate one or more display elements, dynamically adjust curvature and/or refractive power of one or more active lenses in the lens (e.g., microlens) arrays, or some combination thereof.

Optional locators 220 are objects located in specific positions on display device 205 relative to one another and relative to a specific reference point on display device 205. A locator 220 may be a light emitting diode (LED), a corner cube reflector, a reflective marker, a type of light source that contrasts with an environment in which display device 205 operates, or some combination thereof. In embodiments where locators 220 are active (i.e., an LED or other type of light emitting device), locators 220 may emit light in the visible band (e.g., about 400 nm to 750 nm), in the infrared band (e.g., about 750 nm to 1 mm), in the ultraviolet band (about 100 nm to 400 nm), some other portion of the electromagnetic spectrum, or some combination thereof.

In some embodiments, locators 220 are located beneath an outer surface of display device 205, which is transparent to the wavelengths of light emitted or reflected by locators 220 or is thin enough to not substantially attenuate the wavelengths of light emitted or reflected by locators 220. Additionally, in some embodiments, the outer surface or other portions of display device 205 are opaque in the visible band of wavelengths of light. Thus, locators 220 may emit light in the IR band under an outer surface that is transparent in the IR band but opaque in the visible band.

IMU 230 is an electronic device that generates calibration data based on measurement signals received from one or more position sensors 225. Position sensor 225 generates one or more measurement signals in response to motion of display device 205. Examples of position sensors 225 include: one or more accelerometers, one or more gyroscopes, one or more magnetometers, another suitable type of sensor that detects motion, a type of sensor used for error correction of IMU 230, or some combination thereof. Position sensors 225 may be located external to IMU 230, internal to IMU 230, or some combination thereof.

Based on the one or more measurement signals from one or more position sensors 225, IMU 230 generates first calibration data indicating an estimated position of display device 205 relative to an initial position of display device 205. For example, position sensors 225 include multiple accelerometers to measure translational motion (forward/back, up/down, left/right) and multiple gyroscopes to measure rotational motion (e.g., pitch, yaw, roll). In some embodiments, IMU 230 rapidly samples the measurement signals and calculates the estimated position of display device 205 from the sampled data. For example, IMU 230 integrates the measurement signals received from the accelerometers over time to estimate a velocity vector and integrates the velocity vector over time to determine an estimated position of a reference point on display device 205. Alternatively, IMU 230 provides the sampled measurement signals to console 210, which determines the first calibration data. The reference point is a point that may be used to describe the position of display device 205. While the reference point may generally be defined as a point in space; however, in practice the reference point is defined as a point within display device 205 (e.g., a center of IMU 230).

In some embodiments, IMU 230 receives one or more calibration parameters from console 210. As further discussed below, the one or more calibration parameters are used to maintain tracking of display device 205. Based on a received calibration parameter, IMU 230 may adjust one or more IMU parameters (e.g., sample rate). In some embodiments, certain calibration parameters cause IMU 230 to update an initial position of the reference point so it corresponds to a next calibrated position of the reference point. Updating the initial position of the reference point as the next calibrated position of the reference point helps reduce accumulated error associated with the determined estimated position. The accumulated error, also referred to as drift error, causes the estimated position of the reference point to "drift" away from the actual position of the reference point over time.

Imaging device 235 generates calibration data in accordance with calibration parameters received from console 210. Calibration data includes one or more images showing observed positions of locators 220 that are detectable by imaging device 235. In some embodiments, imaging device 235 includes one or more still cameras, one or more video cameras, any other device capable of capturing images including one or more locators 220, or some combination thereof. Additionally, imaging device 235 may include one or more filters (e.g., used to increase signal to noise ratio). Imaging device 235 is optionally configured to detect light emitted or reflected from locators 220 in a field of view of imaging device 235. In embodiments where locators 220 include passive elements (e.g., a retroreflector), imaging device 235 may include a light source that illuminates some or all of locators 220, which retro-reflect the light towards the light source in imaging device 235. Second calibration data is communicated from imaging device 235 to console 210, and imaging device 235 receives one or more calibration parameters from console 210 to adjust one or more imaging parameters (e.g., focal length, focus, frame rate, ISO, sensor temperature, shutter speed, aperture, etc.).

Input interface 240 is a device that allows a user to send action requests to console 210. An action request is a request to perform a particular action. For example, an action request may be to start or end an application or to perform a particular action within the application. Input interface 240 may include one or more input devices. Example input devices include: a keyboard, a mouse, a game controller, data from brain signals, data from other parts of the human body, or any other suitable device for receiving action requests and communicating the received action requests to console 210. An action request received by input interface 240 is communicated to console 210, which performs an action corresponding to the action request. In some embodiments, input interface 240 may provide haptic feedback to the user in accordance with instructions received from console 210. For example, haptic feedback is provided when an action request is received, or console 210 communicates instructions to input interface 240 causing input interface 240 to generate haptic feedback when console 210 performs an action.

Console 210 provides media to display device 205 for presentation to the user in accordance with information received from one or more of: imaging device 235, display device 205, and input interface 240. In the example shown in FIG. 2, console 210 includes application store 245, tracking module 250, and application engine 255. Some embodiments of console 210 have different modules than those described in conjunction with FIG. 2. Similarly, the functions further described below may be distributed among components of console 210 in a different manner than is described here.

When application store 245 is included in console 210, application store 245 stores one or more applications for execution by console 210. An application is a group of instructions, that when executed by a processor, is used for generating content for presentation to the user. Content generated by the processor based on an application may be in response to inputs received from the user via movement of display device 205 or input interface 240. Examples of applications include: gaming applications, conferencing applications, video playback application, or other suitable applications.

When tracking module 250 is included in console 210, tracking module 250 calibrates system 200 using one or more calibration parameters and may adjust one or more calibration parameters to reduce error in determination of the position of display device 205. For example, tracking module 250 adjusts the focus of imaging device 235 to obtain a more accurate position for observed locators on display device 205. Moreover, calibration performed by tracking module 250 also accounts for information received from IMU 230. Additionally, if tracking of display device 205 is lost (e.g., imaging device 235 loses line of sight of at least a threshold number of locators 220), tracking module 250 re-calibrates some or all of system 200.

In some embodiments, tracking module 250 tracks movements of display device 205 using second calibration data from imaging device 235. For example, tracking module 250 determines positions of a reference point of display device 205 using observed locators from the second calibration data and a model of display device 205. In some embodiments, tracking module 250 also determines positions of a reference point of display device 205 using position information from the first calibration data. Additionally, in some embodiments, tracking module 250 may use portions of the first calibration data, the second calibration data, or some combination thereof, to predict a future location of display device 205. Tracking module 250 provides the estimated or predicted future position of display device 205 to application engine 255.

Application engine 255 executes applications within system 200 and receives position information, acceleration information, velocity information, predicted future positions, or some combination thereof of display device 205 from tracking module 250. Based on the received information, application engine 255 determines content to provide to display device 205 for presentation to the user. For example, if the received information indicates that the user has looked to the left, application engine 255 generates content for display device 205 that mirrors the user's movement in a virtual environment. Additionally, application engine 255 performs an action within an application executing on console 210 in response to an action request received from input interface 240 and provides feedback to the user that the action was performed. The provided feedback may be visual or audible feedback via display device 205 or haptic feedback via input interface 240.

FIG. 3 is an isometric view of display device 300 in accordance with some embodiments. In some other embodiments, display device 300 is part of some other electronic display (e.g., digital microscope, etc.). In some embodiments, display device 300 includes light emission device array 310 and one or more lenses 330. In some embodiments, display device 300 also includes an emission intensity array and an IR detector array.

Light emission device array 310 emits image light and optional IR light toward the viewing user. Light emission device array 310 may be, e.g., an array of LEDs, an array of microLEDs, an array of OLEDs, or some combination thereof. Light emission device array 310 includes light emission devices 320 that emit light in the visible light (and optionally includes devices that emit light in the IR). In some embodiments, a microLED includes an LED with an emission area characterized by a representative dimension (e.g., a diameter, a width, a height, etc.) of 100 µm or less (e.g., 50 µm, 20 µm, etc.). In some embodiments, a microLED has an emission area having a shape of a circle or a rectangle.

The emission intensity array is configured to selectively attenuate light emitted from light emission device array 310. In some embodiments, the emission intensity array is composed of a plurality of liquid crystal cells or pixels, groups of light emission devices, or some combination thereof. Each of the liquid crystal cells is, or in some embodiments, groups of liquid crystal cells are, addressable to have specific levels of attenuation. For example, at a given time, some of the liquid crystal cells may be set to no attenuation, while other liquid crystal cells may be set to maximum attenuation. In this manner the emission intensity array is able to control what portion of the image light emitted from light emission device array 310 is passed to the one or more lenses 330. In some embodiments, display device 300 uses the emission intensity array to facilitate providing image light to a location of pupil 350 of eye 340 of a user, and minimize the amount of image light provided to other areas in the eyebox.

One or more lenses 330 receive the modified image light (e.g., attenuated light) from the emission intensity array (or directly from light emission device array 310), and shifted by one or more beam shifters 360, and direct the shifted image light to a location of pupil 350.

An optional IR detector array detects IR light that has been retro-reflected from the retina of eye 340, a cornea of eye 340, a crystalline lens of eye 340, or some combination thereof. The IR detector array includes either a single IR sensor or a plurality of IR sensitive detectors (e.g., photodiodes). In some embodiments, the IR detector array is separate from light emission device array 310. In some embodiments, the IR detector array is integrated into light emission device array 310.

In some embodiments, light emission device array 310 and the emission intensity array make up a display element. Alternatively, the display element includes light emission device array 310 (e.g., when light emission device array 310 includes individually adjustable pixels) without the emission intensity array. In some embodiments, the display element additionally includes the IR array. In some embodiments, in response to a determined location of pupil 350, the display element adjusts the emitted image light such that the light output by the display element is refracted by one or more lenses 330 toward the determined location of pupil 350, and not toward other locations in the eyebox.

Figure 4A:
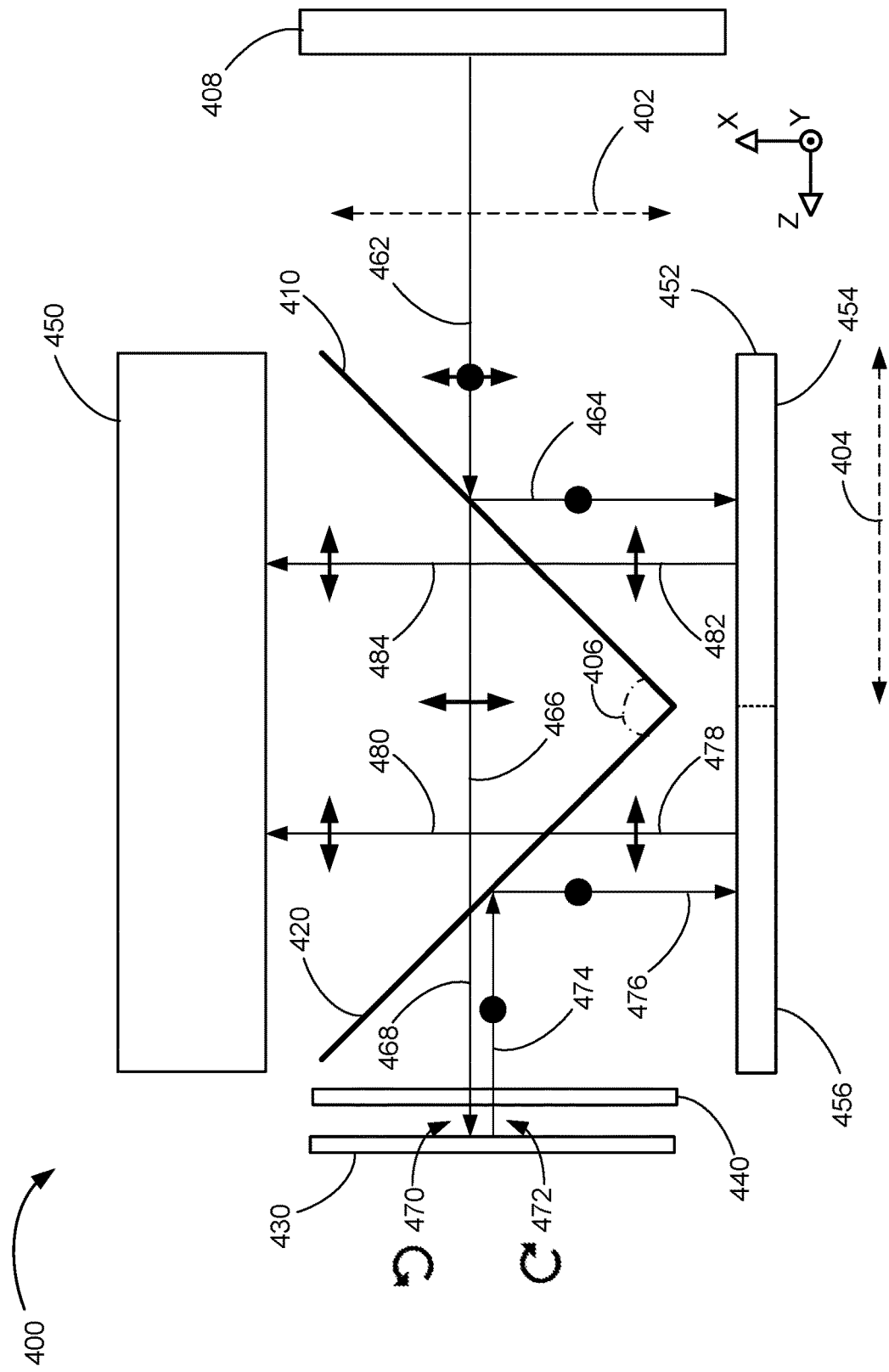
FIG. 4A is a schematic diagram illustrating an illumination system in accordance with some embodiments.

FIG. 4A is a schematic diagram illustrating an illumination system 400 in accordance with some embodiments. In some embodiments, the illumination system 400 is included in a head-mounted display device.

In FIG. 4A, the illumination system 400 includes a first polarization selective reflector 410, a second polarization selective reflector 420, a mirror 430 (e.g., a retroreflector), and a phase retarder 440 (e.g., a polarization retarder or a waveplate, such as a quarter-wave plate). The illumination system 400 is optically coupled with (e.g., positioned relative to) a spatial light modulator 452 that has a first portion 454 and a second portion 456 so that the illumination system 400 illuminates the spatial light modulator 452. In some embodiments, the illumination system 400 is positioned to receive light from one or more light sources 408. In some embodiments, the illumination system 400 includes the one or more light sources 408.

In some embodiments, the illumination system 400 is optically coupled with (e.g., positioned relative to) a projection system 450 (e.g., a projection lens, a projection lens assembly) so that the projection system 450 receives light (e.g., image light) output from the illumination system 400 and projects the light (e.g., to an eyebox of a user of the head-mounted display device). In some embodiments, coupling optics (e.g., waveguides, lenses, etc.) are used to couple an output of the projection system 450 to the eyebox.

In some embodiments, one or more of polarization selective reflectors 410 and 420 are partial reflectors. "Partial reflectors" include optical elements that fully reflect (e.g., with a reflectivity greater than 90%, 95%, or 99%) light of one polarization (e.g., a reflective polarizer) while transmitting at least a portion (e.g., at least 10%, 20%, 50%, 70%, 80%, or 90%) of light having an orthogonal polarization. In some embodiments, the one or more light sources 408 provide light 462 having orthogonally polarized components (e.g., a combination of an s-polarization component and a p-polarization component). For example, the light 462 may be diagonally polarized, circularly polarized, elliptically polarized, or unpolarized.

In FIG. 4A, the light 462 includes a first polarization component in which the electric field lies in the x-z plane (which is called herein "vertically polarized" or "having vertical polarization" for ease of reference), and a second polarization component in which the electric field lies in the z-y plane (which is called herein "horizontally polarized" or "having horizontal polarization for ease of reference).

The first polarization selective reflector 410 is positioned in a first orientation (e.g., making an acute angle with respect to the z-y plane, such as a 45° angle with respect to the z-y plane) and receives the light 462 in a first direction (e.g., along the +z direction). In some embodiments, the first polarization selective reflector 410 is configured to reflect light that is horizontally polarized and transmit light that is vertically polarized. In some embodiments, the first polarization selective reflector 410 includes a wire grid polarizer. In some embodiments, the first polarization selective reflector 410 includes a MacNeille polarizer. In some embodiments, the first polarization selective reflector 410 includes a liquid crystal based polarization selective element. In some embodiments, a polarization element includes a metasurface, resonant structures, or a chiral layer.

In some embodiments, the first polarization selective reflector 410 redirects the first portion (e.g., light 464) of the light 462, having a first polarization (e.g., horizontal polarization) to a second direction (e.g., −x direction), that is non-parallel to the first direction (e.g., +z direction). For example, the first polarization selective reflector 410 is positioned to reflect the first portion (e.g., the portion that is horizontally polarized) of the light 462 as light 464, toward the spatial light modulator 452. In some embodiments, the second direction (e.g., −x direction) is orthogonal to the first direction (e.g., +z direction).

In some embodiments, the spatial light modulator 452 receives the light 464 and depending on the setting for a particular location (e.g., pixel) of the spatial light modulator 452, modifies the light 464 (or at least a portion of the light 464 that impinges on the particular location of the spatial light modulator 452), and provides (e.g., reflects) the modified light as light 482 having a polarization different from the polarization of the light 464 towards the first polarization selective reflector 410. For example, the light 464, which is horizontally polarized, is modified by the spatial light modulator 452 to become light 482 that is vertically polarized. Although the light 482 reflects from the spatial light modulator 452 at or close to a location where the light 464 strikes the spatial light modulator 452, in FIG. 4A, the light 482 is shown offset from the light 464 in the z-direction for ease of reference. The first polarization selective reflector 410 receives second light (e.g., light 482) in a third direction (e.g., +x direction) and transmits at least a first portion (e.g., light 484) of the second light, having a second polarization (e.g., vertical polarization) orthogonal to the first polarization (e.g., horizontal polarization). The vertically polarized light 482 directed toward the first polarization selective reflector 410 is transmitted through the first polarization selective reflector 410 as light 484 because of its polarization. The light 484, having a vertical polarization, then enters the projection system 450.

In some embodiments, the first polarization selective reflector 410 is further configured to transmit a second portion (e.g., light 466), of the first light, having the second polarization (e.g., vertically polarized). In some embodiments, the first polarization selective reflector 410 transmits a second portion (e.g., the portion that is vertically polarized) of the light 462 as the light 466, toward the second polarization selective reflector 420. In some embodiments, the second polarization selective reflector 420 is configured (e.g., positioned) to receive the second portion (e.g., the light 466) of the first light having the second polarization (e.g., vertically polarized).

In some embodiments, the first polarization selective reflector 410 and the second polarization selective reflector 420 both reflect light having horizontal polarization and transmit light having vertical polarization. In some embodiments, the second polarization selective reflector 420 is configured (e.g., positioned) to transmit the second portion (e.g., the light 466) of the first light having the second polarization (e.g., vertically polarized). For example, the second polarization selective reflector 420 may include one or more of: a wire grid polarizer, a MacNeille polarizer, a liquid crystal based polarization selective element, or a polarization element including a metasurface, resonant structures, or a chiral layer. In some embodiments, the vertically polarized light 466 is transmitted through the second polarization selective reflector 420 and maintains its vertical polarization as light 468.

In some embodiments, the light 468 (e.g., linearly polarized light, such as vertically polarized light) is incident on the phase retarder 440 at a particular incident angle (e.g., 0°). In some embodiments, the phase retarder 440 is a quarter-wave plate configured to convert the linearly polarized light 468 to circularly polarized light 470 (e.g., left-circularly polarized light) and transmits the circularly polarized light 470 toward the mirror 430. In general, phase retarders can include different types of waveplates, but hereinafter, a quarter-wave plate is used as an example of the phase retarder 440. The quarter-wave plate 440 has its fast axis oriented such that a first portion of the vertically polarized light 468 accumulates a phase shift of 90° with respect to a second portion of the vertically polarized light 468, creating the circularly polarized light 470.

In some embodiments, the illumination system 400 includes a third reflector (e.g., the mirror 430) configured to receive from the second polarization selective reflector 420 the second portion (e.g., the light 468) of the first light, and redirect the second portion of the first light back to the second polarization selective reflector 420 as the second light (e.g., light 474). For example, in configurations with the phase retarder 440 (e.g., a quarter-wave plate), the mirror 430 reflects the circularly polarized light 470 toward the phase retarder 440 as light 472. When the circularly polarized light 470 is reflected by the mirror 430, a direction in which the electric field vector of the circularly polarized light 470 rotates is reversed. Thus, the circularly polarized light 472 (e.g., left-circularly polarized light) has a handedness opposite to the circularly polarized light 470 (e.g., right-circularly polarized light). As the circularly polarized light 472 passes through the phase retarder 440, the phase retarder 440 converts the circularly polarized light 472 to linearly polarized light 474 and transmit the linearly polarized light 474 toward the second polarization selective reflector 420. In some embodiments, a plane of vibration of the linearly polarized light 474 (e.g., horizontally polarized) is perpendicular to a plane of vibration of the linearly polarized light 466 (e.g., vertically polarized), and the second polarization selective reflector 420 reflects the linearly polarized light 474 toward the spatial light modulator 452 as light 476.

In some embodiments, the second polarization selective reflector 420 is positioned in a second orientation (e.g., making an acute angle with respect to the z-y plane, such as a 45° angle with respect to the z-y plane) non-parallel to the first orientation, and adjacent to the first polarization selective reflector 410 (e.g., one end of the second polarization selective reflector 420 is in contact with one end of the first polarization selective reflector 410). The second polarization selective reflector 420 receives third light (e.g., light 474) in a fourth direction (e.g., -z direction), redirects a first portion (e.g., light 476) of the third light having the first polarization (e.g., horizontally polarized light) to a fifth direction (e.g., -x direction) that is non-parallel to the fourth direction (-z direction).

The spatial light modulator 452 modifies a polarization of the horizontally polarized light 476 to provide light 478 that is vertically polarized, and directs the light 478 toward the second polarization selective reflector 420. The second polarization selective reflector 420 receives fourth light (e.g., light 478) in a sixth direction (e.g., +x direction) and transmits at least a first portion (e.g., light 480) of the fourth light having the second polarization (e.g., vertical polarization). The light 480, having the same polarization (e.g., a vertical polarization) as the light 484, then enters the projection system 450.

Light that reflects off the first polarization selective reflector 410 (e.g., light 464) is incident on the first portion 454 of the spatial light modulator 452. In contrast, at least a portion of the light that transmits through the first polarization selective reflector 410 (e.g., light 476) is incident on the second portion 456 of the spatial light modulator 452. Thus, in some embodiments, the first portion 454 of the spatial light modulator 452 is configured to modify or manipulate a component of the light 462 having a first polarization (e.g., horizontal polarization) only, while the second portion 456 of the spatial light modulator 452 is configured to modify or manipulate a component of the light 462 having a second polarization (e.g., vertical polarization) only. In some embodiments, the light 462 is selectively encoded with certain proportions of vertically polarized light and horizontally polarized light (e.g., a vertically polarized component and a horizontally polarized component have a certain intensity ratio).

In some embodiment, the spatial light modulator 452 modifies a polarization state of at least a portion of light reflected by the spatial light modulator 452, and at least a portion of the reflected light is transmitted by first polarization selective reflector 410 and the second polarization selective reflector 420 (e.g., as light 484 and light 480, respectively), and is imaged by the projection system 450. In some embodiments, the projection lens 450 directs the light (e.g., light 480 and light 484) to an image combiner, such as a partially reflective surface, a reflective polarizer, a polarization volume hologram (described with respect to FIGS. 16A-16D), or a holographic optical element.

In some embodiments, the spatial light modulator 452 is a Liquid Crystal on Silicon (LCoS) spatial light modulator. In some embodiments, LCoS is based on liquid crystal. In some embodiments, LCoS is based on ferroelectric liquid crystal.

In some embodiments, at least a portion of light reflected by first polarization selective reflector 410 and the second polarization selective reflector 420 is redirected back to the illumination source. In some embodiments, the redirected light is recycled to improve the efficiency of the illumination system 400.

In some cases, non-uniformity of an illumination pattern (e.g., non-uniformity in illumination intensities across the spatial light modulator 452) contributes to non-uniformity (or irregularity) in an image provided by the spatial light modulator 452. In some embodiments, the non-uniformity in the image is reduced by adjusting operations (e.g., reflectivities or magnitudes of phase retardation) of the spatial light modulator 452 based on, for example, a look-up pattern for the image created by the spatial light modulator 452 to compensate for variations in illumination intensities.

Although FIG. 4A shows the light 462 as a single ray of light so as not to obscure other aspects of FIG. 4A, in some embodiments, the light 462 has a beam height that is equal to or smaller than a height 402 of the first polarization selective reflector 410, along the x-direction. A beam having a beam height in the x-direction that corresponds to the height 402 may substantially fill a first portion 454 of the spatial light modulator 452. In some embodiments, instead of a single beam having a beam height corresponding to height 402, the one or more light sources 408 provide one or more beams offset along the x-direction toward the first polarization selective reflector 410. In some embodiments, the one or more beams are substantially parallel to one another. In some embodiments, the light 462 has a beam width that is equal to or smaller than a width of the first polarization selective reflector 410, along the y-direction. A beam having a beam width in the y-direction that corresponds to the width of the first polarization selective reflector 410 may substantially fill a first portion 454 of the spatial light modulator 452. In some embodiments, instead of a single beam having a beam width corresponding to the width of the first polarization selective reflector 410, the one or more light sources 408 provide one or more beams offset along the y-direction toward the first polarization selective reflector 410.

In some embodiments, the first and second polarization selective reflectors 410 and 420 are included in two beam splitter blocks (e.g., the first polarization selective reflector 410 is included in a first beam splitter block and the second polarization selective reflector 420 is included in a second beam splitter block).

In some embodiments, each beam splitter block has a shape of a rectangular prism (e.g., a cuboid). In some embodiments, the rectangular prism has a square cross section. In some embodiments, a polarization selective reflector is embedded diagonally in each rectangular prism.

In some embodiments, each beam splitter block has a shape of a triangular prism. In some embodiments, the triangular prism has a right triangle cross section. In some embodiments, a polarization selective reflector is located on a slope facet of each triangular prism (corresponding to the hypotenuse of the right triangle cross section).

In some embodiments, the two beam splitter blocks are bonded together using an optical coupling layer with a refractive index that is less than 0.05 (e.g., less than 0.05, less than 0.04, less than 0.03, less than 0.02, or less than 0.01) of the material (e.g., glass) of the beam splitters.

Figure 8A:
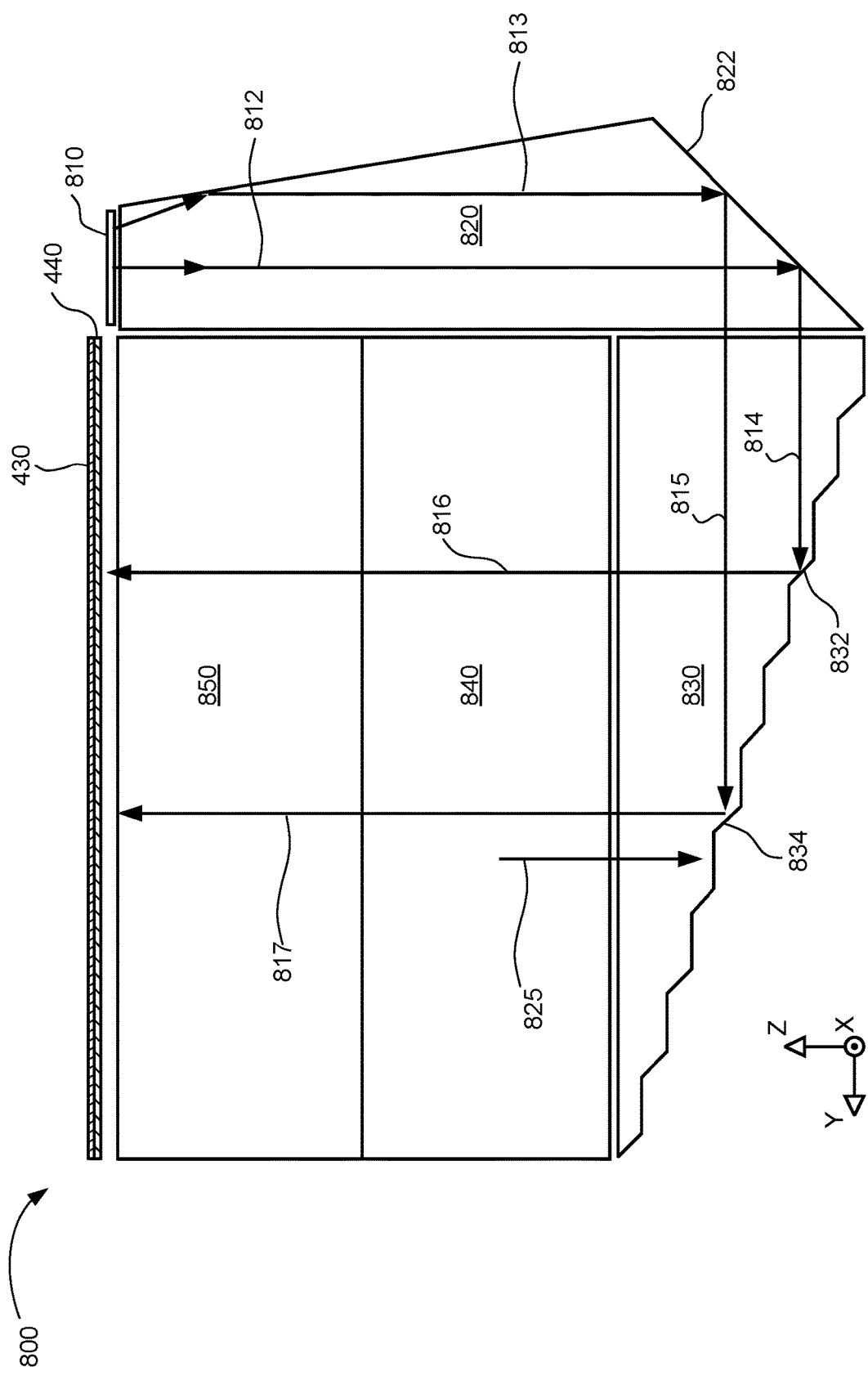
FIG. 8A is a schematic diagram illustrating an illumination system in accordance with some embodiments.
Figure 8B:
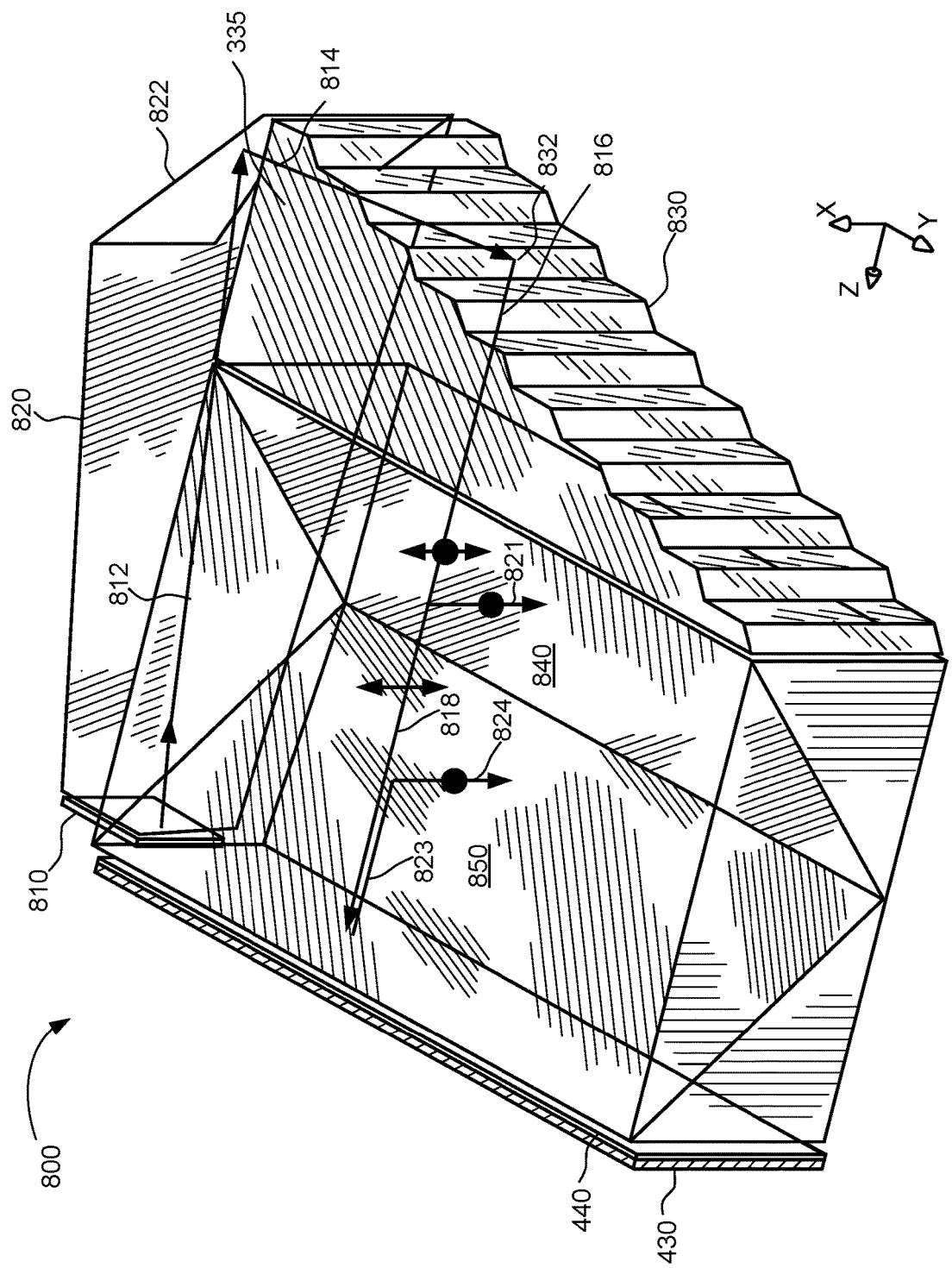
FIG. 8B is a schematic diagram illustrating a perspective view of the illumination system of FIG. 8A.

In some embodiments, the first and second polarization selective reflectors 410 and 420 are located on slopes of a beam splitter block having a shape of a triangular prism, as shown in FIG. 8B. In some embodiments, the triangular prism has an isosceles cross section.

In some embodiments, the first polarization selective reflector 410 and the second polarization selective reflector 420 (or the beam splitter blocks) have an effectively uniform refractive index. In some cases, effectively uniform refractive index means that refractive indices of the first and second polarization selective reflectors 410 and 420 differ by less than 0.05 (e.g., less than 0.04, less than 0.03, less than 0.02, or less than 0.01). In particular, the term includes a case where there is no difference in refractive indices of the first and second polarization selective reflectors 410 and 420 (or the beam splitter blocks) so that the first polarization selective reflector 410 or the second polarization selective reflector 420 do not cause refraction or total internal reflection for light impinging on the first polarization selective reflector 410 or the second polarization selective reflector 420 (e.g., at an angle of about 45° to the first polarization selective reflector 410 or the second polarization selective reflector 420).

Figure 4B:
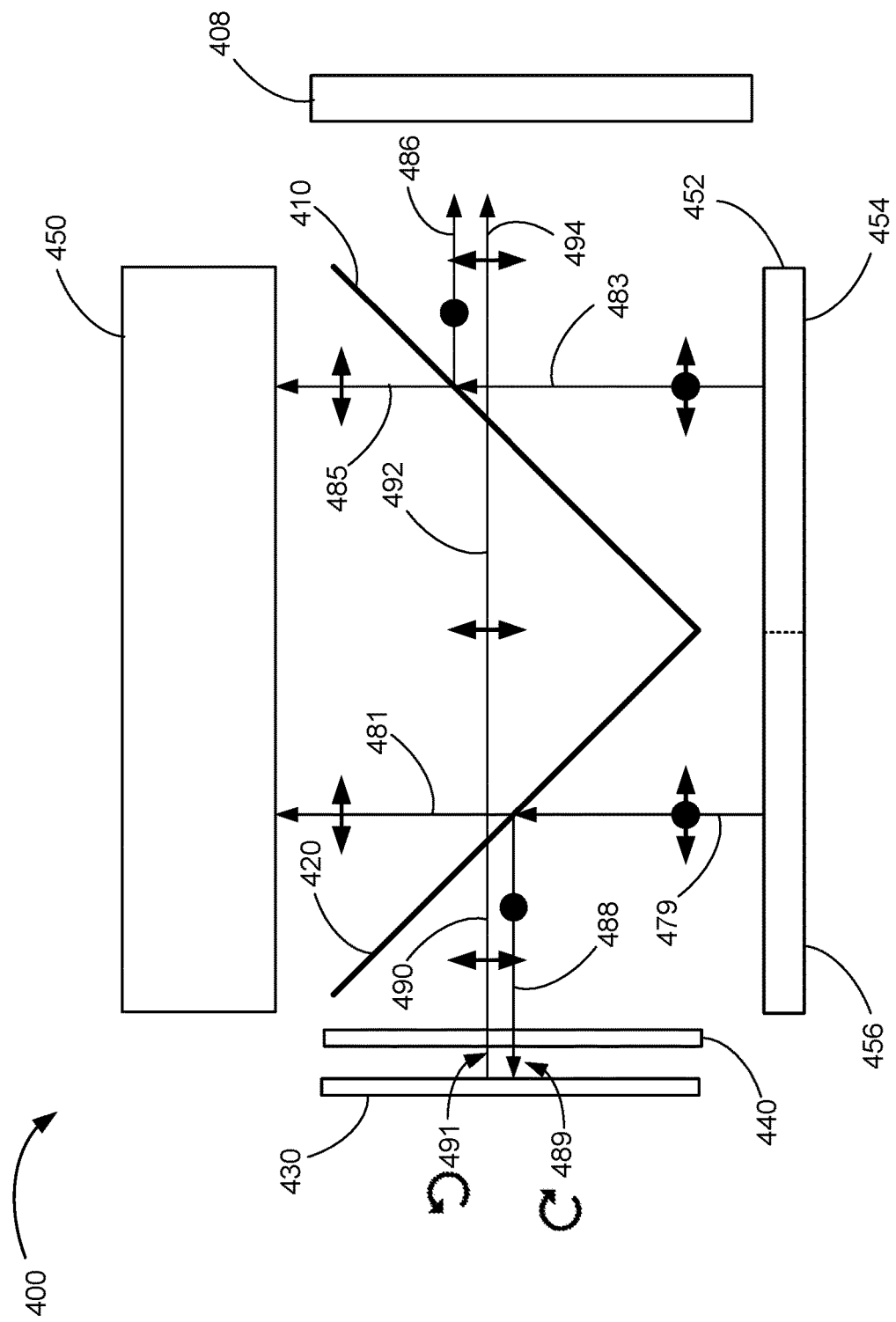
FIG. 4B is a schematic diagram illustrating optical paths of light from a spatial light modulator in the illumination system of FIG. 4A.

FIG. 4B is a schematic diagram illustrating optical paths of light from a spatial light modulator in the illumination system of FIG. 4A. As described with respect to FIG. 4A, when the reflective spatial light modulator 452 is illuminated, the spatial light modulator 452 modifies a polarization of the light incident thereon and provides (e.g., reflects) light having the modified polarization toward the first polarization selective reflector 410 and the second polarization selective reflector 420. In some embodiments, when the light provided by the spatial light modulator 452 (e.g., light 483 and 479) has components of orthogonal polarizations, the first and second polarization selective reflectors 410 and 420 transmit portions of light incident thereon and reflect portions of light incident thereon.

For example, the first portion 454 of the spatial light modulator 452 directs the light 483 having a mixture of vertically polarized light and horizontally polarized light to the first polarization selective reflector 410 (unlike the light 482 in FIG. 4A, which is vertically polarized). The first polarization selective reflector 410 reflects the horizontally polarized component of the light 483 as light 486 toward the one or more light sources 408 to recycle the light and improve an efficiency of the illumination system. The vertically polarized component of the light 483 is transmitted through the first polarization selective reflector 410 as light 485, and enters the projection system 450 as vertically polarized light. The second portion 456 of the spatial light modulator 452 directs the light 479 having a mixture of vertically polarized light and horizontally polarized light to the second polarization selective reflector 420 (unlike the light 478 in FIG. 4A, which is vertically polarized). The vertically polarized component of the light 479 is transmitted through the second polarization selective reflector 420 as light 481, and enters the projection system 450 as vertically polarized light. The second polarization selective reflector 420 reflects the horizontally polarized component of the light 479 as light 488 toward the phase retarder 440. The light 488 maintains its horizontal polarization as it reflects off the second polarization selective reflector 420. The phase retarder 440, which is a quarter-wave plate in some embodiments, converts the linearly polarized light 488 into circularly polarized light 489 and transmit the light 489 toward the mirror 430. The mirror 430 reflects the circularly polarized light 489 back toward the phase retarder 440 as light 491. When the circularly polarized light 489 is reflected by the mirror 430, a direction in which the electric field vector of the circularly polarized light 489 rotates is reversed. Thus, the circularly polarized light 491 transmitted toward the phase retarder 440 has a handedness (e.g., right-circularly polarized light) opposite to the circularly polarized light 489 (e.g., left-circularly polarized light). As the circularly polarized light 491 passes through the phase retarder 440, the phase retarder 440 converts the circularly polarized light 491 to linearly polarized light 490 (e.g., having vertical polarization) and transmits light 490 toward the second polarization selective reflector 420. In some embodiments, a plane of vibration of the linearly polarized light 490 (e.g., vertically polarized) is perpendicular to a plane of vibration of the linearly polarized light 488 (e.g., horizontally polarized), and the second polarization selective reflector 420 transmits the linearly polarized light 490 toward the first polarization selective reflector 410 as light 492. The first polarization selective reflector 410 transmits the light 492 as vertically polarized light 494 toward the one or more light sources 408 for recycling of the light.

In some embodiments, as shown in FIG. 4A, a first plane defined by the first polarization selective reflector 410 and a second plane defined by the second polarization selective reflector 420 intersect at an angle 406. In some embodiments, the angle 406 is substantially 90° (e.g., between 80° and 100°, between 85° and 95°, between 87° and 93°, or between 89° and 91°). In some embodiments, the angle 406 is 90°.

Figure 4C:
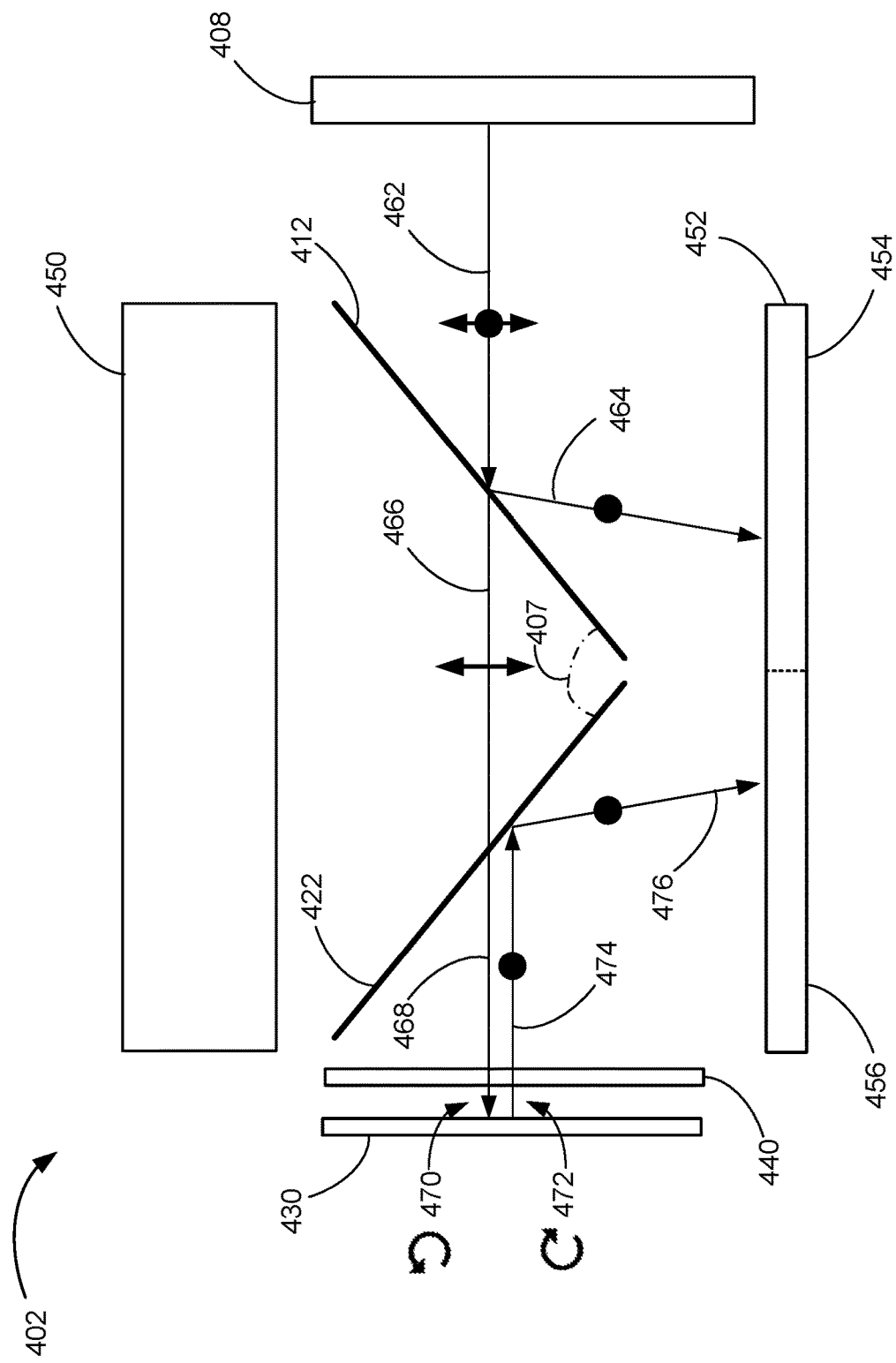
FIG. 4C is a schematic diagram of an illumination system in accordance with some embodiments.

FIG. 4C shows a first polarization selective reflector 412 positioned at an angle 407 with respect to a second polarization selective reflector 422, where the angle 407 is different from the angle 406 shown in FIG. 4A. In some embodiments, an angle 407 is greater than 90°. In some embodiments, an angle 407 is less than 90°.

Even though FIG. 4A shows the light 464 having a 45° incident angle, light from the one or more light sources 408 may have an incident angle other than 45°. In FIG. 4C, the light 462 is incident on the first polarization selective reflector 412 at an incident angle that is larger than 45°, and the light 464 is incident on the spatial light modulator 452 at an angle that differs from normal incidence (e.g., the light 464 has an incident angle that is different from 0°, which is normal incidence). Similarly, light 476, reflected by the second polarization selective reflector 422 is incident on the spatial light modulator 452 at an angle that differs from normal incidence.

In some embodiments, the first polarization selective reflector 412 is not in direct contact with the second polarization selective reflector 422. In some embodiments, the first polarization selective reflector 412 is mechanically supported independently from the second polarization selective reflector 422.

FIG. 4D illustrates how a combination of the first polarization selective reflector (e.g., 410) and the second polarization selective reflector (e.g., 420) enables a more compact illumination system by reducing a volume and a height of optical components (e.g., polarizing beam splitter(s)) compared to illumination systems that use a single polarization selective reflector. When the first polarization selective reflector 410 and the second polarization selective reflector 420 (having 90° between the two while each polarization selective reflector tilted 45° relative to the spatial light modulator 452) are used to illuminate the spatial light modulator 452 having a length 404 along the z-direction, the first polarization selective reflector 410 and the second polarization selective reflector 420 have a height 402. In comparison, when a single polarization selective reflector 490 (tilted 45° relative to the spatial light modulator 452) is used to illuminate the spatial light modulator 452 having the same length 404, the single polarization selective reflector 490 needs to have a height 493 greater than the height 402. In fact, the height 493 is twice the height 402, regardless of the magnitude of the angle, as long as the single polarization selective reflector and the pair of polarization selective reflectors are tilted relative to the spatial light modulator 452 by a same angle (e.g., when the first and second polarization selective reflectors 410 and 420 form a 120° angle, and each of the single polarization selective reflector 490 and the first and second polarization selective reflectors 410 and 420 is tilted by 30° relative to the spatial light modulator 452). Thus, replacing the single polarization selective reflector 490 with the pair of the first polarization selective reflector 410 and the second polarization selective reflector 420 allows reducing the height of the optical components by half.

In addition, in configurations, in which a respective polarization selective reflector is sandwiched and supported by a pair of right angle triangular prisms, a total volume of the right angle triangular prisms embedding the single polarization selective reflector 490 would be two time greater than a total volume of triangular prisms embedding the first polarization selective reflector 410 and the second polarization selective reflector 420. Thus, replacing the single polarization selective reflector 490 with the pair of the first polarization selective reflector 410 and the second polarization selective reflector 420 also allows reducing the total weight of the optical components by half.

Figure 5:
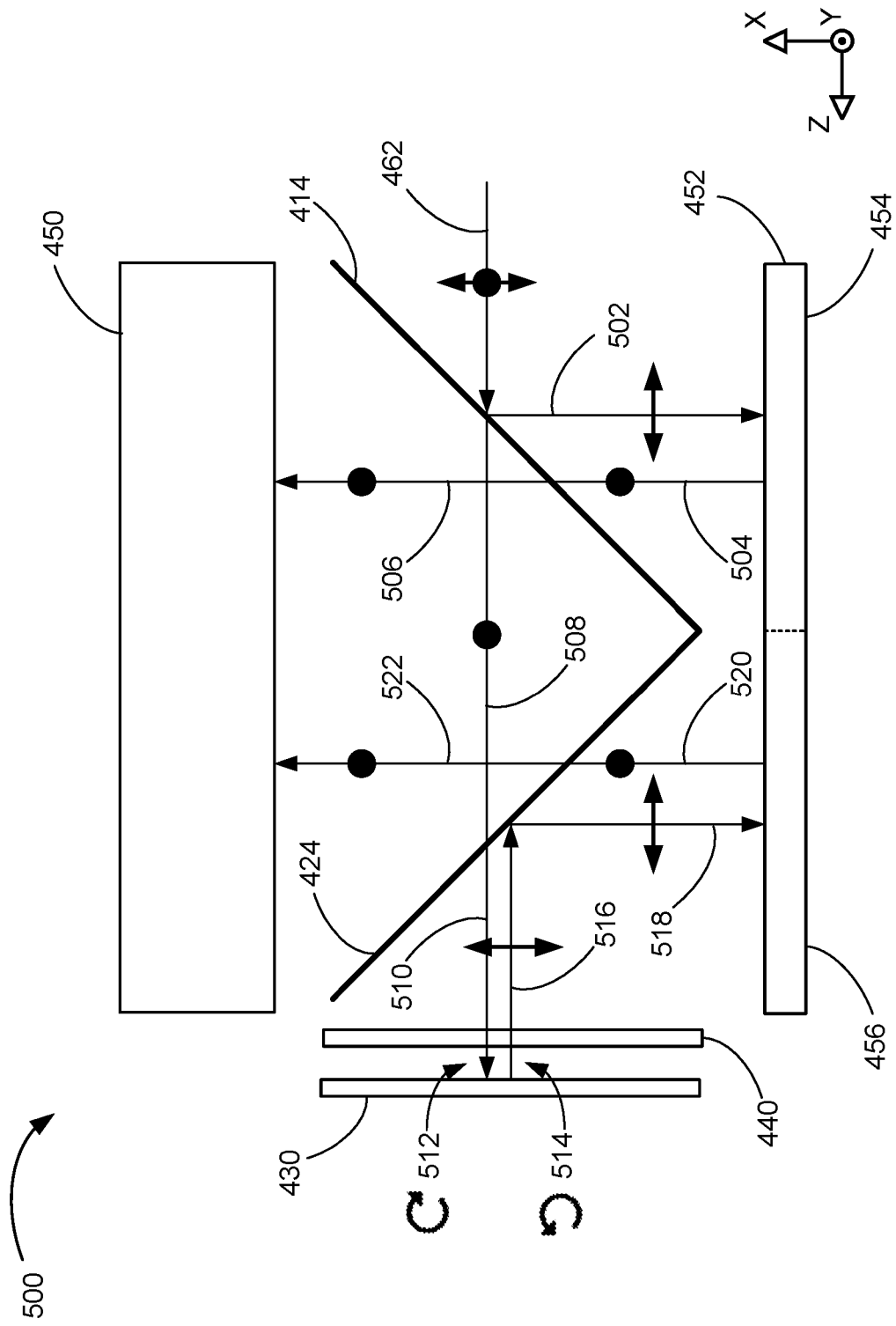
FIG. 5 is a schematic diagram illustrating an illumination system in accordance with some embodiments.

FIG. 5 shows an illumination system 500, which is similar to the illumination system 400 except that the illumination system 500 includes a first polarization selective reflector 414 and a second polarization selective reflector 424 instead of the first polarization selective reflector 410 and the second polarization selective reflector 420. The first polarization selective reflector 414 reflects vertically polarized light, and transmits horizontally polarized light, unlike the first polarization selective reflector 410, which reflects horizontally polarized light and transmits vertically polarized light.

As explained above with respect to FIG. 4A, the light 462 contains orthogonally polarized components. For example, the light 462 may be diagonally polarized, circularly polarized, elliptically polarized, or unpolarized.

The first polarization selective reflector 414 reflects a first portion (e.g., the portion that is vertically polarized) of the light 462 incident on the first polarization selective reflector 414 as light 502, toward the spatial light modulator 452. The spatial light modulator 452 receives the light 502, and depending on a setting for a particular location (e.g., pixel) of the spatial light modulator 452, modifies the light 502 (or a portion of the light 502 that impinges on the particular location of the spatial light modulator 452), and provides (e.g., reflects) the modified light as light 504 having a polarization different from the polarization of the light 502 towards the first polarization selective reflector 414. For example, the light 502, which is vertically polarized is modified by the spatial light modulator 452 to become the light 504 that is horizontally polarized. Similar to FIG. 4A, in FIG. 5, the light 502 is shown offset from the light 504 along the z-direction, even though the light 504 reflects from the spatial light modulator 452 at or close to a location where the light 502 strikes the spatial light modulator 452. The horizontally polarized light 504 directed toward the first polarization selective reflector 414 is transmitted through the first polarization selective reflector 414 as light 506 (as the first polarization selective reflector 414 is configured to transmit horizontally polarized light). The light 506 then enters the projection system 450.

The first polarization selective reflector 414 transmits a second portion (e.g., the portion that is horizontally polarized) of the light 462 as light 508, toward the second polarization selective reflector 424. In some embodiments, the first polarization selective reflector 414 and the second polarization selective reflector 424 both reflect light having vertical polarization and transmit light having horizontal polarization. The horizontally polarized light 508 is transmitted through the second polarization selective reflector 424 and maintains its horizontal polarization as light 510. In some embodiments, the linearly polarized light 510 is incident on the phase retarder 440 at a particular incident angle (e.g., less than 10° or 5°, such as 0°). In some embodiments, the phase retarder 440 is a quarter-wave plate configured to convert the linearly polarized light 510 to circularly polarized light 512 (e.g., right-circularly polarized light) and transmit the circularly polarized light 512 toward the mirror 430. For example, the quarter-wave plate may have its fast axis oriented such that a first portion of the vertically polarized light 510 accumulates a phase shift of 90° with respect to a second portion of the vertically polarized light 510, creating the circularly polarized light 512.

The mirror 430 reflects the circularly polarized light 512 toward the phase retarder 440 as light 514. When the circularly polarized light 512 is reflected by the mirror 430, a direction in which the electric field vector of the circularly polarized light 514 rotates is reversed. Thus, the circularly polarized light 514 transmitted toward the phase retarder 440 has a handedness (e.g., left-circular polarization) opposite to the circularly polarized light 512 (e.g., right-circular polarization). As the circularly polarized light 514 passes through the phase retarder 440, the phase retarder 440 converts the circularly polarized light 514 to linearly polarized light 516 and transmit the linearly polarized light 516 toward the second polarization selective reflector 424. In some embodiments, a plane of vibration of the linearly polarized light 516 (e.g., vertically polarized) is perpendicular to a plane of vibration of the linearly polarized light 510 (e.g., horizontally polarized) and the second polarization selective reflector 424 reflects the linearly polarized light 516 toward the spatial light modulator 452 as light 518. The spatial light modulator 452 modifies a polarization of the vertically polarized light 518 to form light 520 that is horizontally polarized, and directs the light 520 toward the second polarization selective reflector 424. The horizontally polarized light 520 is transmitted through the second polarization selective reflector 424 as light 522, which maintains its horizontal polarization. The light 522, which is horizontally polarized, then enters the projection system 450.

In addition to plane-polarized light (e.g., linearly polarized light, light having planar polarizations), in some embodiments, the first and second polarization selective reflectors transmit and reflect circularly polarized light.

Figure 6:
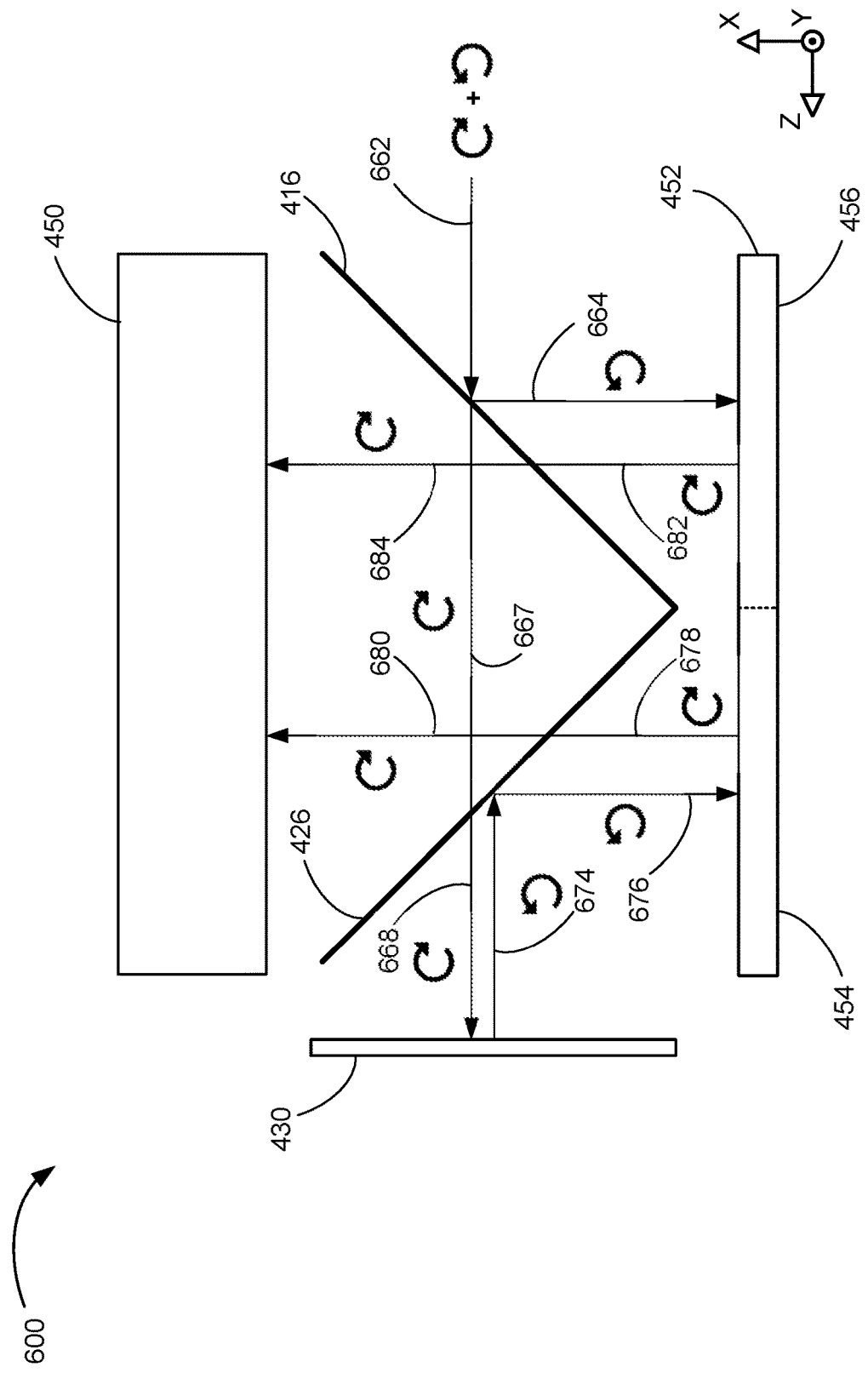
FIG. 6 is a schematic diagram illustrating an illumination system in accordance with some embodiments.

FIG. 6 show an illumination system 600 of a head-mounted display device that include similar components as illumination system 400 except that a first polarization selective reflector 416 and a second polarization selective reflector 426 are included instead of the first polarization selective reflector 412 and the second polarization selective reflector 422, and that the phase retarder 440 is not included.

In some embodiments, one or more light sources provide light 662 having a polarization which may be represented as a combination of two circularly polarized components (e.g., linearly polarized, elliptically polarized, or unpolarized).

Light having circular polarization states refers to light that has two orthogonal constituent waves (e.g., a first constituent wave oscillating in the y-z plane, and a second constituent wave oscillating in the x-z plane) having equal magnitude and a relative phase difference that differs by multiples of 90°. In such cases, a scalar amplitude of the light wave is constant but the electric-field vector of the light wave rotates in either a clockwise (e.g., right-circularly polarized light) or counter-clockwise (e.g., left-circularly polarized light) manner.

In FIG. 6, the light 662 include a first circular polarization component (e.g., right-circularly polarized component), and a second circular polarization component (e.g., left-circularly polarized component).

The light 662 is incident on the first polarization selective reflector 416. In some embodiments, the first polarization selective reflector 416 reflects a first portion (e.g., the portion that is right-circularly polarized) of the light 662 as light 664, toward the spatial light modulator 452, and transmits a second portion (e.g., the portion that is left-circularly polarized) of the light 662 as light 667. The spatial light modulator 452 receives the light 664 and depending on the setting for a particular location (e.g., pixel) of the spatial light modulator 452, modifies the light 664 (or a portion of the light 664 that impinges on the particular location of the spatial light modulator 452), and provides (e.g., reflects) light 682 having a polarization different from the polarization of the light 664 towards the first polarization selective reflector 416. For example, the light 664, which is right-circularly polarized, is modified by the spatial light modulator 452 to become light 682 that is left-circularly polarized. While In FIG. 6, the light 664 is shown offset from the light 682 along the z-direction for clarity, the light 682 reflects from the spatial light modulator 452 at or close to a location where the light 664 strikes the spatial light modulator 452. The left-circularly polarized light 682 directed toward the first polarization selective reflector 416 is transmitted through the first polarization selective reflector 416 as light 684, while maintaining its left-circular polarization. The light 684 then enters the projection system 450.

As explained above, the first polarization selective reflector 416 transmits the second portion (e.g., the portion that is left-circularly polarized) of the light 662 as light 667, toward the second polarization selective reflector 426. In some embodiments, the first polarization selective reflector 416 and the second polarization selective reflector 426 both reflect light having right-circular polarization and transmit light having left-circular polarization. The left-circularly polarized light 667 is transmitted through the second polarization selective reflector 426 and maintains its left-circular polarization as light 668. In some embodiments, the left-circularly polarized light 668 is incident on the mirror 430 at a particular incident angle (e.g., at an incident angle less than 10° or 5°, such as 0°).

The mirror 430 reflects (e.g., retroreflect) the circularly polarized light 668 toward the second polarization selective reflector 426 as light 674. When the circularly polarized light 668 is reflected by the mirror 430, a direction in which the electric field vector of the circularly polarized light 668 rotates is reversed. Thus, the circularly polarized light 674 reflected toward second polarization selective reflector 426 has a handedness (e.g., right-circularly polarized light) opposite to the circularly polarized light 668 (e.g., left-circularly polarized light). The second polarization selective reflector 426 reflects the right-circularly polarized light 674 toward the spatial light modulator 452 as light 676, while maintaining its right-circular polarization.

The spatial light modulator 452 modifies a polarization of the right-circularly polarized light 676 to form light 678 that is left-circularly polarized, and directs the light 678 toward the second polarization selective reflector 426. The left-circularly polarized light 678 is transmitted through the second polarization selective reflector 426 as light 680, while maintaining its left-circular polarization. The light 680, which is left-circularly polarized, then enters the projection system 450.

Although the first polarization selective reflector 416 and the second polarization selective reflector 426 in FIG. 6 are described as capable of reflecting the right-circularly polarized light and transmitting the left-circularly polarized light, in some embodiments, the first polarization selective reflector 416 and the second polarization selective reflector 426 configured to reflect the left-circularly polarized light and transmit the right-circularly polarized light are used.

Although FIGS. 4A, 4C, 5, and 6 illustrate illumination systems in which both the first polarization selective reflector and the second polarization selective reflector are configured to reflect light having a first polarization and transmit light having a second polarization different from the first polarization, an illumination system may be configured with two polarization selective reflectors that are configured to reflect light having different polarizations (and transmit light having different polarizations). Thus, in some embodiments, an illumination system includes (i) a first polarization selective reflector configured (e.g., positioned and/or oriented) to reflect light having a first polarization and transmit light having a second polarization and (ii) a second polarization selective reflector configured (e.g., positioned and/or oriented) to reflect light having the second polarization and transmit light having the first polarization. For example, the first polarization selective reflector may reflect light having horizontal polarization and transmit light having vertical polarization and the second polarization selective reflector may reflect light having vertical polarization and reflect light having horizontal polarization. In another example, the first polarization selective reflector may reflect light having vertical polarization and transmit light having horizontal polarization and the second polarization selective reflector may reflect light having horizontal polarization and reflect light having vertical polarization. In such embodiments, the illumination system includes a polarization retarder (e.g., a half-wave plate). In some embodiments, the polarization retarder is located between the first polarization selective reflector and the second polarization selective reflector. In some embodiments, the polarization retarder is located on the first polarization selective reflector or the second polarization selective reflector (e.g., the polarization retarder is integrated with the first polarization selective reflector). In some embodiments, the polarization retarder converts a vertically polarized light from the first polarization selective reflector to a horizontally polarized light, or vice versa.

Figure 7A:
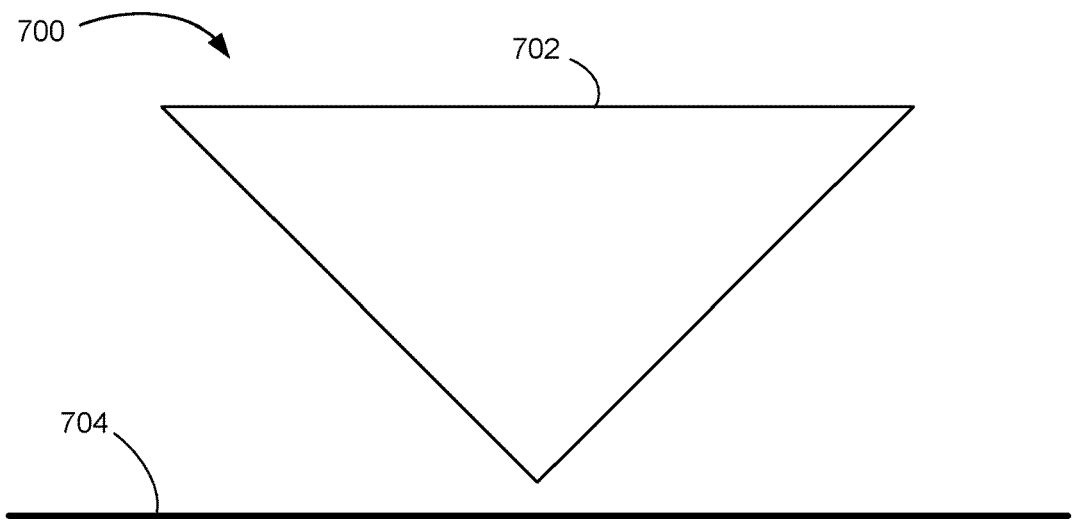
FIGS. 7A-7C illustrates methods for forming a first polarization selective reflector and a second polarization selective reflector in accordance with some embodiments.
Figure 7B:
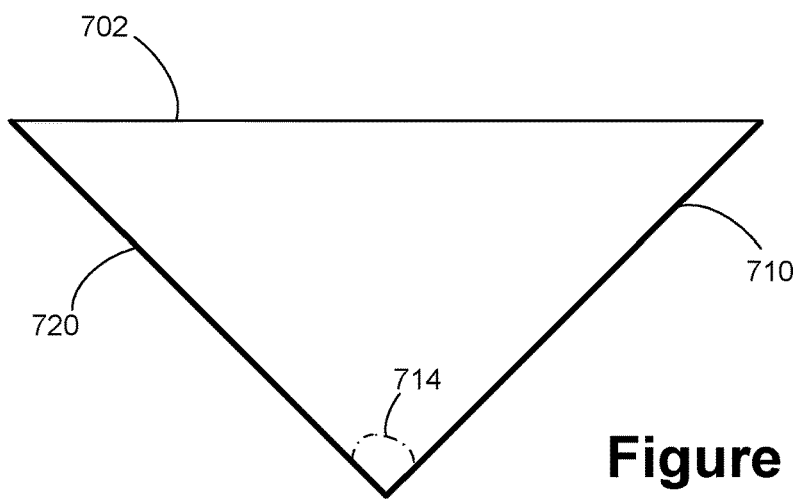
Figure 7C:
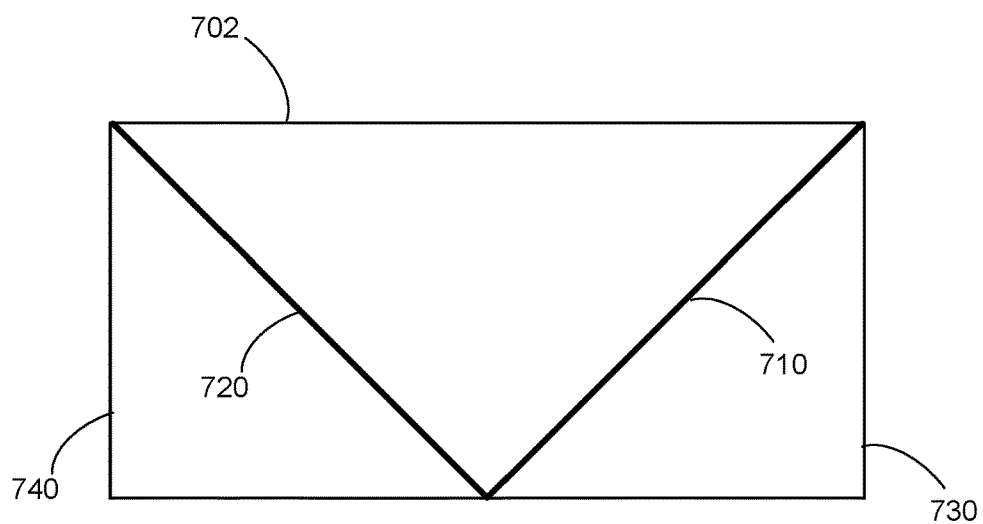

FIGS. 7A-7C show a method 700 of forming a first polarization selective reflector and a second polarization selective reflector into an integral optical component.

In some embodiments, a prism 702 is used to form the integral optical component. In some embodiments, the prism 702 is a right-angle prism. In some embodiments, the prism 702 has a base that has a shape of an isosceles triangle. In some embodiments, the prism 702 is a right-angle prism having a base that is an isosceles right-angle triangle. In some embodiments, the prism 702 is made of glass, including glasses with a high index of refraction. In some embodiments, the prism 702 is made of polymers, for example, polymers with a low birefringence. In some embodiments, glasses with a high index of refraction has an index of refraction greater than 1.52.

Suitable polymers include polydimethyl siloxane, polymethylmethacrylate, cyclic polyolefins, polymers made from oligomers, and other polymers that can form optical components having low birefringence.

In some embodiments, a polarization selective film 704 is used to form the integral optical component. In some embodiments, the polarization selective film 704 is a wire grid polarizer film, a birefringent optical film, a cholesteric polarization selective film, or any combination thereof.

In some embodiments, the prism 702 and/or the polarization selective film 704 are coated with an adhesive and/or a primer. In some embodiments, two lateral surfaces of the prism 702 are coated with an adhesive and/or a primer. In some embodiments, the primer is an undercoat that is a preparatory coating put on the prism 702 or the polarization selective film 704. In some embodiments, priming allows better adhesion to a surface of the prism 702. In some embodiments, priming allows better adhesion to a surface of the polarization selective film 704. Better adhesion increases durability, and provides additional protection for the prism 702 and/or the polarization selective film 704. In some embodiments, the adhesive and the primer are optically transparent (e.g., at least for visible light).

In some embodiments, the integral optical components includes a first prism, and the first polarization selective reflector 710 is disposed on a first surface of the first prism 702 and the second polarization selective reflector 720 is disposed on a second surface of the first prism 702.

In some embodiments, a method of manufacturing the polarization selective reflector includes bonding two polarizing beam splitters together with an adhesive. In some embodiments, the adhesive has a similar refractive index to the prism 702 or the polarization selective reflector film 704 over the wavelengths of interest. In some embodiments, the wavelengths of interest span between 350 nm to 900 nm. In some embodiments, the wavelengths of interest span one or more shorter ranges at each of red, green, or blue (e.g., 564-580 nm for red; 534-545 nm for green; and 420-440 nm for blue) spectra.

In some embodiments, instead of using adhesive or primer, the polarization selective film 704 is simply conformed to the prism 702. In some embodiments, conforming the film 704 includes slightly stretching or heating the film 704, which allows some of the electrons on the surface to be removed from the film 704, creating patches of positive and negative electrostatic charge. When the film 704 is a good insulator, this charge persists for a sufficient period of time to induce an opposite charge in the other surface (e.g., the prism 702) to cause the film 704 to conform to the prism 702.

After the film 704 and the prism 702 are joined adhesively or conformally such that the film 704 covers two surfaces of the prism 702, the first surface of the prism 702 serves as a first polarization selective reflector 710, while the second surface of the prism 702 serves as a second polarization selective reflector 720. The first polarization selective reflector 710 and the second polarization selective reflector 720 define an angle 714 between them. In some embodiments, the angle 714 is a right angle.

FIG. 7C shows the prism 702 coupled with mating prisms 730 and 740.

In some embodiments, the mating prisms 730 and 740 are attached to the first polarization selective reflector 710 and the second polarization selective reflector 720, respectively. In some embodiments, the mating prisms 730 and 740 are cast and cured using a suitable resin. Suitable resins include polymers with a low birefringence, such as, for example, polydimethyl siloxane, polymethylmethacrylate, cyclic polyolefins, polymers made from oligomers, and other polymers that form optical components having low birefringence. In some embodiments, the mating prims 730 and 740 integrated with polarization selective reflectors (e.g., the mating prism 730 is coupled with the first polarization selective reflector 710 and the mating prism 740 is coupled with the second polarization selective reflector 720) are attached to the prism 702 to form the integral optical component.

In some embodiments, a beam splitter assembly includes a second prism (e.g., a mating prism 740) and a third prism (e.g., a mating prism 730). The second prism is in contact with the second polarization selective reflector (e.g., a second polarization selective reflector 720), and the third prism is in contact with the first polarization selective reflector (e.g., a first polarization selective reflector 710).

In some embodiments, a method of manufacturing a polarizing beam splitter includes providing a prism with an isosceles right angle triangular profile (e.g., the prism 702), applying a reflective polarizer to the two isosceles angle faces (e.g., polarization selective film 704), and immersing the prism into material to form an approximately rectangular profile (e.g., molding a rectangular prism with the embedded polarization selective reflectors 710 and 720).

FIG. 8A shows a plan view of an illumination system 800 in accordance with some embodiments. In FIG. 8A, the illumination system 800 includes light source 810, a tapered integrator 820, a first mirror 822, a Fresnel reflector 830, a first polarization selective reflector 840 and a second polarization selective reflector 850. In some embodiments, the Fresnel reflector includes a series of long, narrow, shallow-curvature (or even flat) mirrors to direct (e.g., focus, collimate) light toward the first polarization selective reflector 840. In some embodiments, the first polarization selective reflector 840 is a polarizing beam splitter. In some embodiments, the second polarization selective reflector 850 is a polarizing beam splitter. In FIG. 8A, the illumination system 800 also includes the phase retarder 440 (when the light source 80 emits light having planar polarization(s)) and the mirror 430.

In some embodiments, light 812 emitted by the light source 810 is partially collimated and homogenized by the tapered integrator 820. The light 812 reflects off the first mirror 822 at a wider end of the tapered integrator 820. In some embodiments, the first mirror 822 includes a reflective coating disposed on a surface of the wider end of the tapered integrator 820. The light 812 reflects at the first mirror 822 as light 814 and the light 814 is reflected again at a surface 832 of the Fresnel reflector 830 as light 816. In some embodiments, the light 814 makes a right angle with respect to the light 812. In some embodiments, the light 816 makes a right angle with respect to the light 814 such that the light 816 propagates in a direction counter to a propagation direction of the light 812 (e.g., the light 816 is anti-parallel to the light 812). In some embodiments, the light 812, 814 and 816 lie in the same y-z plane.

In some embodiments, the light source 810 has a divergence and emits light 813 that is not parallel to the light 812 upon emission from the light source 810. After reflecting off a side surface of the integrator 820, the light 813 is substantially parallel to the light 812. Thus, the integrator 820 collimates the light emitted from the light source 810. After the light 813 is reflected by the first mirror 822 as light 815, the light 815 is substantially parallel to the light 814. The light 815 after reflecting off a surface 834 of the Fresnel reflector 830 becomes light 817, which is substantially parallel to the light 816.

In some embodiments, the light 816 follows a similar optical path as the vertically polarized light 466 shown in FIG. 4A.

In some embodiments, light 825 follows the optical path of the vertically polarized light 494 or the light 486 described in FIG. 4B. The light 825 is directed back toward the light source 810 for recycling of the illumination light. The intermediate paths of the light (e.g., reflection of the light by the reflector 430, the first polarization selective reflector 840, or the second polarization selective reflector 850, before the light is directed as light 825) are not shown in FIG. 8A so as not to obscure other aspects of the illumination system 800.

In some embodiments, the illumination system 800 is optically coupled with the spatial light modulator 452 (not shown in FIG. 8A). When the illumination system 800 is optically coupled with the spatial light modulator 452, the spatial light modulator 452 may be positioned to lie on a y-z plane below the plane of the drawing of FIG. 8A, as shown in, for example, FIG. 4A.

In some embodiments, the first polarization selective reflector 840 and the second polarization selective reflector 850 are not disposed on the same right-angle prism as shown in FIG. 7B. Instead, the first polarization selective reflector 840 is disposed on a first prism (e.g., mating prism 730 of FIG. 7C) and the second polarization selective reflector 850 is disposed on a second prism (e.g., mating prism 740 of FIG. 7C) that is separate from the first prism.

In some embodiments, the light not reflected by the first polarization selective reflector 840 toward the spatial light modulator (e.g., the light 466 in FIG. 4A that is transmitted toward the second polarization selective reflector 420) will propagate in free space instead of through a prism (e.g., prism 702 in FIG. 7B). In some embodiments, light that is reflected by the first polarization selective reflector 840 travels through the first prism (e.g., mating prism 730) before it illuminates the spatial light modulator 452.

FIG. 8B shows the illumination system 800 in a perspective view. The light source 810 emits the light 812, which propagates through the tapered integrator 820. The light 812 reflects off the first mirror 822 as light 814. The light 814 is reflected again at the surface 832 of the Fresnel reflector 830 as the light 816.

In some embodiments, the light 816 includes two orthogonal planar polarization components (e.g., vertically polarized light and horizontally polarized light). The first polarization selective reflector 840 transmits vertically polarized light 818 toward the second polarization selective reflector 850, and reflects horizontally polarized light 821 along the −x direction, toward a spatial light modulator (not shown).

The vertically polarized light 818 transmits through the second polarization selective reflector 850, and impinges on the phase retarder 440, which is a quarter-wave plate configured to convert the linearly (e.g., vertically) polarized light 818 to circularly polarized light (e.g., left-circularly polarized light) and transmit the circularly polarized light toward the mirror 430. The mirror 430 reflects the circularly polarized light and reverses the handedness of the circularly polarized light. As the circularly polarized light passes through the phase retarder 440, the phase retarder 440 converts the circularly polarized light to linearly polarized light 823 and transmit the linearly polarized light 823 toward the second polarization selective reflector 850. In some embodiments, a plane of vibration of the linearly polarized light 823 (e.g., horizontally polarization) is perpendicular to a plane of vibration of the linearly polarized light 818 (e.g., vertically polarization), and the second polarization selective reflector 850 reflects the linearly polarized light 823 toward the spatial light modulator (not shown), along the −x direction as light 824.

Figure 9:
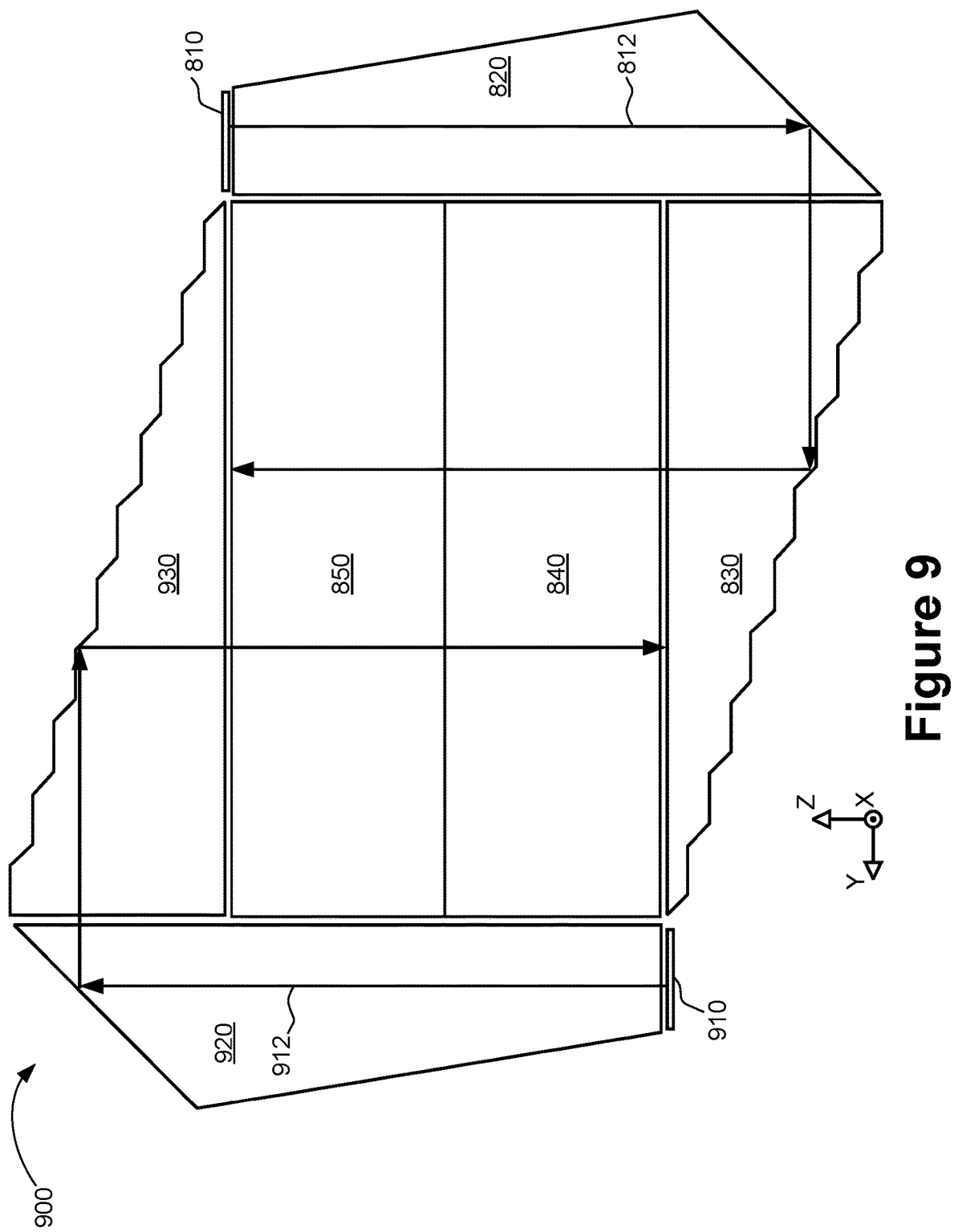
FIG. 9 is a schematic diagram illustrating an illumination system in accordance with some embodiments.

In some embodiments, as shown in FIG. 9, an illumination system 900 includes two light sources 810 and 910. Light 912 emitted by the light source 910 follows a similar path as the light 812 emitted by the light source 810. The light 912 enters a second integrator 920, reflects off a second Fresnel reflector 930 and is first incident on the second polarization selective reflector 850, instead of the first polarization selective reflector 840. This configuration eliminates the need for a reflector and a phase retarder shown in FIG. 8A.

In some embodiments, directional backlights or other means provide suitable illumination to the first polarization selective reflector 840 and the second polarization selective reflector 850. In some embodiments, the light sources emit polarized light (e.g., the light source is a laser configured to provide a polarized light). In some embodiments, the light sources emit unpolarized light, and light having a polarization that is transmitted by the two polarization selective reflectors is recycled by the opposing light source. In some embodiments, a reflective or absorbing polarizer is placed in the path of the light between the light sources and the first or second polarization selective reflector to modify the polarization of the light. In some embodiments, additional mirror coatings and optional quarter wave retarders are used, which may further increase an efficiency of the system 900.

In some embodiments, at least 25% of light reflected by the spatial light modulator 452 (e.g., LCoS) is recycled by the illumination system.

Figure 10A:
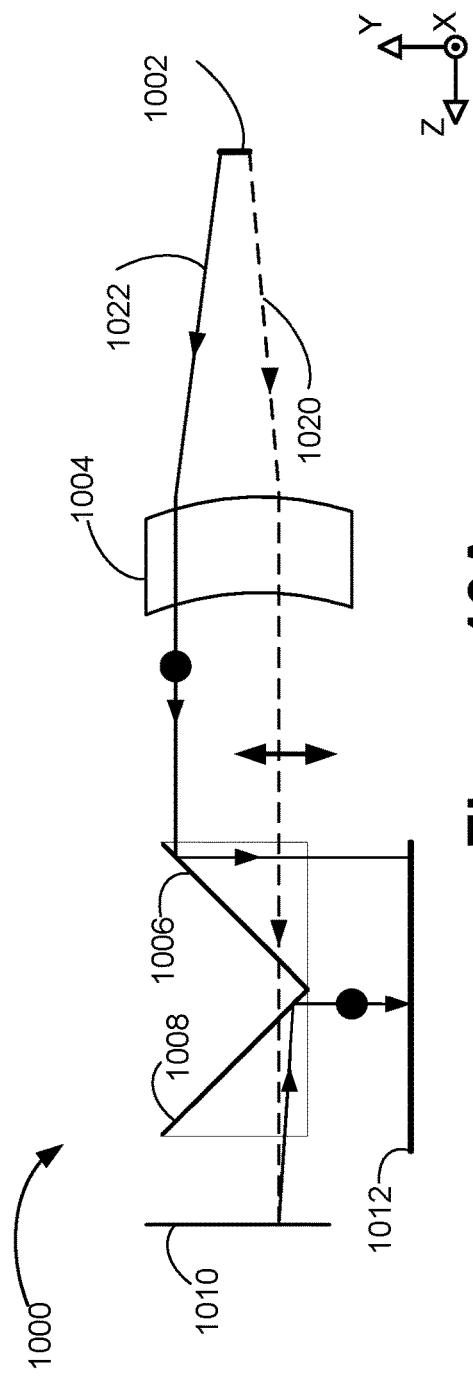
FIG. 10A is a schematic diagram illustrating an illumination system in accordance with some embodiments.

FIG. 10A shows a system 1000 in accordance with some embodiments. The system 1000 includes light source 1002. In some embodiments, the light source 1002 emits light having two orthogonal polarization components. In some embodiments, the light source 1002 emits unpolarized light. In some embodiments, the light source is an LED. Light 1022 represents an example ray having horizontal polarization, and light 1020 represents an example ray having vertical polarization. In FIG. 10A, the light 1020 and 1022 are illustrated as traveling in different directions from the light source 1002 for clarity. The light 1020 and the light 1022 pass through a lens 1004 that collimates and/or homogenizes the light. Both the light 1020 and the light 1022 impinge upon a first polarization selective reflector 1006. In some embodiments, the first polarization selective reflector 1006 selectively reflects the horizontally polarized light toward a spatial light modulator 1012, while the vertically polarized light 1020 is transmitted through the first polarization selective reflector 1006 toward a second polarization selective reflector 1008. A mirror and quarter-wave plate combination 1010 receives the light 1020 from the second polarization selective reflector 1008 and reflects a horizontally polarized light back toward the second polarization selective reflector 1008. The second polarization selective reflector 1008 reflects the horizontally polarized light toward the spatial light modulator 1012.

Figure 10B:
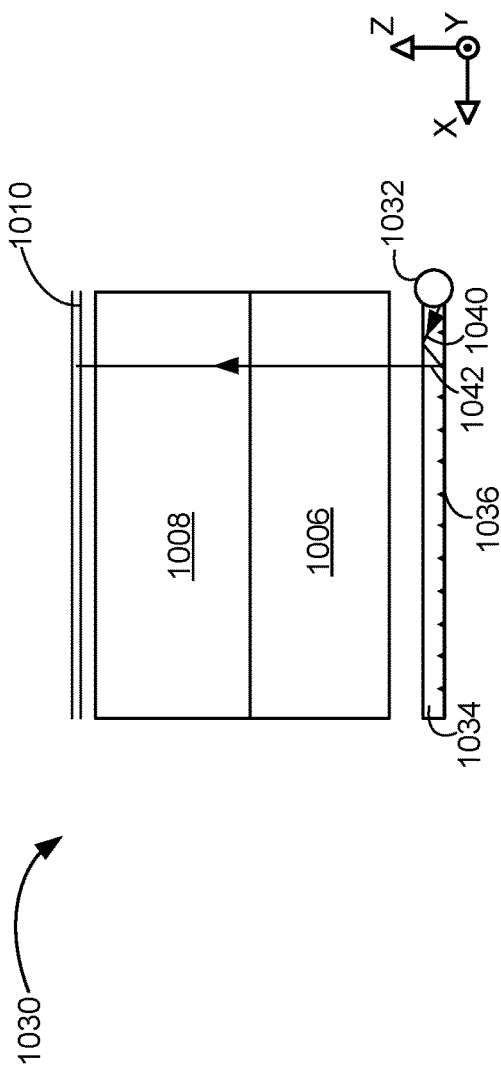
FIG. 10B is a schematic diagram illustrating an illumination system in accordance with some embodiments.

FIG. 10B shows a system 1030. The system 1030 includes light source 1032 and light guide 1034. In some embodiments, the light guide 1034 has a small size, which enables a compact illumination system. The light guide 1034 has a number of extraction features 1036. The extraction features 1036 allow portions of light propagating within the light guide 1034 to exit the light guide 1034. In some embodiments, the light guide 1034 provides directional illumination to match an imaging F-number of a projector (e.g., projection system 450).

The light source 1032, edge-coupled to the light guide 1034, emits light 1040, which is guided (e.g., via total internal reflection) along the light guide 1034. In some embodiments, the light source 1032 is an LED light source. In some embodiments, when the light 1040 impinges on one of the extraction features 1036, the extraction feature steers the light 1040 as light 1042 so that the light 1042 exits the light guide 1034 (e.g., the light 1042 does not meet the total internal reflection condition on an opposite surface of the light guide 1034 and leaves the light guide 1034 to impinge on the first polarization selective reflector 1006). The illumination is directional and is tuned by the shape of the extraction features. In some embodiments, other directional light guide are used, for example, a light guide with shallow prism extractors, where the light leaks out at grazing incident angles. In some embodiments, the shallow prism extractors are combined with a turning film to provide a directional and uniform illumination. In some embodiments, the light 1042 follows a path that is similar to that of either light 1022 or light 1020 (depending on the polarization of the light 1042), described with respect to FIG. 10A.

Many illumination configurations are compatible with the system 1030. In some embodiments, the system 1030 having the "split prism" configuration with the first polarization selective reflector 1006 and the second polarization selective reflector 1008 is coupled with the traditional fly's eye homogenizer illumination. In some embodiments, an LED array is used in conjunction with a taper array or a micro-lenslet array.

Hereinafter, a "split prism" configuration refers to (e.g., V-shaped) arrangements of the first polarization selective reflector and the second polarization selective reflectors, for example, as shown in FIGS. 4A-10B.

In some embodiments, the polarization selective reflectors in the "split prism" arrangements described in FIGS. 4A-10B, are polarization volume holograms instead of reflective polarizers. For example, in some embodiments, a first PVH is positioned in a first orientation, and a second PVH is positioned in a second orientation non-parallel to the first orientation, and adjacent to the first polarization selective reflector.

Figure 11A:
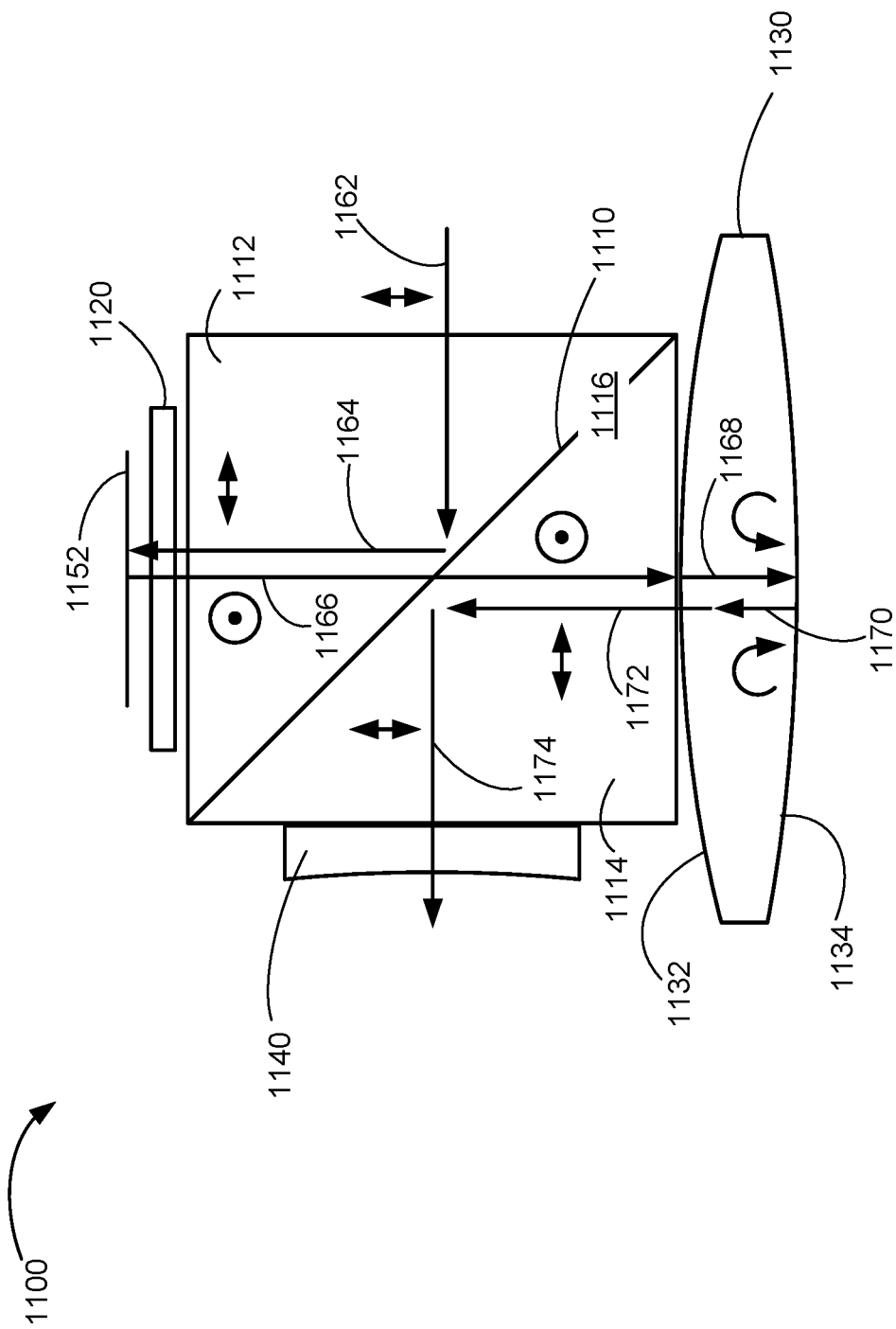
FIG. 11A is a schematic diagram illustrating a projection system in accordance with some embodiments.

FIG. 11A is a schematic diagram illustrating a projection system in accordance with some embodiments.

In FIG. 11A, a projection system 1100 receives illumination light from one or more light sources (similar to light source 810, not shown in FIG. 11A). The projection system 1100 includes a first polarization selective reflector 1110, a projection lens 1130, a phase retarder 1132 disposed on a first surface of the projection lens 1130 (e.g., the surface closer to the spatial light modulator 1152 than an opposing, second surface of the projection lens 1130), a reflective coating 1134 disposed on the second surface of the projection lens 1130 (e.g., the surface further from the spatial light modulator 1152 than the first surface). In some embodiments, the projection system 1100 is optically coupled to a spatial light modulator (SLM) 1152 for transmitting light from the spatial light modulator. In FIG. 11A, the projection system 1100 is also configured to illuminate the spatial light modulator 1152. In some embodiments, the projection system 1100 also includes an optics 1140 (e.g., one or more lenses) that directs light to a waveguide (not shown) used for coupling light output from the projection system 1100 into an eyebox of a user. In some embodiments, the optics 1140 is absent from the projection system 1100. In some embodiments, the projection system 1100 includes a cover glass 1120. In some embodiments, the cover glass 1120 is located between the first polarization selective reflector 1110 and the spatial light modulator 1152. In some embodiments, the cover glass 1120 is absent from the projection system 1100.

In some embodiments, the first polarization selective reflector 1110 is disposed along a diagonal of a beam splitter assembly 1116. The beam splitter assembly 1116 includes a first prism 1112 and a second prism 1114. In some embodiments, the first prism 1112 is a right-angle prism having a hypotenuse (or a slope facet). In some embodiments, the second prism 1114 is a right-angle prism having a hypotenuse (or a slope facet). In some embodiments, the first polarization selective reflector 1110 is disposed between the first prism 1112 and the second prism 1114, parallel to the hypotenuse (or the slope facet) of the first prism 1112 and the hypotenuse (or the slope facet) of the second prism 1114. In some embodiments, the first polarization selective reflector 1110 is in contact with the slope facet of the first prism 1112 and the slope facet of the second prism 1114.

In some embodiments, the projection system 1100 includes one or more polarization filtering elements. In some embodiments, at least one polarization filtering element is located between the first polarization selective reflector 1110 and the one or more light sources (e.g., adjacent to a surface of the beam splitter assembly 1116 away from the optics 1140) for reducing transmission of light (or a component thereof) having a particular polarization (e.g., the projection system 1100 is configured to operate with a vertically polarized light as an input, a polarization filtering element is used to reduce transmission of a horizontally polarized light into the beam splitter assembly 1116). In some embodiments, at least one polarization filtering element is located between the beam splitter assembly 1116 and the optics 1140 for reducing transmission of light having a particular polarization (e.g., when the projection system 1100 is configured to provide light having a vertical polarization, a polarization filtering element is used to reduce transmission of a horizontally polarized light output from the beam splitter assembly 1116). In some embodiments, the polarization filtering element is a polarization selective reflector configured to reflect light having a first polarization (e.g., undesired horizontal polarization) orthogonal to a second polarization (e.g., desired vertical polarization), and transmit light of the second polarization.

In some embodiments, one or more light sources provide light 1162 having a single polarization state. In some embodiments, the single polarization state is a planar polarization state. In some embodiments, the light 1162 is vertically polarized and the first polarization selective reflector 1110 is configured to reflect vertically polarized light. The first polarization selective reflector 1110 reflects at least a portion of the light 1162 as light 1164, toward the spatial light modulator 1152, while the light 1164 maintains its vertical polarization. In some embodiments, in which the projection system 1100 includes the cover glass 1120, the light 1164 passes through the cover glass 1120 before impinging on the spatial light modulator 1152.

The spatial light modulator 1152 receives the light 1164, and depending on a setting for a particular location (e.g., pixel) of the spatial light modulator 1152, modifies the light 1164 (or a portion of the light 1164 that impinges on the particular location of the spatial light modulator 1152), and provides (e.g., reflects) the modified light as light 1166 having a polarization (e.g., horizontally polarization) different from the polarization (e.g., vertically polarization) of the light 1164 towards the first polarization selective reflector 1110.

In some embodiments, the light 1166 is horizontally polarized. The first polarization selective reflector 1110 directs the horizontally polarized light 1166 (e.g., transmits the horizontally polarized light 1166) toward the projection lens 1130. The phase retarder 1132 modifies the polarization of the light 1166. For example, in configurations, in which the phase retarder 1132 is a quarter-wave plate, the quarter-wave plate turns the light 1166 into circularly polarized light 1168 and transmit the light 1168 toward the reflective coating 1134. The reflective coating 1134 reflects the circularly polarized light 1168 toward the phase retarder 1132 as circularly polarized light 1170. When the circularly polarized light 1168 is reflected by the reflective coating 1134, a direction in which the electric field vector of the circularly polarized light 1168 rotates is reversed. Thus, the circularly polarized light 1170 reflected toward the phase retarder 1132 has a handedness (e.g., left-circularly polarized light) opposite to the circularly polarized light 1168 (e.g., right-circularly polarized light). As the circularly polarized light 1170 passes through the phase retarder 1132, the phase retarder 1132 converts the circularly polarized light 1170 to linearly polarized light 1172 and transmits it toward the first polarization selective reflector 1110. In some embodiments, a plane of vibration of the linearly polarized light 1172 (e.g., vertically polarized) is perpendicular to a plane of vibration of the linearly polarized light 1166 (e.g., horizontally polarized), and the first polarization selective reflector 1110 reflects the linearly polarized light 1172 toward the optics 1140 as light 1174.

In some embodiments, the projection lens 1130 has an optical power (e.g., at least one of the first surface and the second surface of the projection lens 1130 is curved). For example, at least one of the first surface and the second surface of the projection lens 1130 may be a convex surface. Additionally or alternatively, at least one of the first surface and the second surface of the projection lens 1130 may be a concave surface. In some embodiments, the projection lens 1130 projects the light from the spatial light modulator 1152 to form an image at an image plane. In some embodiments, the projection lens 1130 has no optical power (e.g., the projection lens 1130 is replaced with a flat substrate).

Figure 11B:
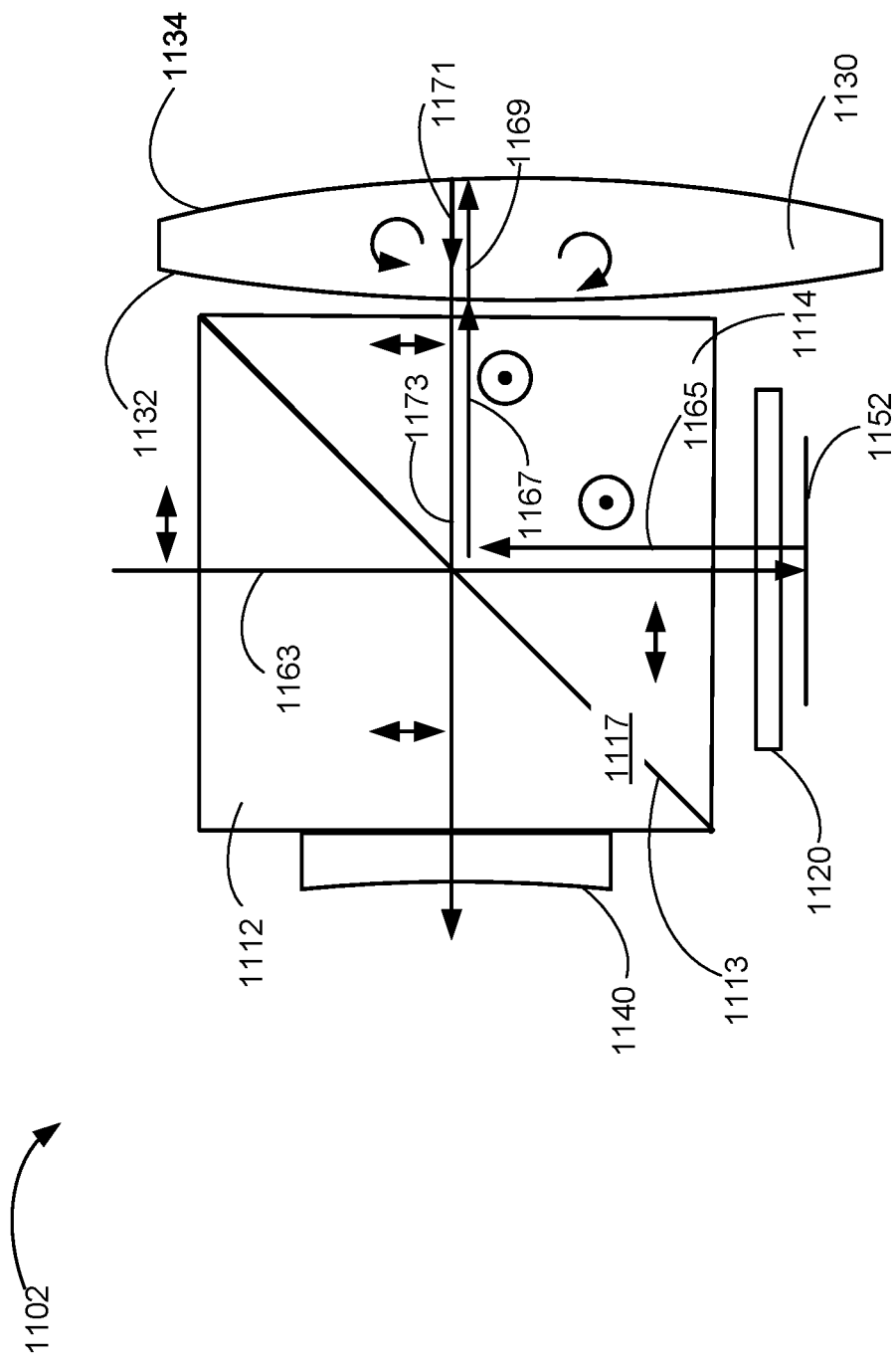
FIG. 11B is a schematic diagram illustrating a projection system in accordance with some embodiments.

FIG. 11B is a schematic diagram illustrating a projection system 1102 in accordance with some embodiments. The projection system 1102 is similar to the projection system 1100 except that, in the projection system 1102, the spatial light modulator 1152 and the reflective coating 1134 are not located on opposite sides of a beam splitter assembly, whereas, in the projection system 1100, the spatial light modulator 1152 and the reflective coating 1134 are located on opposite sides of the beam splitter assembly 1116.

The projection system 1102 receives illumination light 1163 from one or more light sources (not shown). The projection system 1102 is arranged so that a first polarization selective reflector 113 directs the light 1163 (e.g., transmits the light 1163) to the spatial light modulator 1152 (through the cover glass 1120 if the cover glass 1120 is included in the projection system 1102). In some embodiments, the first polarization selective reflector 1113 is disposed along a diagonal of a beam splitter assembly 1117.

In some embodiments, the one or more light sources provide the light 1163 having a single polarization state. In some embodiments, the light 1163 has a single planar polarization state (e.g., linear polarization). In some embodiments, the light 1163 is vertically polarized and the first polarization selective reflector 1113 is configured to transmit vertically polarized light toward the spatial light modulator 1152. In some embodiments with the cover glass 1120, the light 1163 passes through the cover glass 1120 before impinging on the spatial light modulator 1152.

The spatial light modulator 1152 receives the light 1163, and depending on a setting for a particular location (e.g., pixel) of the spatial light modulator, modifies the light 1163 (or a portion of the light 1163), and provides (e.g., reflects) the modified light as light 1165 having a polarization (e.g., horizontal polarization) different from the polarization (e.g., vertical polarization) of the light 1163 toward the first polarization selective reflector 1113.

The first polarization selective reflector 1113 reflects at least a portion of the horizontally polarized light 1165 as horizontally polarized light 1167 and directs the light 1167 toward the projection lens 1130. The phase retarder 1132, which is a quarter-wave plate in some embodiments, turns the light 1167 into circularly polarized light 1169 and transmits the circularly polarized light 1169 toward the reflective coating 1134. The reflective coating 1134 reflects the circularly polarized light 1169 toward the phase retarder 1132 as circularly polarized light 1171. When the circularly polarized light 1169 is reflected by the reflective coating 1134, a direction in which the electric field vector of the circularly polarized light 1169 rotates is reversed. Thus, the circularly polarized light 1171 reflected toward the phase retarder 1132 has a handedness (e.g., right-circular polarization) opposite to the circularly polarized light 1169 (e.g., left-circular polarization). As the circularly polarized light 1171 passes through the phase retarder 1132, the phase retarder 1132 converts the circularly polarized light 1171 to linearly polarized light 1173 and transmits linearly polarized light 1173 toward the first polarization selective reflector 1113. In some embodiments, a plane of vibration of the linearly polarized light 1173 (e.g., vertically polarized) is perpendicular to a plane of vibration of the linearly polarized light 1167 (e.g., horizontally polarized), and the first polarization selective reflector 1113 transmits the linearly polarized light 1173 toward the optional optics 1140.

The projection systems shown in FIGS. 11A and 11B utilize a folded optical path for the light from the spatial light modulator 1152, which eliminates the need for a long straight path for projecting the light from the spatial light modulator and enables a compact projection system, compared to a projection system that does not utilize a folded optical path. In addition, the beam splitter assembly facilitates illuminating the spatial light modulator at a normal incident angle (or a near normal incident angle) and collecting light from the spatial light modulator at a normal collection angle (or a near normal collection angle), which improves the image quality.

Although FIGS. 11A and 11B show that the projection lens 1130 has the phase retarder 1132 disposed on the first surface of the projection lens 1130 and the reflective coating 1134 disposed on the second surface of the projection lens 1130, in some embodiments, at least one of the phase retarder 1132 and the reflective coating 1134 is separate from the projection lens 1130. For example, the phase retarder 1132 and the reflective coating 1134 separate from the projection lens 1130 may be used instead of a single integrated projection lens with the phase retarder 1132 and the reflective coating 1134.

Figure 12:
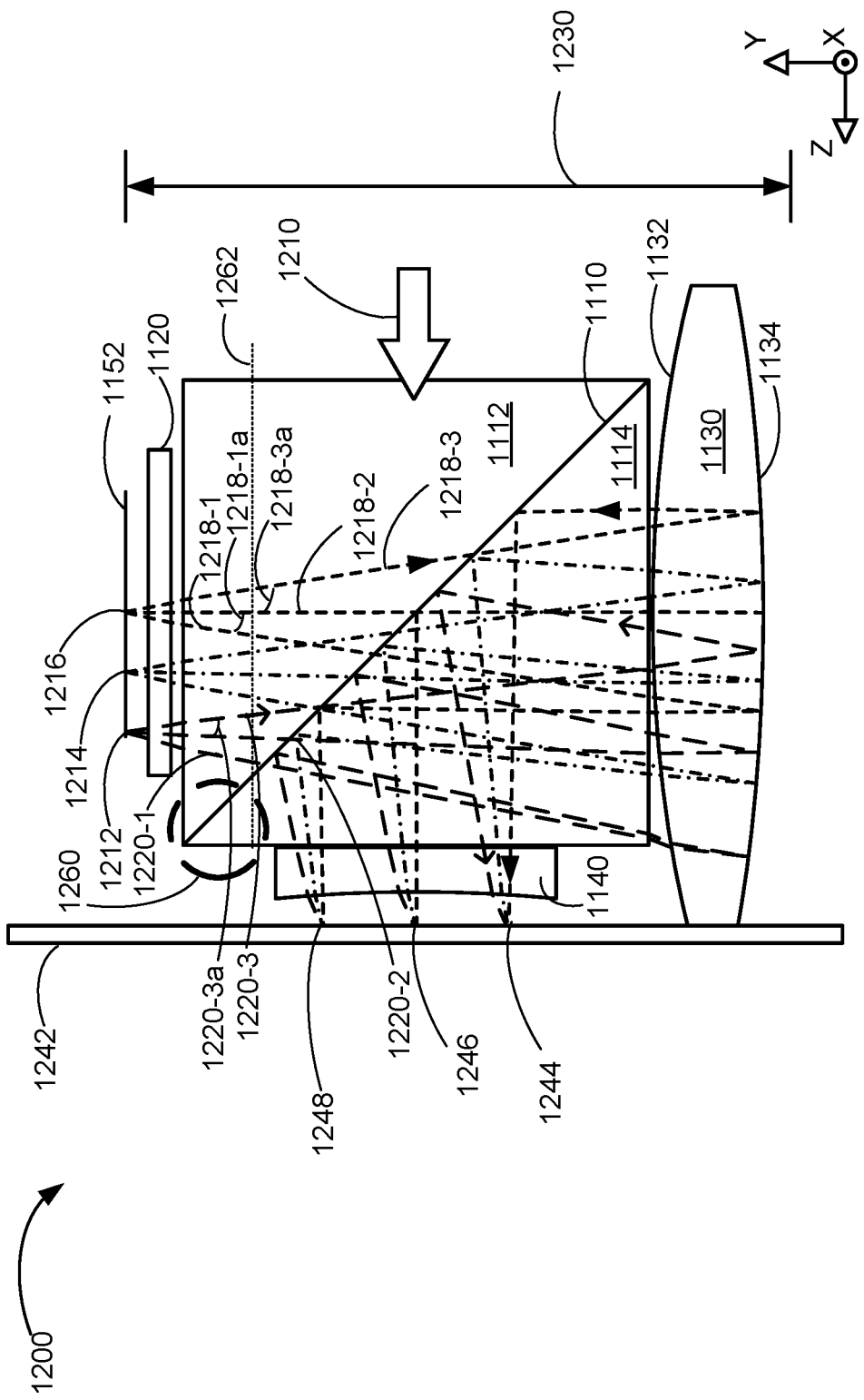
FIG. 12 is a schematic diagram illustrating a projection system in accordance with some embodiments.

FIG. 12 is a schematic diagram illustrating a projection system 1200 in accordance with some embodiments. The projection system 1200 is similar to the projection system 1100, except that the projection system 1200 is optically coupled with a waveguide 1142.

In some embodiments, the projection system 1200 receives illumination light 1210 from one or more light sources (not shown). In some embodiments, the projection system 1200 is used in conjunction with various types of spatial light modulators (SLM). In some embodiments, the spatial light modulator is a Liquid Crystal on Silicon (LCoS), and in such cases, the projection system 1200 is called an LCoS projection system. A spatial light modulator 1152 (e.g., LCoS) reflects the illumination light based on a setting for a pixel where the illumination light 1210 impinges on the LCoS.

FIG. 12 shows rays from the spatial light modulator 1152. In FIG. 12, for each of the three different pixels 1212, 1214, and 1216 on the spatial light modulator 1152, three rays are illustrated as examples.

FIG. 12 shows a first ray 1218-1, a second ray 1218-2, and a third ray 1218-3 from pixel 1216. The first ray 1218-1 makes an angle 1218-1a with respect to the second ray 1218-2, and the third ray 1218-3 makes an angle 1218-3a with respect to the second ray 1218-2. The rays 1218-1, 1218-2, and 1218-13 are first reflected by the reflective coating 1134 on a second surface of the projection lens 1130, and then reflected by the first polarization selective reflector 1110 before impinging on the waveguide 1242. FIG. 12 also shows three rays, 1220-1, 1220-2, and 1220-3 from pixel 1212. The ray 1220-3 makes an angle 1220-3a relative to the ray 1220-2. The rays 1220-1, 1220-2, and 1220-3 are reflected by the reflective coating 1134 on the second surface of the projection lens 1130, and then reflected by the first polarization selective reflector 1110 before impinging on the waveguide 1242. Similarly, rays from pixel 1214 also are reflected by the reflective coating 1134 on the second surface of the projection lens 1130, and then reflected by the first polarization selective reflector 1110 before impinging on the waveguide 1242.

In FIG. 12, both the ray 1218-3 from pixel 1216 and the ray 1220-3 from pixel 1212 impinge at location 1244 of the waveguide 1242, and both the ray 1218-1 from pixel 1216 and the ray 1220-1 from pixel 1212 impinge on location 1248 of the waveguide 1242. Similarly, middle rays (e.g., 1218-2, 1220-2) from each of the three pixels 1212, 1214, and 1216 impinge at location 1246 of the waveguide 1242.

In some embodiments, a magnitude of the angle 1218-3a equals a magnitude of the angle 1220-3a. The location 1244 on the waveguide 1242 receives rays from different pixels (e.g., pixel 1212 and pixel 1216) that reflect off the spatial light modulator 1152 (e.g., LCoS) at the same angle.

Rays reflecting from different pixels are relayed by the projection lens 1130 to the same location on the waveguide 1242. In some embodiments, both the spatial light modulator 1152 and the waveguide 1242 are located at an optical path length that corresponds to a focal length of the projection lens 1130. This allows the projection lens 1130 to provide Fourier transforming effect on the received light. For, angular information at the spatial light modulator 1152 is converted into positional information on the waveguide 1242 by the projection lens 1130.

In FIG. 12, a dimension of the projection system 1200, including the spatial light modulator 1152 (e.g., LCoS) and the projection lens 1130, along the y-direction is marked by a double-headed arrow 1230. In some embodiments, the dimension represented by the arrow 1230 is between 4 mm to 15 mm (e.g., the dimension is 4, 5, 6, 7, 8, 9, 10, 11, 12, 13, 14, or 15 mm).

In some embodiments, a field of view of the projection system is different along two orthogonal directions (e.g., the x direction and the z direction).

Figure 13B:
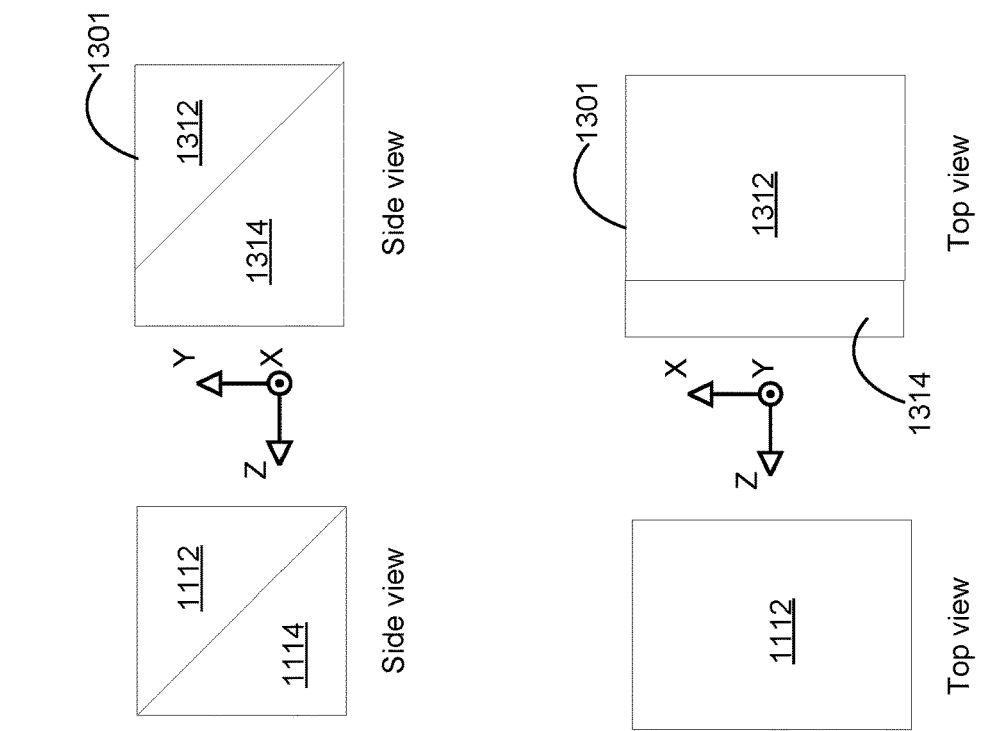
FIG. 13B is a schematic diagram comparing side views and top views of different projection systems in accordance with some embodiments.
Figure 13A:
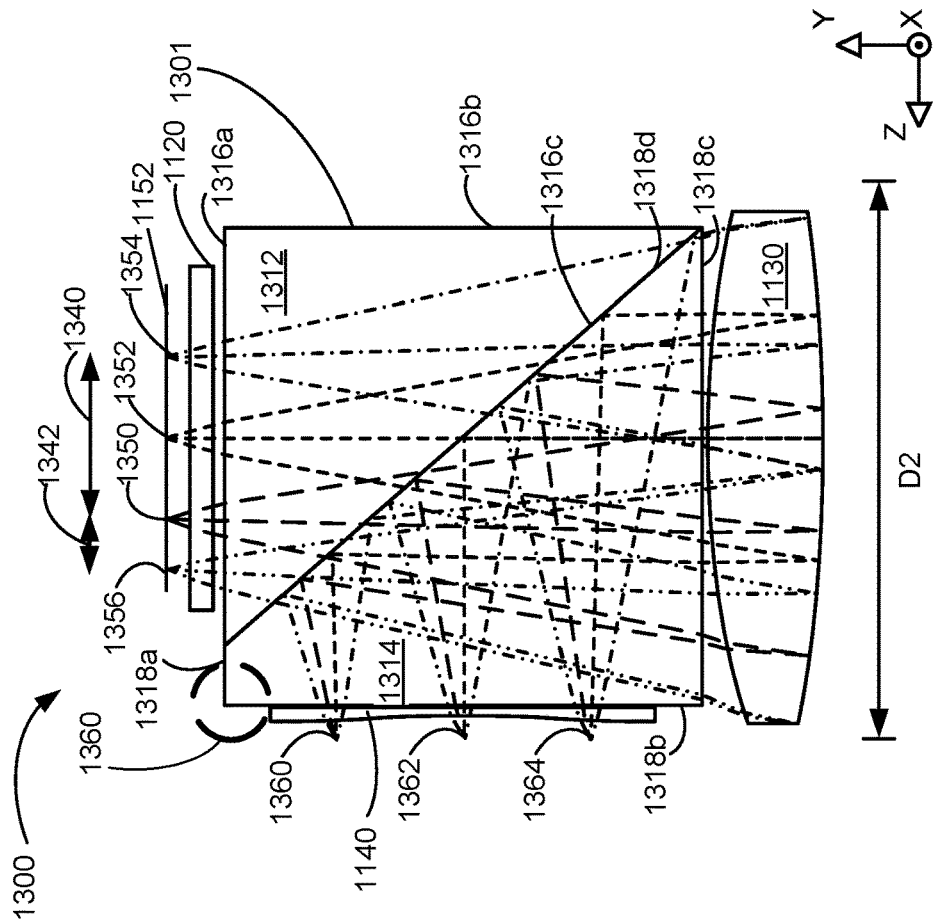
FIG. 13A is a schematic diagram illustrating a projection system in accordance with some embodiments.

FIG. 13A shows another way of reducing a volume of a projection system in accordance to some embodiments. The projection system 1300 uses a first prism 1312 that has a different size and a different shape compared to a second prism 1314. In some embodiments, a cross-section along the y-z plane of the second prism 1314 is a right trapezoid, while a cross-section along the y-z plane of the first prism 1312 remains a right angle prism. In some embodiments, the first prism 1312 is a right angle prism having a first side 1316a, a second side 1316b, and a hypotenuse 1316c, where the first side 1316a makes a right angle with the second side 1316b. In some embodiments, the second prism 1314 is a right trapezoid having a first side 1318a, a second side 1318b, a third side 1318c, and a fourth side 1318d. In some embodiments, the fourth side 1318d of the second prism 1314 has the same length as the hypotenuse 1316c of the first prism 1312.

In some embodiments, a region 1260 of the second prism 1114 in FIG. 12 is not used optically (e.g., no illumination light 1210 reflected by the spatial light modulator 1152 traverses the region 1260). As a result, in some embodiments, the first prism 1312 and the second prism 1314 are formed by truncating the first prism 1112 and the second prism 1114 along a line 1262. The projection system 1300 in such embodiments has a similar field of view compared to the embodiments shown in FIG. 12, while a volume of the projection system 1300 is significantly smaller (e.g., 30%, 40%, 50%, 60%, 70%, smaller) than the volume of the projection system 1200.

In some embodiments, an angular range 1340 describes a spread of an angle of a field of view provided by three pixels 1350, 1352, and 1354 on the spatial light modulator 1152 when a beam splitter with two identical prisms, similar to the beam splitter shown in FIG. 12, is used. By using two prisms of different sizes (e.g., the first prism 1312 and the second prism 1314), the field of field increases by an angular range 1342, a spread of an angle of a field of view provided by an additional pixel 1356 relative to the pixel 1350. In some embodiments, the angular range 1340 is between 20 degrees to 40 degrees (e.g., value of the angular range 1340 is 20, 25, 30, 35, or 40 degrees). In some embodiments, the angular range 1342 is between 5 degrees to 20 degrees (e.g., value of the angular range 1342 is 5, 10, 15, or 20 degrees). All three rays originating from the pixel 1356 are received by optics in the projection system 1300 (e.g., the second prism 1314, the projection lens 1130).

In some embodiments, a corner 1360 of the projection system 1300 is only minimally traversed (if at all) by any optical light. Thus, the corner 1360 need not be strictly right angle, some deviations from being right angle is more acceptable at the corner 1360, than at a corner formed by the side 1318b and the side 1318c.

In some embodiments, a value D2 of a width of the projection system 1300 is between 2 mm to 15 mm (e.g., the value D2 is 4, 5, 6, 7, 8, 9, 10, 11, 12, 13, 14, or 15 mm).

In some embodiments, the projection lens 1130 is rotationally symmetric.

A middle ray from each of the four pixels 1350, 1352, 1354, 1356 impinge at location 1362 of a waveguide (not shown). A right ray (e.g., the ray in each bundle of light emitting from a particular pixel that has the smallest z value at the projection lens 1130) from each of the four pixels 1350, 1352, 1354, 1356 impinge at location 1364 of the waveguide (not shown). A left ray (the ray in each bundle of light emitting from a particular pixel that has the largest z value at the projection lens 1130) from each of the four pixels 1350, 1352, 1354, 1356 impinge at location 1361 of the waveguide (not shown).

FIG. 13B shows side views and top views of the beam splitter assembly of FIG. 12 (left) and the beam splitter assembly 1301 of FIG. 13A (right).

A light emitter has a size and spread. Etendue is a product of an area of the light emitter and the solid angle of the light beam, and describes the size and angular spread of a beam of light as it passes through an optical system. The larger the beam angle or the larger the source size, the larger the etendue. Etendue is the optical equivalent of entropy: etendue of a light beam does not decrease as it passes through an optical system. For example, losses due to scattering increase the etendue; more useful light energy has a smaller etendue value.

Systems that illuminate spatial light modulators perform better when light having uniform and low etendue illuminates the spatial light modulator. Providing such uniform and low etendue illumination commonly involves large optical components that can add substantial weight and volume.

Figure 14A:
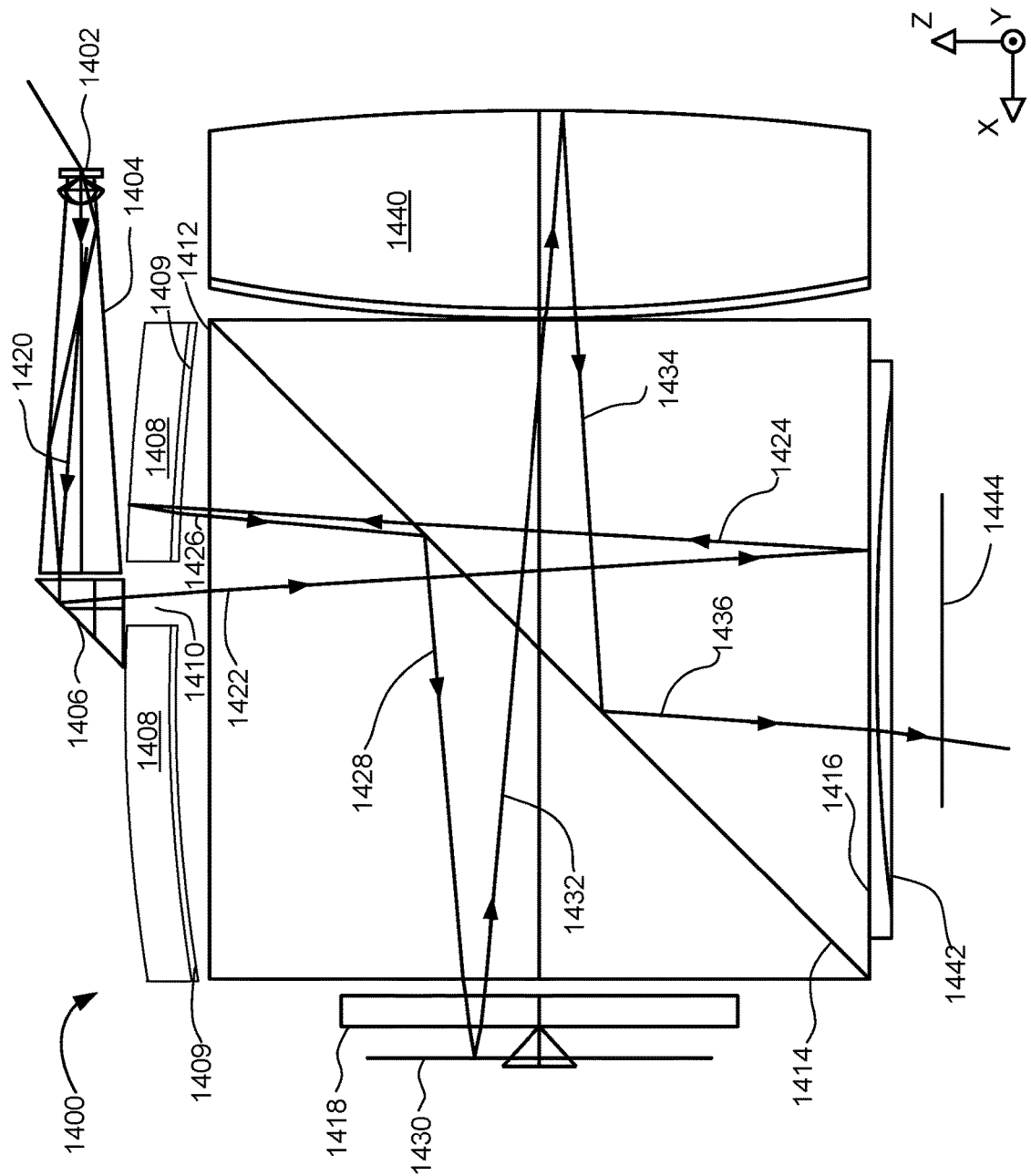
FIG. 14A is a schematic diagram illustrating a compact spatial light modulator having an illumination system in accordance with some embodiments.

FIG. 14A shows a compact spatial light modulator with illumination system 1400 having a light source 1402. The illumination system 1400 uses a polarizing beam splitter 1412 to provide an extended illumination path. In some embodiments, the light source 1402 is a light emitted diode (LED), a SLED (superluminescent LED), a RCLED (resonate cavity LED), a laser diode, or a wavelength conversion device. An example of a wavelength conversion device is a quantum dot or quantum well emitter combined with a pump light source. In some embodiments, the illumination system 1400 includes an integrator rod 1404, which partially collimates and homogenizes light emitted by the light source 1402. In some embodiments, a lens system or a combination of a lens and an integrator rod partially collimates light emitted by the light source 1402. In some embodiments, a tapered optical fiber or an array of tapered optical fibers at least partially collimates light emitted by the light source 1402.

In some embodiments, the illumination system 1400 includes a single source. In some embodiments, the illumination system 1400 includes a linear array of sources. In some embodiments, the illumination system 1400 includes a two-dimensional array of sources. In some embodiments, the light sources are selectively powered to provide zonal illumination. Zonal illumination is a spatially selective way of illuminating one or more regions (or zones) of a target area (e.g., a spatial light modulator 1430).

In some embodiments, the illumination system 1400 includes a diverting optic 1406. The diverting optic 1406 is used to reduce a footprint of the illumination system 1400. In some embodiments, the diverting optic 1406 is a prism configured to divert an incoming beam of light 1420 by some angle (e.g., by 90 degree from the light 1420 traveling substantially along the x-direction to light 1422 traveling substantially along the −z direction). In some cases, light delivered to the polarizing beam splitter 1412 is polarized. In some embodiments, an absorbing polarizer is used to polarize the light delivered to the polarizing beam splitter 1412. In some embodiments, a polarization selective reflector is used, and the polarization selective reflector reflects a light component having a particular polarization back to the light source 1402. In some configurations, the light component having the particular polarization is recycled. In some embodiments, a polarization converter is used to polarize the light. In some embodiments, a combination of one or more of an absorbing polarizer, a polarization selective reflector, or a polarization converter is used. The light is polarized at any position between the light source 1402 and the polarizing beam splitter 1412.

The light 1422 passes through an aperture 1410 of a mirror 1408 and quarter-wave plate 1409 (e.g., a common aperture that extends through both mirror 1408 and quarter-wave plate 1409), and enters the polarizing beam splitter 1412. In some embodiments, the illumination system 1400 includes a single mirror 1408 and a single quarter-wave plate 1409, even though each element (e.g., mirror 1408 or quarter-wave plate 1409) is shown in FIG. 14 as two separate pieces due to the presence of the aperture 1410. In some embodiments, the mirror 1408 and the quarter-wave plate 1409 are integrally formed.

A polarization selective reflector 1414 receives the light 1422 and directs the light 1422 (depending on its polarization) toward a polarization selective reflector 1416. In some embodiments, directing the light 1422 includes transmitting the light 1422 through the polarization selective reflector 1414. The polarization selective reflector 1416 reflects the light 1422 as light 1424 and directs the light 1424 toward the polarization selective reflector 1414. The polarization selective reflector 1414 directs the light 1424 (depending on its polarization) toward the mirror 1408 and the quarter-wave plate 1409.

The quarter-wave plate 1409 is adjacent to the mirror 1408. The combination of the quarter-wave plate 1409 and the mirror 1408 receives the light 1424 and reflects the light 1424 as light 1426. The quarter-wave plate 1409 causes light 1426 (e.g., the reflected light) to have a polarization state orthogonal to the light 1424 (e.g., the light 1424 has a first polarization state before impinging on the quarter-wave plate 1409, and the light 1426 has a second polarization state, orthogonal to the first polarization state, after passing through the quarter-wave plate 1409; the light 1424 is horizontally polarized, and the light 1426 is vertically polarized; or the light 1424 is vertically polarized, and the light 1426 is horizontally polarized). In some embodiments, the top surface of the beam splitter 1412 is coupled with an anti-reflection coating to reduce optical losses when the light 1424 leaves the beam splitter 1412. Additionally or alternatively, in some cases, the light 1424 strikes the top surface of the beam splitter 1412 at an incident angle that is close to zero so that the reflection by the top surface of the beam splitter 1412 is reduced. In some embodiments, the mirror 1408 and/or an adjacent optical material have/has a preselected degree of scattering or randomization of a path of the light 1424. For example, in some embodiments, the mirror 1408 has a fine structure that scatters light. In some embodiments, the mirror 1408 causes controlled distortions of a path of the light 1424 (e.g., the mirror 1408 has a non-flat surface, such as a curved surface). In some embodiments, a combination of both a fine structure and/or controlled distortions are used. In some embodiments, scattering or distorting the light 1424 does not substantially depolarize it. In some embodiments, the mirror 1408 has an aspherical shape, where one of the parameters used to optimize and create the aspherical shape is an illumination uniformity at the spatial light modulator (e.g., the aspherical shape improves uniformity of the light provided to the spatial light modulator).

In some embodiments, the mirror 1408 has a number of apertures distributed over a region of the mirror 1408.

Due to the light 1426 having a polarization state orthogonal to a polarization state of the light 1424, the light 1426, instead of being transmitted through the polarization selective reflector 1414, is reflected by the polarization selective reflector 1414 and directed toward a spatial light modulator (SLM) 1430 as light 1428. In some embodiments, the illumination system 1400 includes a SLM window 1418 (between the beam splitter 1412 and the spatial light modulator 1430). In some embodiments, the light 1428 transmits through the SLM window 1418 and impinges upon the spatial light modulator 1430. The spatial light modulator 1430 spatially modulates the light 1428. In some embodiments, the spatial light modulator 1430 is an LCoS or ferroelectric liquid crystal on silicon (FLCoS) imager that modulates a polarization state of light on individual pixels resolution. In some embodiments, the spatial light modulator 1430 includes a micro electro mechanical system (MEMS) that is combined with a quarter-wave plate such that light impinging on a selected pixel (e.g., when the pixel is switched on) is converted to an orthogonal polarization state. The remaining ray paths and components are similar to the description related to FIG. 11A (e.g., light 1432 is similar to light 1166; light 1434 is similar to light 1172; light 1436 is similar to light 1174; lens 1440 is similar to the projection lens 1130). In some embodiments, the illumination system 1400 includes optics 1442, which is similar to optics 1140 shown in FIG. 11A.

As explained above with respect to FIGS. 11A and 11B, the illumination system 1400 maybe configured so that the polarization selective reflector 1414 transmits light entering the beam splitter 1412 (as shown in FIG. 14A) or reflects the light entering the beam splitter 1412. Examples of these are described with respect to FIGS. 14B-14E.

Figure 14C:
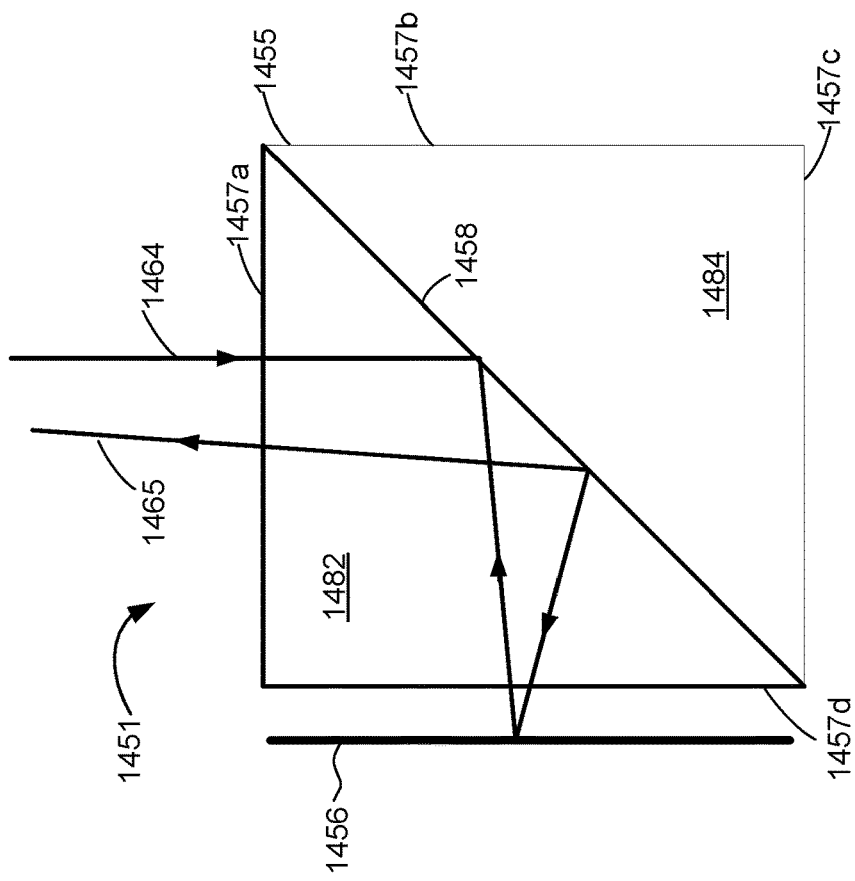
FIG. 14C is a schematic diagram illustrating an optical path of illumination light traversing a first polarization selective reflector and a second polarization selective reflector in accordance with some embodiments.
Figure 14B:
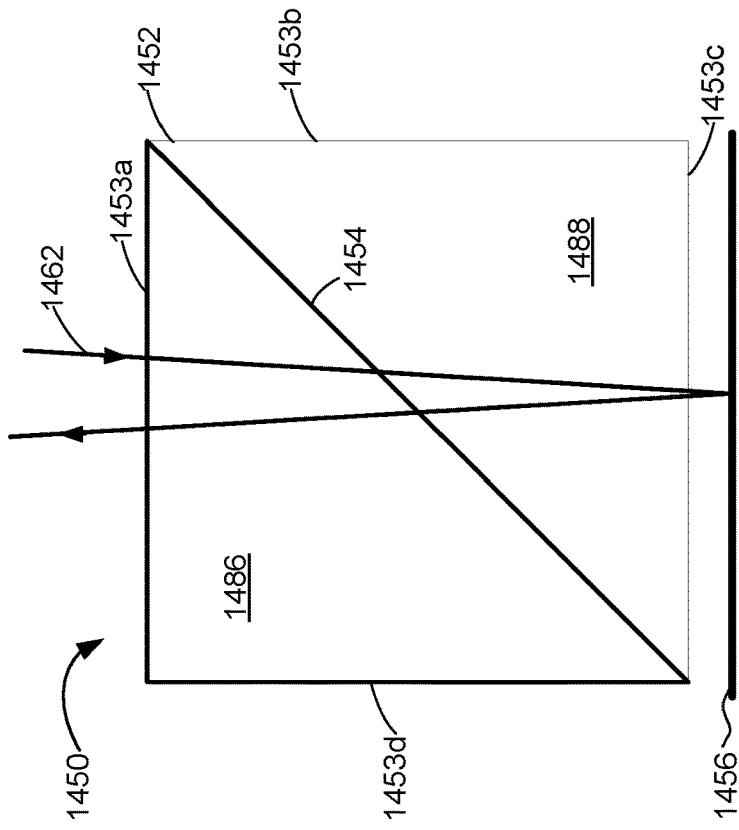
FIG. 14B is a schematic diagram illustrating an optical path of illumination light traversing a first polarization selective reflector and a second polarization selective reflector in accordance with some embodiments.

FIG. 14B shows a polarizing beam splitter 1450 having a cube 1452 that contains a first polarization selective reflector 1454. In some embodiments, the cube 1452 is composed of a first right-angle prism 1496 and a second right-angle prism 1498. The cube 1452 has a first side 1453a, a second side 1453b, a third side 1453c, and a fourth side 1453d. A second polarization selective reflector 1456 is adjacent to the cube 1452, parallel and closest to the third side 1453c of the cube 1452. For the polarizing beam splitter 1450, a surface where light enters (e.g., the first side 1453a) is substantially parallel to the second polarization selective reflector 1456. In some embodiments, the first polarization selective reflector 1454 reflects light having a first polarization (e.g., vertically polarized) and the second polarization selective reflector 1456 reflects light having a second polarization different from the first polarization (e.g., horizontally polarized).

A polarization of light blocked by the first polarization selective reflector 1454 is orthogonal to a polarization of the light blocked (or reflected) by the second polarization selective reflector 1456. For example, in some embodiments, transmission axes of the first polarization selective reflector 1454 and the second polarization selective reflector 1456 are configured such that polarized light 1462 that enters the cube 1452 is transmitted through the first polarization selective reflector 1454, and is reflected by the second polarization selective reflector 1456. Such an orientation of transmission axes is termed "orthogonal polarization axes", which refers to a configuration where a first polarizer transmits light with a first polarization state, and a second polarizer substantially blocks (or reflects) light with the first polarization state. Orthogonal polarization axes are possible for both linear and circular polarizers.

In some embodiments, a second polarization selective reflector (e.g., 1456) is disposed on a first surface (e.g., third side 1453c) of the first prism (e.g., second prism 1498), and light (e.g., 1462) enters the optical device at a second surface (e.g., first side 1453a) parallel to the first surface (e.g., third side 1453c).

FIG. 14C shows a polarizing beam splitter 1451 having a cube 1455 that contains a first polarization selective reflector 1458. In some embodiments, the cube 1455 is composed of a first right-angle prism 1492 and a second right-angle prism 1494. The cube 1455 has a first side 1457a, a second side 1457b, a third side 1457c, and a fourth side 1457d. The second polarization selective reflector 1456 is adjacent to the cube 1455, parallel and closest to the fourth side 1457d of the cube 1455. For the polarizing beam splitter 1451, a surface where light enters (e.g., the first side 1457a) is substantially perpendicular to the second polarization selective reflector 1456. In some embodiments, both the first polarization selective reflector 1454 and the second polarization selective reflector 1456 reflect light having the first polarization.

A polarization of light blocked (or reflected) by the first polarization selective reflector 1458 is parallel to a polarization of the light blocked (or reflected) by the second polarization selective reflector 1456. For example, in some embodiments, transmission axes of the first polarization selective reflector 1458 and the second polarization selective reflector 1456 are configured such that polarized light 1464 that enters the polarizing beam splitter 1451 is reflected both by the first polarization selective reflector 1458 and the second polarization selective reflector 1456.

In some embodiments, the second polarization selective reflector 1456 is disposed on a first surface (e.g., fourth side 1457d) of the first prism (e.g., first prism 1492), and light enters the first prism at a second surface (e.g., first side 1457a) perpendicular to the first surface.

As shown above, an illumination system described herein can be configured to transmit light entering a beam splitter (as shown in FIG. 14B) or reflect the light entering the beam splitter (as shown in FIG. 14C). For brevity, not all possible configurations are illustrated, but a person having ordinary skill in the art would understand that one configuration (e.g., the configuration shown in FIG. 14B) can be used in place of the other configuration (e.g., the configuration shown in FIG. 14C), or vice versa.

Figure 14E:
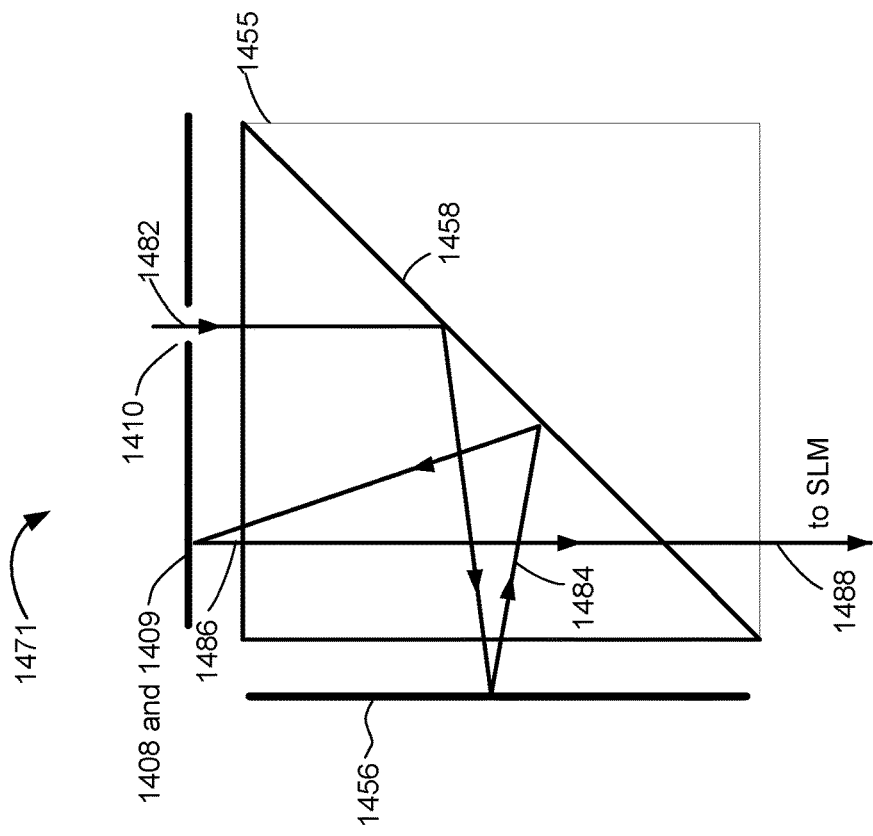
FIG. 14E is a schematic diagram illustrating an optical path of illumination light to a spatial light modulator in accordance with some embodiments.
Figure 14D:
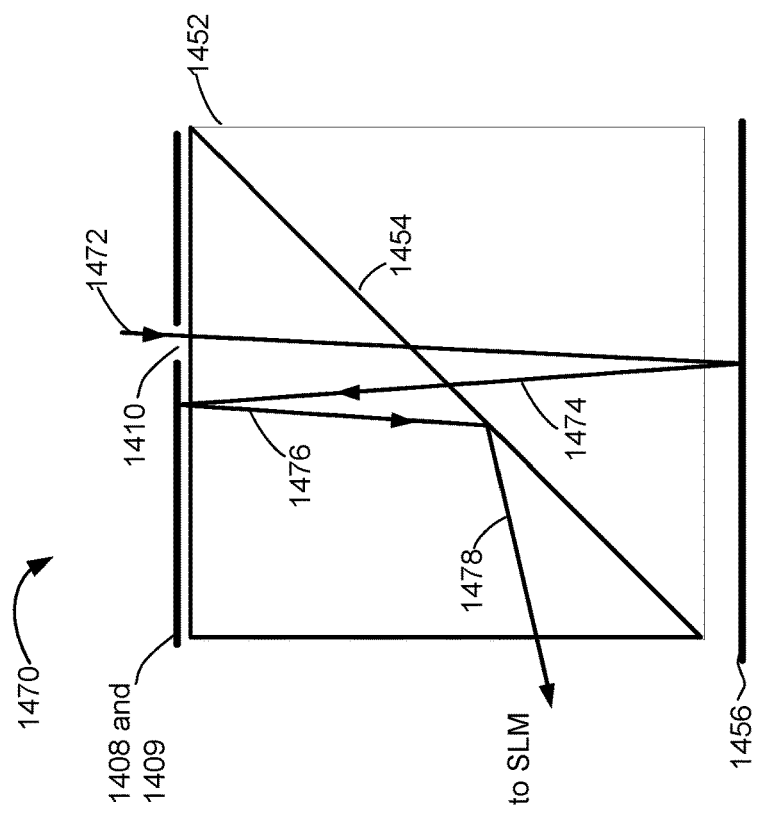
FIG. 14D is a schematic diagram illustrating an optical path of illumination light to a spatial light modulator in accordance with some embodiments.

Illumination systems illustrated in FIGS. 14D and 14E are similar to the illumination systems illustrated in FIGS. 14B and 14C except that the illumination systems illustrated in FIGS. 14D and 14E include a combination of a mirror 1408 and a phase retarder (e.g., a quarter wave plate 1409) to further extend the optical path.

FIG. 14D shows an illumination system 1470. Light 1472 passes through an aperture 1410 in the mirror 1408 (and the quarter-wave plate 1409) and enters cube 1452, which has the first polarization selective reflector 1454. The light 1472 has a first polarization and passes through the first polarization selective reflector 1454. The light 1472 is reflected by the second polarization selective reflector 1456, forming reflected light 1474. The reflected light 1474, which maintains the first polarization, passes through the first polarization selective reflector 1454, and leaves the cube 1452. The light 1474 passes through the quarter-wave plate 1409, and the mirror 1408 reflects the light 1474, which has passed through the quarter-wave plate 1409 once, as reflected light 1476. The reflected light 1476 passes through the quarter-wave plate 1409 again, and has a polarization that is orthogonal to the first polarization. The reflected light 1476 enters the cube 1452 once again and the first polarization selective reflector 1454 reflects the light 1476 as light 1478. The first polarization selective reflector 1454 directs the light 1478, having the second polarization, distinct from the first polarization, toward a spatial light modulator.

FIG. 14E shows an illumination system 1471. Light 1482 passes through an aperture 1410 in the mirror 1408 (and the quarter-wave plate 1409) into the cube 1455, which has the first polarization selective reflector 1458. The light 1482 has a second polarization and is reflected by both the first polarization selective reflector 1458 and the second polarization selective reflector 1456, to form reflected light 1484. The light 1484, after reflecting off the first polarization selective reflector 1458, leaves the cube 1455 passes through the quarter-wave plate 1409, and the mirror 1408 reflects the light 1484, which has passed through the quarter-wave plate 1409 once, as light 1486. The reflected light 1486 passes through the quarter-wave plate 1409 again, emerging with a polarization that is orthogonal to the second polarization. The reflected light 1486 enters the cube 1455 and the first polarization selective reflector 1458 transmits the light 1486 as light 1488. The first polarization selective reflector 1458 directs the light 1488 towards a spatial light modulator.

In some embodiments, illumination systems and image projection systems are configured such that the polarization selective reflector is a polarization volume hologram (described with respect to FIGS. 16A-16D) instead of a reflective polarizer.

Figure 15A:
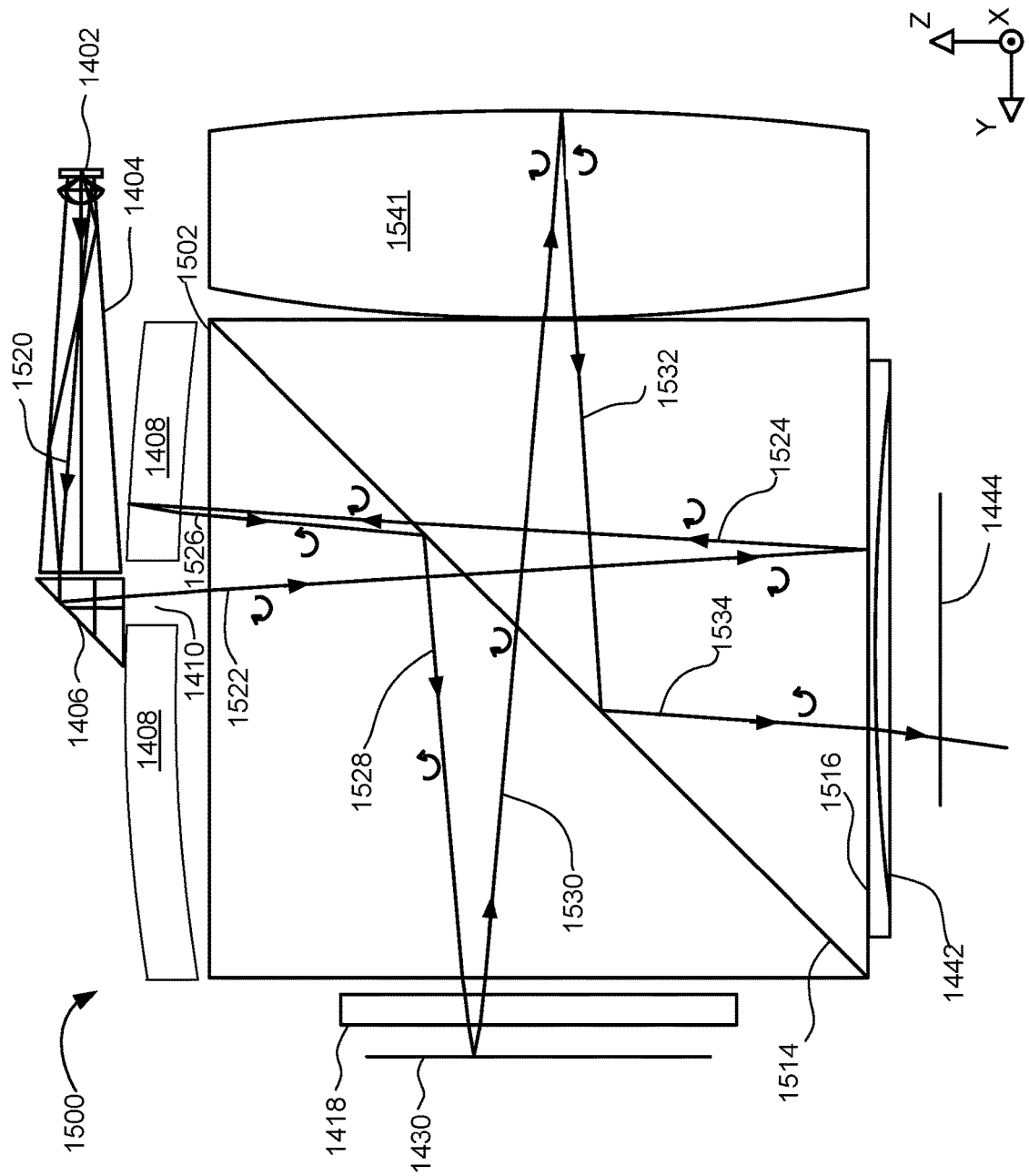
FIG. 15A is a schematic diagram illustrating a compact spatial light modulator having an illumination system in accordance with some embodiments.

FIG. 15A shows a system 1500 similar to the compact illumination system 1400 described in FIG. 14A. A difference between the system 1500 and the illumination system 1400 is that a first polarization volume hologram (PVH) 1514 is placed at the location of the first polarization selective reflector 1414 in the compact illumination system 1400, replacing the first polarization selective reflector 1414. In some embodiments, the second polarization selective reflector 1416 in the compact illumination system 1400 is replaced by a second PVH 1516 in the system 1500. The light source 1402 emits light 1520 toward the diverting optic 1406. Light 1522 from the diverting optic 1406 may be partially collimated. Light 1522 from the diverting optic 1406 enters the polarizing beam splitter 1502 of the system 1500. In some embodiments, the light 1522 is polarized. In some embodiments, the light 1522 has a nonplanar polarization. Nonplanar polarization refers to any of polarizations that are not linearly-polarized (e.g., elliptically polarized light and circularly polarized light). In some cases, the light 1522 is circularly polarized. FIG. 15A shows embodiments in which the light 1522 is left circularly polarized. However, a person having ordinary skill in the art would understand that a system may be configured for an incoming light having right circular polarization. The handedness of the circularly polarized light traversing such system would be reversed from those denoted in FIG. 15A. For brevity, details of such system are not repeated herein.

Depending on the configuration (e.g., handedness of liquid crystals in the PVH), PVH transmits a first circularly polarized light (e.g., left circularly polarized light) and reflects a second circularly polarized light (e.g., right circularly polarized light) that is orthogonal to the first circularly polarized light, or vice versa. In FIG. 15A, the first PVH 1514 directs the light 1522 (e.g., transmits the light 1522) toward the second PVH 1516, which reflects the light 1522 as light 1524. The light 1524 maintains the left circular polarization. The first PVH 1514 directs the light 1524 (e.g., transmits the light 1524) out of the polarizing beam splitter 1502, toward the mirror 1408 so that the mirror 1408 reflects light 1524 as reflected light 1526. In FIG. 15, the system 1500 does not include the quarter-wave plate 1409, as the light 1526 has a circular polarization (e.g., right circular polarization) orthogonal to the circular polarization of the light 1524 (e.g., left circular polarization) without having to pass through any quarter-wave plate.

The first PVH 1514 reflects the light 1526 as reflected light 1528, while keeping the right circular polarization of the reflected light 1528. The reflected light 1528 leaves the polarizing beam splitter 1502 and passes toward the spatial light modulator 1430. In some embodiments, the system includes a SLM window 1418 (or cover glass) between the beam splitter 1502 and the spatial light modulator 1430.

The spatial light modulator 1430 creates spatially modulated patterns of reflected light 1530, modifying a polarization of the reflected light 1530 such that the reflected light 1530 (or a portion thereof) passes through the first PVH 1514 (e.g., the spatial light modulator 1430 converts a polarization of the light 1530 to be orthogonal to a polarization of the light 1528). The first PVH 1514 directs the light 1530 to a reflective lens assembly 1541, which refracts and reflects the light 1530, as light 1532. The reflective lens assembly 1541 differs from the reflective lens assembly 1440 in that the reflective lens assembly does not include (or is not coupled with) a quarter-wave plate in the assembly. The light 1532 has a polarization (e.g., right circular polarization) orthogonal to the polarization of the light 1530 (e.g., left circular polarization). The first PVH 1514 reflects the light 1532 as light 1534, while keeping the light 1534 as right circularly polarized. The light 1534, being right-circularly polarized, passes through optional optics 1442 and exits the beam splitter 1502. In some embodiments, the light 1534 enters waveguide 1444.

In some embodiments, the first PVH 1514 defines a first plane (e.g., a plane making a 45 degree angle with the x-y plane shown in FIG. 15A). In some embodiments, the second PVH 1516 defines a second plane parallel to the x-y plane. In some embodiments, the first plane intersects the second plane at a first acute angle (e.g., 45 degree). In some embodiments, the mirror 1408 defines a third plane parallel to the x-y plane. In some embodiments, the mirror 1408 has a planar surface. In some embodiments, the mirror 1408 has a curved surface. In some cases, when the mirror 1408 is not planar (as shown in FIG. 15A), the third plane defined by the mirror 1408 perpendicularly intersects an optical axis of the mirror 1408, which corresponds to an axis of rotational symmetry for the non-planar mirror 1408. In some embodiments, the first plane intersects and makes a second acute angle (e.g., 45 degree) with the third plane. In some embodiments, the second PVH 1516 is positioned in a first orientation that is substantially parallel to the mirror 1408 (e.g., the second PVH 1516 is substantially parallel to the third plane).

In some embodiments, the first PVH 1514 reflects light having a polarization (e.g., right circular polarization) different from a polarization of light reflected by the second PVH 1516 (e.g., left circular polarization).

Figure 15B:
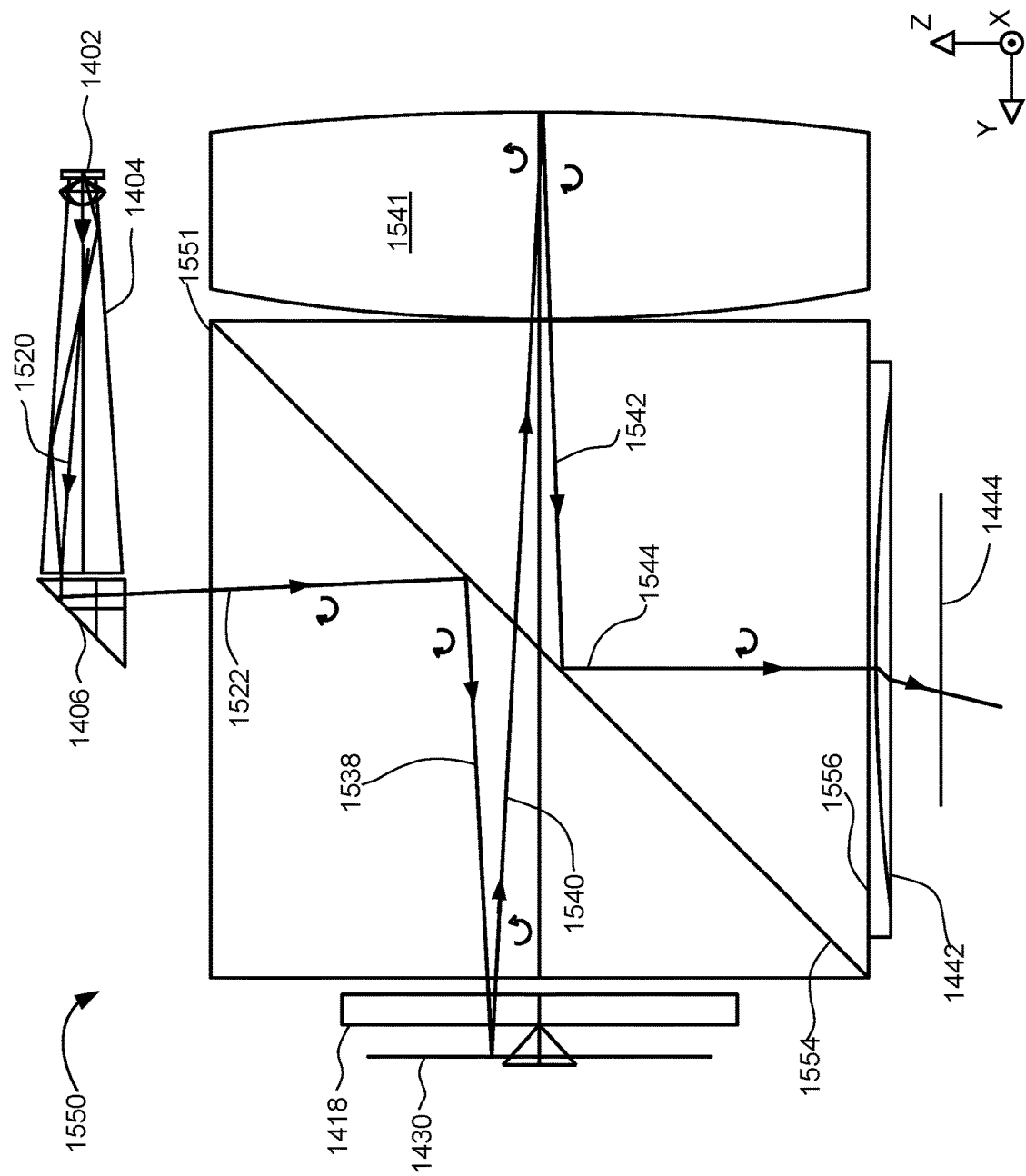
FIG. 15B is a schematic diagram illustrating a compact spatial light modulator having an illumination system in accordance with some embodiments.

FIG. 15B shows a compact spatial light modulator imaging system 1550 having a light source 1402, an integrator rod 1404, and a diverting optic 1406, as described in reference to FIG. 14A. The polarizing beam splitter 1551 includes a first PVH 1554 and a second PVH 1556. Left circularly polarized light 1522 is reflected by the first PVH 1554 toward the spatial light modulator 1430. The spatial light modulator 1430 creates spatially modulated patterns of reflected light 1540, modifying a polarization of the reflected light 1538 (or a portion thereof) such that the reflected light 1540 (or a portion thereof) passes through the first PVH 1554 (e.g., turning a polarization of the light 1540 to be orthogonal to a polarization of the light 1538). The first PVH 1554 directs the light 1540 to the reflective lens assembly 1541, which refracts and reflects the light 1540, as light 1542. The light 1542 has a polarization (e.g., right circular polarization) orthogonal to a polarization of the light 1540 (e.g., left circular polarization). The first PVH 1554 reflects the light 1542 as light 1544, while keeping the light 1544 as right circularly polarized. The light 1544 passes through optional optics 1442 and enters into the waveguide 1444.

In some embodiments, the polarizing beam splitter 1551 has a dimension (e.g., along the x-direction) lengthened, to capture a larger field of view, similar to the description of FIG. 12B and FIG. 12C. In such cases, a projection of the first polarization selective reflector on a plane defined by the spatial light modulator 1430 (e.g., along the z-x plane) has a rectangular shape.

Polarization Volume Hologram (PVH)

FIGS. 16A-16D are schematic diagrams illustrating a polarization volume hologram (PVH) 1600 in accordance with some embodiments. In some embodiments, the PVH 1600 is a liquid crystal PVH including a layer of liquid crystals arranged in helical structures (e.g., a liquid crystal formed of a cholesteric liquid crystal). PVH is selective with respect to circular polarization of light. When state (handedness) of the circularly polarized light is along a helical axis of a liquid crystal, the PVH interacts with the circularly polarized light and thereby changes the direction of the light (e.g., reflects, refracts or diffracts the light). Concurrently, while changing the direction of the light, the PVH also changes the polarization of the light. In contrast, the PVH transmits light with opposite circular polarization without changing its direction or polarization. For example, a PVH changes polarization of right circularly polarized (RCP) light to left circularly polarized (LCP) light and simultaneously redirects the light while transmitting LCP light without changing its polarization or direction. In some embodiments, a PVH is also selective on wavelength range and/or on an incident angle. If the incident light is at the designed wavelength, RCP light is redirected and converted to LCP light while RCP light with wavelength outside the designed wavelength range is transmitted without its polarization converted. If the incident light has an incident angle at the designed incident angle range, RCP light is converted to LCP light and redirected while RCP light with an incident angle outside the designed incident angle range is transmitted without its polarization converted.

FIG. 16A illustrates a three dimensional view of PVH 1600 with incoming light 1604 entering the grating along the z-axis. FIG. 16B illustrates an x-y-plane view of PVH 1600 with a plurality of liquid crystals (e.g., liquid crystals 1602-1 and 1602-2) with various orientations. The orientations of the liquid crystals are constant along reference line between A and A' along the x-axis, as shown in FIG. 16D illustrating a detailed plane view of the liquid crystals along the reference line. FIG. 16C illustrates a y-z-cross-sectional view of PVH 1600. In FIG. 16C, a pitch 1612 defined as a distance along the z-axis at which an azimuth angle of a liquid crystal has rotated 180 degrees is constant throughout the grating. However, in some embodiments, the pitch may vary along the z-axis. In FIG. 16C, PVH 1600 has helical structures 1608 with helical axes aligned corresponding to the z-axis. However, in some embodiments, the helical axes may be tilted from the z-axis. The helical structures create a volume grating with a plurality of diffraction planes (e.g., planes 1610-1 and 1610-2). The diffraction planes of PVH 1600 extend across the grating. In FIG. 16C, diffraction planes 1610-1 and 1610-2 are tilted with respect to the z-axis. Helical structures 1608 define the polarization selectivity of PVH 1600, as light with circular polarization handedness corresponding to the helical axes is diffracted while light with circular polarization with the opposite handedness is not diffracted. Helical structures 1608 also define the wavelength selectivity of PVH 1600, as light with wavelength close to a helical pitch (e.g., helical pitch 1612 in FIG. 16C) is diffracted while light with other wavelengths is not diffracted.

In some embodiments, the PVH 1514, the PVH 1516, the PVH 1554, and the PVH 1556 described with respect to FIGS. 15A and 15B are cholesteric liquid crystal (CLC) gratings. A CLC grating has similar optical properties to those described with respect to PVH 1600. A CLC and a PVH both include liquid crystals in helical arrangements. In some embodiments, the liquid crystals are cholesteric liquid crystals. CLC grating further includes a photoalignment layer and the CLCs are arranged to helical structures in accordance with the photoalignment layer. In contrast, in a PVH, CLCs are arranged to helical structures in accordance with holographic recording (e.g., without a photoalignment layer).

In some embodiments, at least one of: a first polarization selective reflector (e.g., first PVH 1514) and a second polarization selective reflector (e.g., second PVH 1516) is a metasurface. In some embodiments, at least one of: a first polarization selective reflector (e.g., first PVH 1514) or a second polarization selective reflector (e.g., second PVH 1516) includes resonant structures, a chiral layer, and/or a birefringent material. In some embodiments, at least one of: a first polarization selective reflector (e.g., first PVH 1514) and a second polarization selective reflector (e.g., second PVH 1516) is a liquid crystal based polarization selective element. In some embodiments, the liquid crystal based polarization selective element includes cholesteric liquid crystals.

In some embodiments, a first polarization selective reflector (e.g., reflective polarizer or PVH) defines a first plane (e.g., a plane making a 45 degree angle with the x-y plane shown in FIG. 15A). In some embodiments, a second polarization selective reflector (e.g., reflective polarizer or PVH) defines a second plane parallel to the x-y plane. In some embodiments, the first plane intersects the second plane at a first acute angle (e.g., 45 degree). In some embodiments, a reflector (e.g., mirror 1408) defines a third plane parallel to the x-y plane. In some cases, when the reflector is not planar, the third plane is defined as a plane that perpendicularly intersects an optical axis of the non-planar mirror. In some cases, the optical axis of the non-planar mirror is its axis of rotational symmetry (e.g., along the z-axis). The third plane that perpendicularly intersects the z-axis is a plane parallel to the x-y plane. In some embodiments, the first plane intersects and makes a second acute angle (e.g., 45 degree) with the third plane. In some embodiments, the second polarization selective reflector is positioned in a first orientation that is substantially parallel to the reflector.

In some embodiments, the first angle is measured from a portion of the first plane that directs a first light (e.g., light 1522) to a portion of the second plane that directs a second light (e.g., light 1524).

In some embodiments, the polarizing beam splitter includes a prism assembly, and the first polarization selective reflector is disposed along a diagonal of the prism assembly. In some embodiments, the diagonal is an inner diagonal (e.g., the first polarization selective reflector is sandwiched between two prisms of the prism assembly, like the polarization selective reflector 1454 in the cube 1452 shown in FIG. 14B and the polarization selective reflector 1458 in the cube 1455 shown in FIG. 14C).

In some embodiments, the first polarization selective reflector is configured (e.g., by orienting a polarization axis of the first polarization selective reflector) to reflect light having a polarization different from a polarization of light reflected by the second polarization selective reflector (e.g., similar to the pair of polarization selective reflector 1454 and the polarization selective reflector 1456 in FIG. 14B).

In some embodiments, the first polarization selective reflector is configured (e.g., by orienting a polarization axis of the first polarization selective reflector) to reflect light having a polarization identical to a polarization of light reflected by the second polarization selective reflector (e.g., similar to the pair of polarization selective reflector 1458 and the polarization selective reflector 1456 in FIG. 14C).

In light of these principles, we turn to certain embodiments.

In accordance with some embodiments, an optical device includes a first polarization selective reflector positioned in a first orientation so that the first polarization selective reflector receives first light in a first direction, redirects a first portion, of the first light, having a first polarization to a second direction that is non-parallel to the first direction; and receives second light in a third direction and transmit a first portion, of the second light, having a second polarization orthogonal to the first polarization. The optical device includes a second polarization selective reflector positioned in a second orientation non-parallel to the first orientation, and adjacent to the first polarization selective reflector so that the second polarization selective reflector receives third light in a fourth direction; redirects a first portion, of the third light, having the first polarization to a fifth direction that is non-parallel to the fourth direction; and receives fourth light in a sixth direction and transmit a first portion, of the fourth light having the second polarization (e.g., FIGS. 4A-10B).

In some embodiments, the second direction is orthogonal to the first direction and the fifth direction is orthogonal to the third direction (e.g., FIGS. 4A-10B).

In some embodiments, the first polarization selective reflector is further configured to transmit a second portion, of the first light, having the second polarization; and the second polarization selective reflector is further configured to receive, and transmit, the second portion, of the first light having the second polarization (e.g., FIGS. 4A-10B).

In some embodiments, the optical device further includes a third reflector configured to receive from the second polarization selective reflector the second portion of the first light, and redirect the second portion of the first light back to the second polarization selective reflector as the second light (e.g., FIGS. 4A-10B).

In some embodiments, the optical device further includes a light source configured to output the first light having the first polarization.

In some embodiments, the optical device further includes an optical integrator configured receive the first light and redirect the first light such that the first light transmitted by the optical integrator has a smaller divergence than the first light incident on the optical integrator. In some embodiments, the optical device further includes a Fresnel reflector optically coupled with the first polarization selective reflector, the Fresnel reflector configured to receive the first light output by the light source; and redirect the first light toward the first polarization selective reflector. In some embodiments, the Fresnel reflector is configured to expand a beam size of the first light (e.g., FIGS. 8A-9).

In some embodiments, the optical device further includes a waveplate disposed between the third reflector and the second polarization selective reflector. In some embodiments, the waveplate is configured to convert linearly polarized light to circularly polarized light and to convert circularly polarized light to linearly polarized light (e.g., a quarter-wave plate). In some embodiments, the first polarization selective reflector is further configured to reflect a second portion, of the second light, having the first polarization in a seventh direction distinct from the third direction; and the second polarization selective reflector is further configured to reflect a second portion, of the fourth light, having the first polarization, in an eighth direction distinct from the sixth direction.

In some embodiments, the optical device further includes a reflective spatial light modulator optically coupled with the first polarization selective reflector and the second polarization selective reflector, the reflective spatial light modulator configured to: receive, on a first region of the reflective spatial light modulator, the first portion of the first light having the first polarization and reflect the first portion of the first light as the second light. The reflective spatial light modulator is also configured to receive, on a second region adjacent to the first region of the reflective spatial light modulator, the first portion of the third light having the first polarization and reflect the first portion of the third light as the fourth light.

In some embodiments, the reflective spatial light modulator includes a reflective surface and a plurality of pixels, a respective pixel in the plurality of pixels having respective modulating elements. In some embodiments, reflecting the first portion of the first light as the second light and reflecting the first portion of the third light as the fourth light includes modulating, by the respective modulating elements, polarization of the first portion of the first light and the first portion of the third light.

In some embodiments, the reflective spatial light modulator is a Liquid Crystal on Silicon (LCoS) display. In some embodiments, the first polarization selective reflector in the first orientation and the second polarization selective reflector in the second orientation define an angle that is approximately 90 degrees. (e.g., FIGS. 4A, 4B, and 7B). In some embodiments, the angle is more or less than 90 degrees (e.g., FIG. 4C). The first polarization selective reflector and the second polarization selective reflector are coupled to each other (e.g., FIGS. 4A, 4B, 7B and 7C).

In some embodiments, the optical device further includes a prism defining a first facet and a second facet. The first polarization selective reflector is disposed on the first facet and the second polarization selective reflector is disposed on the second facet (FIGS. 7B and 7C). In some embodiments, the first polarization selective reflector and the second polarization selective reflector are selected from the group consisting of: a wire grid polarizer, a birefringent optical film reflective polarizer, a cholesteric reflective polarizer, and a MacNeille polarizer.

In some embodiments, the optical device further includes a first light source configured to output the first light having the first polarization; and a second light source configured to output the third light having the first polarization (e.g., FIG. 9).

In some embodiments, the optical device further includes a first Fresnel reflector optically coupled with the first polarization selective reflector configured to receive the first light output by the first light source; and redirect the first light toward the first polarization selective reflector in the first direction. The optical device further includes a second Fresnel reflector optically coupled with the second polarization selective reflector configured to receive the third light output by the second light source; and redirect the third light toward the second polarization selective reflector in the fourth direction.

In some embodiments, the fourth direction is substantially parallel to the first direction. In some embodiments, the fifth direction is substantially parallel to the second direction. In some embodiments, the fifth direction is non-parallel to the second direction.

In accordance with some embodiments, a method includes, with a first polarization selective reflector positioned in a first orientation, receiving first light in a first direction; redirecting a first portion, of the first light, having a first polarization to a second direction that is non-parallel to the first direction. The method includes receiving second light in a third direction, transmit a first portion, of the second light having a second polarization orthogonal to the first polarization. The method also includes, with a second polarization selective reflector positioned in a second orientation non-parallel to the first orientation, and adjacent to the first polarization selective reflector, receiving third light in a fourth direction; redirecting a first portion, of the third light, having the first polarization to a fifth direction that is non-parallel to the fourth direction; and receiving fourth light in a sixth direction, transmit a first portion, of the fourth light having the second polarization (e.g., FIGS. 4A-10B).

In accordance with some embodiments, a method of making an optical assembly includes placing a first polarization selective reflector in a first orientation; and placing a second polarization selective reflector in a second orientation non-parallel, and adjacent, to the first orientation. In some embodiments, the optical assembly includes a polarization beam splitter (e.g., FIGS. 4A-10B).

In accordance with some embodiments, an optical device includes a first polarization selective reflector, a second polarization selective reflector; and a third reflector. The first polarization selective reflector is configured to receive first light and redirect a first portion, of the first light, having a first polarization and transmit a second portion, of the first light, having a second polarization orthogonal to the first polarization. The second polarization selective reflector is configured to receive from the first polarization selective reflector, and transmit to the third reflector, the second portion of the first light. The third reflector is configured to receive from the second polarization selective reflector, and redirect back to the second polarization selective reflector, the second portion of the first light; and the second polarization selective reflector is further configured to receive light from the third reflector and redirect at least a portion of light, the redirected portion having the first polarization (e.g., FIGS. 4A-10B).

In accordance with some embodiments, an optical device includes a first polarization selective reflector positioned relative to a spatial light modulator; and a first reflective assembly positioned relative to the first polarization selective reflector so that the first polarization selective reflector receives first light from the spatial light modulator and directs at least a portion of the first light having a first polarization toward the first reflective assembly as second light. The first reflective assembly receives the second light from the first polarization selective reflector and directs at least a portion of the second light toward the first polarization selective reflector as third light having a second polarization. The second polarization is distinct from the first polarization (e.g., FIGS. 11A and 11B).

In some embodiments, the spatial light modulator is positioned in a first direction from the first polarization selective reflector, and the first reflective assembly is positioned in a second direction from the first polarization selective reflector. In some embodiments, illumination light enters the optical device in a third direction from the first polarization selective reflector; and a waveguide is positioned in a fourth direction from the first polarization selective reflector. The first direction and the second direction are distinct from each other (e.g., FIGS. 11A and 11B).

In some embodiments, the first direction is perpendicular to the third direction; and the second direction is perpendicular to the fourth direction. In some embodiments, the spatial light modulator and the first reflective assembly are located in opposite directions from the first polarization selective reflector. In some embodiments, the second direction is perpendicular to the third direction; and the first direction is perpendicular to the fourth direction. In some embodiments, the waveguide and the first reflective assembly are located in opposite directions from the first polarization selective reflector.

In some embodiments, the optical device further includes a first reflector. The first reflector defines an opening, and the first reflector is positioned relative to the spatial light modulator so that the spatial light modulator receives light that has (i) passed through the opening of the first reflector and (ii) subsequently reflected off the first reflector. In some embodiments, a second polarization selective reflector is disposed adjacent to the waveguide. The second polarization selective reflector is configured (e.g., by orienting a polarization axis of the second polarization selective reflector) to reflect light having a polarization different (e.g., orthogonal) from a polarization of light reflected by the first polarization selective reflector.

In some embodiments, the optical device further includes a second polarization selective reflector disposed adjacent to the waveguide. The second polarization selective reflector is configured (e.g., by orienting a polarization axis of the second polarization selective reflector) to reflect light having a polarization identical to a polarization of light reflected by the first polarization selective reflector. In some embodiments, a first plane defined by (e.g., containing) the first polarization selective reflector intersects a second plane defined by (e.g., containing) the spatial light modulator at a first acute angle. The first reflective assembly includes a polarization retarder and a reflective lens.

In some embodiments, a projection of the first polarization selective reflector on a plane defined by the spatial light modulator has a rectangular shape. In some embodiments, a height of the projection is greater than a width of the projection so that a field of view of the spatial light modulator along the height dimension is larger than a field of view along the width dimension.

In some embodiments, the first polarization selective reflector is at substantially 45-degree angle relative to the plane defined by the spatial light modulator. In some embodiments, the optical device includes a first prism and a second prism. In some embodiments, at least a portion of the first prism has a trapezoidal cross-section having a first edge, a second edge, a third edge, a fourth edge. The first edge is perpendicular to the second edge; the second prism is a right-angle prism having a hypotenuse; and the first polarization selective reflector is disposed between the first prism and the second prism, parallel to the hypotenuse of the second prism and the fourth edge of the first prism. In some embodiments, a length of the hypotenuse is equal to a length of the third edge. In some embodiments, the first reflective assembly is positioned relative to the spatial light modulator so that the first polarization selective reflector directs the second light toward the first reflective assembly by transmitting the second light.

In some embodiments, the first reflective assembly is positioned relative to the spatial light modulator so that the first polarization selective reflector directs the second light having the first polarization toward the first reflective assembly by reflecting the second light. In some embodiments, the first reflective assembly includes a reflector and a polarization retarder disposed adjacent to the reflector.

In some embodiments, the polarization retarder includes a quarter-wave plate. In some embodiments, the polarization retarder is disposed on a first surface of a lens and the reflector includes a reflective coating disposed on an opposing second surface of the lens.

In accordance to some embodiments, a method includes directing, using a first polarization selective reflector, first light from a spatial light modulator toward a first reflector assembly. The method includes receiving, using the first reflector assembly, the first light and directing at least a portion of the first light toward the first polarization selective reflector as second light. The method also includes receiving, using the first polarization selective reflector, the second light and directing at least a portion of the second light toward a waveguide (e.g., as third light). The first light has a first polarization, and the second light has a second polarization distinct from the first polarization (e.g., the second polarization is orthogonal to the first polarization).

In some embodiments, the first polarization selective reflector transmits the first light toward the first reflector assembly. In some embodiments, the first polarization selective reflector reflects the first light toward the first reflector assembly.

In accordance to some embodiments, an optical device includes a first polarization selective reflector, a second polarization selective reflector positioned relative to the first polarization selective reflector so that the first polarization selective reflector directs first light (e.g., impinging on the first polarization selective reflector and having a first polarization) toward the second polarization selective reflector and the second polarization selective reflector directs at least a portion of the first light toward the first polarization selective reflector as second light. The optical device includes a first reflector positioned relative to the first polarization selective reflector so that the first polarization selective reflector directs at least a portion of the second light received from the second polarization selective reflector toward the first reflector as third light and the first reflector directs at least a portion of third light (e.g., back) toward the first polarization selective reflector (e.g., FIG. 14A).

In some embodiments, the first reflector is aspherical. In some embodiments, the first reflector is aspherical to provide uniform illumination at the spatial light modulator.

In some embodiments, the first polarization selective reflector is configured to direct the portion of the third light from the first reflector toward a spatial light modulator. In some embodiments, the optical device further includes a second reflector positioned relative to the first polarization selective reflector so that light from the spatial light modulator is directed by the first polarization selective reflector toward the second reflector and the second reflector directs at least a portion of the light from the spatial light modulator towards the first polarization selective reflector. In some embodiments, the second reflector projects at least a portion of the light from the spatial light modulator.

In some embodiments, the second polarization selective reflector is positioned in a first orientation substantially parallel to a plane that perpendicularly intersects an optical axis of the first reflector. The second polarization selective reflector is configured (e.g., by orienting a polarization axis of the second polarization selective reflector) to reflect light having a polarization different from (e.g., orthogonal to) a polarization of light reflected by the first polarization selective reflector.

In some embodiments, the first polarization selective reflector directs the first light (having the first polarization) toward the second polarization selective reflector by transmitting the first light. In some embodiments, the second light directed toward the first polarization selective reflector by the second polarization selective reflector is transmitted through the first polarization selective reflector.

In some embodiments, the first polarization selective reflector directs the portion of the third light from the first reflector toward a spatial light modulator by reflecting the portion of the third light. In some embodiments, the first polarization selective reflector has a first surface and an opposing second surface, the first reflector faces the first surface, and the second polarization selective reflector faces the second surface.

In some embodiments, the second polarization selective reflector is positioned in a second orientation substantially orthogonal to a plane that perpendicularly intersects an optical axis of the first reflector. In some embodiments, the second polarization selective reflector is configured (e.g., by orienting a polarization axis of the second polarization selective reflector) to reflect light having an identical polarization as light reflected by the first polarization selective reflector. In some embodiments, (e.g., FIG. 14E) the first polarization selective reflector has a first surface and an opposite second surface, both the first reflector and the second polarization selective reflector face the first surface.

In some embodiments, the first polarization selective reflector directs the first light (having the first polarization) toward the second polarization selective reflector by reflecting the first light toward the second polarization selective reflector.

In some embodiments, the portion of the second light directed toward the first polarization selective reflector by the second polarization selective reflector is reflected by the first polarization selective reflector toward the first reflector.

In some embodiments, the first polarization selective reflector directs the portion of the third light from the first reflector toward the spatial light modulator by transmitting the portion of the third light. In some embodiments, the first polarization selective reflector has a first surface and an opposing second surface, and the first surface of the first polarization selective reflector faces both the first reflector and the second polarization selective reflector.

In some embodiments, the first reflector includes structures configured to scatter the portion of the third light directed toward the first polarization selective reflector.

In some embodiments, a first plane defined by (e.g., containing) the first polarization selective reflector intersects, at a first acute angle, with a second plane defined by (e.g., containing) the second polarization selective reflector, and intersects, at a second acute angle, with a third plane defined by (e.g., containing) the first reflector.

In some embodiments, the optical device further includes a first polarization retarder disposed adjacent to the first reflector. In some embodiments, the first reflector defines a first opening so that the first light received by the first polarization selective reflector has passed through the first opening.

In some embodiments, an illumination system includes the optical device, a light source, a homogenizing device configured to condition light from the light source as output light. The illumination system includes a diverting optic positioned to direct the output light into the optical device through the first opening.

In some embodiments, the first polarization retarder defines a second opening aligned with the first opening of the first reflector.

In accordance to some embodiments, a method includes directing, using a first polarization selective reflector, first light toward a second polarization selective reflector. The method includes receiving, using the second polarization selective reflector, the first light and directing at least a portion of the first light toward the first polarization selective reflector as second light. The method includes receiving, using the first polarization selective reflector, the second light and directing at least a portion of the second light toward a first reflector as third light. The method also includes receiving, using the first reflector, the third light and directing at least a portion of the third light toward the first polarization selective reflector as fourth light. The method includes receiving, using the first polarization selective reflector, the fourth light and directing at least a portion of the fourth light to illuminate a spatial light modulator.

In some embodiments, an optical device includes a first polarization selective reflector (e.g., 1414, 1458), a second polarization selective reflector (e.g., 1416, 1456) positioned relative to the first polarization selective reflector so that the first polarization selective reflector directs first light (e.g., 1422, 1464, 1482) impinging on the first polarization selective reflector and having a first polarization toward the second polarization selective reflector and the second polarization selective reflector directs at least a portion of the first light (back) toward the first polarization selective reflector. The optical device includes a first reflector (e.g., 1408) positioned relative to the first polarization selective reflector so that the first polarization selective reflector directs the light received from the second polarization selective reflector toward the first reflector as second light (e.g., 1434, 1465, 1484) and the first reflector directs at least a portion of the second light (back) toward the first polarization selective reflector.

In some embodiments, the first polarization selective reflector is configured to direct the light from the first reflector toward a spatial light modulator.

In some embodiments, the first polarization selective reflector receives first light from a first direction and directs a portion of the first light having a first polarization in a second direction (e.g., the portion of the first light is light 1422 in FIG. 14A, light 1464 in FIG. 14C, and light 1482 in FIG. 14E). In some embodiments, the first direction is collinear with the second direction (e.g., light 1472 in FIG. 14D).

In some embodiments, the first polarization selective reflector receives second light from a third direction and directs a portion of the second light having a second polarization in a fourth direction (e.g., in some embodiments, the second light is light 1434 in FIG. 14A; light 1484 in FIG. 14E; light 1465 in FIG. 14C is an example of "a portion of the second light in a fourth direction"). In some embodiments, the third direction is collinear with the fourth direction (e.g., light 1474 in FIG. 14D is second light in which the third direction is collinear with the fourth direction).

In some embodiments, the optical device includes a second polarization selective reflector positioned in a first orientation non-parallel to the first polarization selective reflector for receiving third light from a fifth direction and directing a portion of the third light having a third polarization in a sixth direction.

In some embodiments, the optical device includes a first reflector positioned in a second orientation non-parallel to the first polarization selective reflector for receiving fourth light from a seventh direction and directing a portion of the fourth light in an eighth direction, the fourth light (e.g., received by the first reflector) having a fourth polarization and the portion of the fourth light (e.g., directed by the first reflector) having a fifth polarization.

In some embodiments, an optical device includes a first polarization selective reflector for receiving first light from a first direction and directing a portion of the first light having a first polarization in a second direction. The first polarization selective reflector receives second light from a third direction and directs a portion of the second light having a second polarization in a fourth direction.

In some embodiments, the optical device includes a second polarization selective reflector positioned in a first orientation non-parallel to the first polarization selective reflector for receiving third light from a fifth direction and directing a portion of the third light having a third polarization in a sixth direction.

In some embodiments, the optical device includes a first reflector positioned in a second orientation non-parallel to the first polarization selective reflector for receiving fourth light from a seventh direction and directing a portion of the fourth light in an eighth direction. The fourth light (e.g., received by the first reflector) has a fourth polarization and the portion of the fourth light (e.g., directed by the first reflector) has a fifth polarization.

In some embodiments, the first reflector defines a first opening so that the first polarization selective reflector receives light that has passed through the first opening. In some embodiments, the optical device further includes a first polarization retarder disposed adjacent to the first reflector. In some embodiments, the first polarization retarder defines a second opening aligned with the first opening of the first reflector.

In some embodiments, the first polarization retarder is configured to: (i) direct the fourth light having the fourth polarization (e.g., LCP) to the first reflector in the seventh direction; (ii) receive, from the first reflector, the portion of the fourth light having the fifth polarization (e.g., RCP), propagating in the eighth direction; and (iii) convert the portion of the fourth light having the fifth polarization, into fifth light having a sixth polarization (e.g., vertically polarized).

In accordance to some embodiments, an illumination system includes the optical device, a spatial light modulator positioned relative to the optical device for receiving the portion of the first light having the first polarization in the second direction from the first polarization selective reflector. The illumination system includes a second reflector positioned relative to the optical device for directing, along the third direction, the second light towards the first polarization selective reflector. The fourth direction is non-parallel to the third direction, and the first polarization is parallel to the second polarization (e.g., FIG. 14 A).

In some embodiments, the second reflector includes a reflective lens stack, and the reflective lens stack includes a second polarization retarder.

In some embodiments, an illumination system includes the optical device, and a spatial light modulator. The second light from the third direction is the fifth light having the sixth polarization. In some embodiments, the spatial light modulator receives the portion of the second light having the second polarization in the fourth direction from the first polarization selective reflector. The first direction is collinear with the second direction and the fifth direction. The portion of the third light in the sixth direction is transmitted through the first polarization selective reflector and is directed by the first polarization retarder, as the fourth light having the fourth polarization, to the first reflector (e.g., FIG. 14D).

In some embodiments, an illumination system includes the optical device and a spatial light modulator. The spatial light modulator receives the fifth light having the sixth polarization from the first polarization retarder. In some embodiments, the second direction is collinear with the fifth direction. The third direction is collinear with the sixth direction. The fourth direction is collinear with the seventh direction, and the first polarization is parallel to the second polarization (FIG. 14E).

In some embodiments, the first polarization selective reflector is disposed on a diagonal of the optical device and a first plane containing the first polarization selective reflector: (i) intersects, at a first acute angle, with a second plane containing the first polarization selective reflector, and (ii) intersects, at a second acute angle, with a third plane containing the first reflector.

In accordance to some embodiments, an optical device includes a first polarization selective reflector; a second polarization selective reflector positioned relative to the first polarization selective reflector so that the first polarization selective reflector directs first light having a first nonplanar polarization (e.g., a circular polarization or an elliptical polarization) toward the second polarization selective reflector and the second polarization selective reflector directs at least a portion of the first light toward the first polarization selective reflector as second light. The optical device also includes a first reflector positioned relative to the first polarization selective reflector so that the first polarization selective reflector directs at least a portion of the second light (received from the second polarization selective reflector) having a second nonplanar polarization toward the first reflector as third light. In some embodiments, the first reflector directs at least a portion of third light toward the first polarization selective reflector (e.g., FIGS. 15A and 15B).

In some embodiments, the first polarization selective reflector or the second polarization selective reflector is a polarization element that includes a metasurface, resonant structures, a chiral layer, or a birefringent material.

In some embodiments, the first reflector directs at least a portion of third light having the first nonplanar polarization toward the first polarization selective reflector, and the first polarization selective reflector is configured to direct the portion of the third light from the first reflector toward a spatial light modulator as illumination light.

In some embodiments, the first polarization selective reflector is a liquid crystal based polarization selective element. In some embodiments, the liquid crystal based polarization selective element includes a polarization volume hologram. In some embodiments, the liquid crystal based polarization selective element includes cholesteric liquid crystals.

In some embodiments, the optical device further includes a first reflective assembly positioned relative to the first polarization selective reflector so that the first polarization selective reflector receives first imaging light from a spatial light modulator and directs at least a portion of the first imaging light having a third nonplanar polarization toward the first reflective assembly as second imaging light. The first reflective assembly receives the second imaging light from the first polarization selective reflector and directs at least a portion of the second imaging light toward the first polarization selective reflector as third imaging light having a fourth nonplanar polarization. The third nonplanar polarization is distinct from the fourth nonplanar polarization.

In some embodiments, the second polarization selective reflector is positioned in a first orientation that is substantially parallel to a plane that perpendicularly intersects an optical axis of the first reflector, and the second polarization selective reflector is configured (e.g., by orienting a polarization axis of the second polarization selective reflector) to reflect light having a polarization different from a polarization of light reflected by the first polarization selective reflector.

In some embodiments, a first plane defined by the first polarization selective reflector intersects, at a first acute angle, with a second plane defined by the second polarization selective reflector, and intersects, at a second acute angle, with a third plane defined by the first reflector.

In some embodiments, the first reflector defines a first opening so that the first light received by the first polarization selective reflector has passed through the first opening.

In some embodiments, an illumination system includes the optical device, a light source; a homogenizing device configured to condition light from the light source as output light; and a diverting optic positioned to direct the output light into the optical device through the first opening.

In accordance to some embodiments, an optical device includes a first polarization selective reflector positioned relative to a spatial light modulator; and a first reflective assembly positioned relative to the first polarization selective reflector so that the first polarization selective reflector receives first light from the spatial light modulator and directs at least a portion of the first light having a first nonplanar polarization toward the first reflective assembly as second light. The first reflective assembly receives the second light from the first polarization selective reflector and directs at least a portion of the second light having a second nonplanar polarization toward the first polarization selective reflector as third light. The second nonplanar polarization is distinct from the first nonplanar polarization.

In some embodiments, the first polarization selective reflector is a polarization element that includes a metasurface, resonant structures, a chiral layer, or a birefringent material.

In some embodiments, the first polarization selective reflector is a liquid crystal based polarization selective element. In some embodiments, the optical device further includes a first reflector. In some embodiments, the first reflector defines an opening. The first reflector is positioned relative to the spatial light modulator so that the spatial light modulator receives light that has (i) passed through the opening of the first reflector and (ii) subsequently reflected off the first reflector.

In some embodiments, the optical device further includes a second polarization selective reflector disposed adjacent to a waveguide. The second polarization selective reflector is configured to reflect light having a polarization different from a polarization of light reflected by the first polarization selective reflector.

In some embodiments, the optical device further includes a second polarization selective reflector disposed adjacent to a waveguide. The second polarization selective reflector is configured (e.g., by orienting a polarization axis of the second polarization selective reflector) to reflect light having a polarization identical to a polarization of light reflected by the first polarization selective reflector.

In some embodiments, a projection of the first polarization selective reflector on a plane defined by the spatial light modulator has a rectangular shape.

In accordance with some embodiments, an optical device includes a first polarization selective reflector positioned in a first orientation so that the first polarization selective reflector receives first light in a first direction; redirects a first portion, of the first light, having a first nonplanar polarization to a second direction that is non-parallel to the first direction. The first polarization selective reflector receives second light in a third direction and transmit a first portion, of the second light, having a second nonplanar polarization orthogonal to the first nonplanar polarization. The optical device includes a second polarization selective reflector positioned in a second orientation non-parallel to the first orientation so that the second polarization selective reflector receives third light in a fourth direction; redirects a first portion, of the third light, having the first nonplanar polarization to a fifth direction that is non-parallel to the fourth direction; and receives fourth light in a sixth direction and transmit a first portion, of the fourth light having the second nonplanar polarization. In some embodiments, the first orientation is adjacent to the first polarization selective reflector.

In some embodiments, the optical device further includes a third reflector configured to receive from the second polarization selective reflector a second portion of the first light transmitted by the first polarization selective reflector, and redirect the second portion of the first light back to the second polarization selective reflector as the second light.

In some embodiments, the optical device further includes a Fresnel reflector optically coupled with the first polarization selective reflector, the Fresnel reflector configured to receive the first light output by a first light source; and redirect the first light toward the first polarization selective reflector.

In accordance to some embodiments, an optical device includes a first polarization selective reflector; and a second polarization selective reflector positioned relative to the first polarization selective reflector so that the first polarization selective reflector directs first light having a first polarization toward the second polarization selective reflector and the second polarization selective reflector directs second light having a second polarization toward the first polarization selective reflector. A first plane defined by the first polarization selective reflector intersects a second plane defined by the second polarization selective reflector at a first angle (FIGS. 4A-10B).

In some embodiments, the second light is a portion of the first light.

In some embodiments, the first angle is an acute angle, and the first angle is measured from a portion of the first plane that directs the first light to a portion of the second plane that directs the second light. In some embodiments, the first angle is approximately 45°.

In some embodiments, the optical device further comprises a prism assembly. The first polarization selective reflector is disposed along a diagonal of the prism assembly. In some embodiments, the diagonal is an inner diagonal of the prism assembly.

In some embodiments, the first polarization selective reflector is configured (e.g., by orienting a polarization axis of the first polarization selective reflector) to reflect light having a polarization different from a polarization of light reflected by the second polarization selective reflector.

In some embodiments, the optical device further includes a first prism, the second polarization selective reflector is disposed on a first surface of the first prism, and light enters the optical device at a second surface parallel to the first surface.

In some embodiments, the first polarization selective reflector is configured (e.g., by orienting a polarization axis of the first polarization selective reflector) to reflect light having a polarization identical to a polarization of light reflected by the second polarization selective reflector.

In some embodiments, the optical device further includes a first prism. The second polarization selective reflector is disposed on a first surface of the first prism, and light enters the first prism at a second surface perpendicular to the first surface.

In some embodiments, a projection of the first polarization selective reflector on a plane defined by a spatial light modulator is rectangular. In some embodiments, the first polarization selective reflector is positioned relative to a spatial light modulator to direct third light having a third polarization, distinct from the first polarization, along a first direction to the spatial light modulator and the second polarization selective reflector is positioned relative to the first polarization selective reflector to direct fourth light having the third polarization along the first direction to the spatial light modulator.

In some embodiments, a projection of the first polarization selective reflector on a plane defined by a spatial light modulator has a first width. In some embodiments, a height of the first polarization selective reflector is larger than the first width, and the height is orthogonal to the first width.

In some embodiments, the first angle is approximately 90 degrees. In some embodiments, the angle is more or less than 90 degrees.

In some embodiments, the optical device further includes a first prism. The first polarization selective reflector is disposed on a first surface of the first prism and the second polarization selective reflector is disposed on a second surface of the first prism.

In some embodiments, the optical device further includes a second prism; and a third prism. The second prism is in contact with the second polarization selective reflector, and the third prism is in contact with the first polarization selective reflector.

In some embodiments, the first polarization selective reflector is configured to direct first light having a first nonplanar polarization (e.g., a circular polarization or an elliptical polarization) toward the second polarization selective reflector and the second polarization selective reflector is configured to direct second light having a second nonplanar polarization toward the first polarization selective reflector.

In some embodiments, the first polarization selective reflector is configured to direct first light having a first nonplanar polarization (e.g., a circular polarization or an elliptical polarization) toward the second polarization selective reflector and the second polarization selective reflector is configured to direct second light having a second nonplanar polarization toward the first polarization selective reflector.

In some embodiments, at least one of the first polarization selective reflector or the second polarization selective reflector is either (i) a liquid crystal based polarization selective element, or (ii) a polarization selective element that includes a metasurface, resonant structures, a chiral layer, or a birefringent material.

In some embodiments, the first angle is an acute angle, the first angle is measured from a portion of the first plane that directs the first light to a portion of the second plane that directs the second light, and the first polarization selective reflector is disposed along a diagonal of the optical device.

In accordance to some embodiments, a method includes coupling a first polarization selective reflector to a second polarization selective reflector so that a first plane defined by the first polarization selective reflector intersects, at a first angle, a second plane defined by the second polarization selective reflector so that the first polarization selective reflector is configured to direct first light having a first polarization toward the second polarization selective reflector and the second polarization selective reflector is configured to direct second light having a second polarization toward the first polarization selective reflector.

In some embodiments, coupling the first polarization selective reflector to the second polarization selective reflector includes disposing the second polarization selective reflector on a first surface of a prism and disposing the second polarization selective reflector on a second surface of the prism. In some embodiments, the first angle is approximately 90 degrees; and the first polarization is identical to the second polarization. In some embodiments, the angle is more or less than 90 degrees.

In some embodiments, coupling the first polarization selective reflector to the second polarization selective reflector includes disposing the first polarization selective reflector on a first surface of a first prism and disposing the second polarization selective reflector on a second surface of the first prism. The first angle is an acute angle; and the method also includes attaching a second prism to the first surface of the first prism so that the first polarization selective reflector is disposed along a diagonal of a prism assembly that includes the first prism and the second prism.

In some embodiments, the first polarization selective reflector includes an element selected from the group consisting of a wire grid polarizer, a MacNeille polarizer, a liquid crystal based polarization selective element, and a polarization element that includes a metasurface, resonant structures, or a chiral layer.

In accordance with some embodiments, a method includes coupling a first polarization selective reflector to a second polarization selective reflector by disposing the first polarization selective reflector on a first surface of a first prism and disposing the second polarization selective reflector on a second surface of the first prism. The method also includes attaching a second prism to the first surface of the first prism so that the first polarization selective reflector is disposed along a diagonal of a prism assembly that includes the first prism and the second prism.

In some embodiments, coupling the first polarization selective reflector to the second polarization selective reflector includes disposing the second polarization selective reflector on a first surface of a prism and disposing the second polarization selective reflector on a second surface of the prism.

In some embodiments, the first polarization selective reflector includes a wire grid polarizer. In some embodiments, the first polarization selective reflector includes a MacNeille polarizer. In some embodiments, the first polarization selective reflector includes a liquid crystal based polarization selective element. In some embodiments, a polarization element includes metasurface, resonant structures, or a chiral layer.

In accordance with some embodiments, an optical device includes a first polarization selective reflector, a second polarization selective reflector positioned relative to the first polarization selective reflector so that the first polarization selective reflector directs light impinging on the first polarization selective reflector and having a first polarization toward the second polarization selective reflector and the second polarization selective reflector directs at least a portion of the light (back) toward the first polarization selective reflector. The optical device includes a first reflector positioned relative to the first polarization selective reflector so that the first polarization selective reflector directs the light received from the second polarization selective reflector toward the first reflector as second light and the first reflector directs at least a portion of the second light (back) toward the first polarization selective reflector.

In some embodiments, the first polarization selective reflector is configured to direct the light from the first reflector toward a spatial light modulator.

In accordance with some embodiments, an optical device includes a first polarization selective reflector for receiving first light from a first direction and directing a portion of the first light having a first polarization in a second direction. The first polarization selective reflector receives second light from a third direction and directs a portion of the second light having a second polarization in a fourth direction.

In some embodiments, the optical device includes a second polarization selective reflector positioned in a first orientation non-parallel to the first polarization selective reflector for receiving third light from a fifth direction and directing a portion of the third light having a third polarization in a sixth direction.

In some embodiments, the optical device includes a first reflector positioned in a second orientation non-parallel to the first polarization selective reflector for receiving fourth light from a seventh direction and directing a portion of the fourth light in an eighth direction. The fourth light (e.g., received by the first reflector) has a fourth polarization and the portion of the fourth light (e.g., directed by the first reflector) has a fifth polarization.

In some embodiments, the first reflector defines a first opening so that the first polarization selective reflector receives light that has passed through the first opening.

In some embodiments, the optical device further includes a first polarization retarder disposed adjacent to the first reflector. In some embodiments, the first polarization retarder defines a second opening aligned with the first opening of the first reflector.

In some embodiments, the first polarization retarder is configured to: (i) direct the fourth light having the fourth polarization (e.g., LCP) to the first reflector in the seventh direction; (ii) receive, from the first reflector, the portion of the fourth light having the fifth polarization (e.g., RCP), propagating in the eighth direction; and (iii) convert the portion of the fourth light having the fifth polarization, into fifth light having a sixth polarization (e.g., vertically polarized).

In accordance with some embodiments, an illumination system includes the optical device, a spatial light modulator positioned relative to the optical device for receiving the portion of the first light having the first polarization in the second direction from the first polarization selective reflector. The illumination system includes a second reflector positioned relative to the optical device for directing, along the third direction, the second light towards the first polarization selective reflector. The fourth direction is non-parallel to the third direction, and the first polarization is parallel to the second polarization (e.g., FIG. 14A).

In some embodiments, the second reflector includes a reflective lens stack, and the reflective lens stack includes a second polarization retarder.

In accordance with some embodiments, an illumination system includes the optical device, and a spatial light modulator. The second light from the third direction is the fifth light having the sixth polarization. In some embodiments, the spatial light modulator receives the portion of the second light having the second polarization in the fourth direction from the first polarization selective reflector. The first direction is collinear with the second direction and the fifth direction. The portion of the third light in the sixth direction is transmitted through the first polarization selective reflector and is directed by the first polarization retarder, as the fourth light having the fourth polarization, to the first reflector (e.g., FIG. 14D).

In accordance with some embodiments, an illumination system includes the optical device and a spatial light modulator. The spatial light modulator receives the fifth light having the sixth polarization from the first polarization retarder. In some embodiments, the second direction is collinear with the fifth direction. The third direction is collinear with the sixth direction. The fourth direction is collinear with the seventh direction, and the first polarization is parallel to the second polarization (FIG. 14E).

In some embodiments, the first polarization selective reflector is disposed on a diagonal of the optical device and a first plane containing the first polarization selective reflector: (i) intersects, at a first acute angle, with a second plane containing the first polarization selective reflector, and (ii) intersects, at a second acute angle, with a third plane containing the first reflector.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. An optical device, comprising:
a first polarization selective reflector positioned in a first orientation to:
receive first light in a first direction;
redirect a first portion, of the first light, having a first polarization to a second direction that is non-parallel to the first direction; and
receive second light in a third direction and transmits at least a first portion, of the second light, having a second polarization orthogonal to the first polarization;
a second polarization selective reflector positioned in a second orientation non-parallel to the first orientation to:
receive third light in a fourth direction;
redirect a first portion, of the third light, having the first polarization to a fifth direction that is non-parallel to the fourth direction; and
receive fourth light in a sixth direction and transmits at least a first portion of the fourth light having the second polarization;
a third reflector positioned to receive from the second polarization selective reflector a second portion of the first light having the second polarization, transmitted by the first polarization selective reflector and the second polarization selective reflector, and redirect the second portion of the first light back to the second polarization selective reflector as the third light; and
a reflective spatial light modulator positioned to:
receive, on a first region of the reflective spatial light modulator, the first portion of the first light from the first polarization selective reflector and reflect at least a portion of the first portion of the first light as the second light in the third direction toward the first polarization selective reflector; and
receive, on a second region adjacent to the first region of the reflective spatial light modulator, the first portion of the third light from the second polarization selective reflector and reflect at least a portion of the first portion of the third light as the fourth light in the sixth direction toward the second polarization selective reflector.

2. The optical device of claim 1, wherein:
the first polarization selective reflector is configured to transmit the second portion, of the first light, having the second polarization toward the second polarization selective reflector; and
the second polarization selective reflector is configured to receive, and transmit, the second portion of the first light having the second polarization toward the third reflector.

3. The optical device of claim 1, wherein:
the reflective spatial light modulator includes a reflective surface and a plurality of pixels, a respective pixel in the plurality of pixels having respective modulating elements; and
reflecting the first portion of the first light as the second light and reflecting the first portion of the third light as the fourth light includes modulating, by the respective modulating elements, polarization of the first portion of the first light and the first portion of the third light.

4. The optical device of claim 1, wherein the reflective spatial light modulator includes a Liquid Crystal on Silicon (LCoS) display.

5. The optical device of claim 1, further comprising a waveplate disposed between the third reflector and the second polarization selective reflector.

6. The optical device of claim 1, further comprising:
a light source configured to output light having the first polarization.

7. The optical device of claim 6, further comprising a Fresnel reflector optically coupled with the first polarization selective reflector, the Fresnel reflector configured to:
receive the light output by the light source; and
redirect the light toward the first polarization selective reflector as the first light.

8. The optical device of claim 6, further comprising a collimating lens for collimating the light from the light source.

9. The optical device of claim 1, wherein:
the first polarization selective reflector is configured to reflect a second portion, of the second light, having the first polarization in a seventh direction distinct from the third direction; and
the second polarization selective reflector is configured to reflect a second portion, of the fourth light, having the first polarization, in an eighth direction distinct from the sixth direction.

10. An optical device, comprising:
a first reflector;
a first polarization selective reflector; and
a second polarization selective reflector, wherein:
the first polarization selective reflector is positioned between the first reflector and the second polarization selective reflector and is oriented non-parallelly to the first reflector and the second polarization selective reflector;
the second polarization selective reflector is positioned to receive first light from the first polarization selective reflector and redirect at least a portion of the first light toward the first polarization selective reflector as second light; and
the first reflector is positioned to receive at least a portion of the second light from the first polarization selective reflector and redirect the at least a portion of the second light toward the first polarization selective reflector,
wherein the first light has a first nonplanar polarization and the at least a portion of the second light redirected toward the first polarization selective reflector includes a second nonplanar polarization that is distinct from the first nonplanar polarization.

11. The optical device of claim 10, wherein the first polarization selective reflector is a liquid crystal based polarization selective element.

12. The optical device of claim 11, wherein the liquid crystal based polarization selective element comprises a polarization volume hologram.

13. The optical device of claim 11, wherein the liquid crystal based polarization selective element comprises cholesteric liquid crystals.

14. The optical device of claim 10, further comprising:
a first reflective assembly positioned relative to the first polarization selective reflector so that the first polarization selective reflector receives first imaging light from a spatial light modulator and directs at least a portion of the first imaging light having a third nonplanar polarization toward the first reflective assembly as second imaging light, and the first reflective assembly receives the second imaging light from the first polarization selective reflector and directs at least a portion of the second imaging light toward the first polarization selective reflector as third imaging light having a fourth nonplanar polarization, wherein the third nonplanar polarization is distinct from the fourth nonplanar polarization.

15. The optical device of claim 10, wherein the second polarization selective reflector is positioned in a first orientation that is substantially parallel to a plane that perpendicularly intersects an optical axis of the first reflector, and the second polarization selective reflector is configured to reflect light having a polarization different from a polarization of light reflected by the first polarization selective reflector.

16. The optical device of claim 10, wherein a first plane defined by the first polarization selective reflector intersects, at a first acute angle, with a second plane defined by the second polarization selective reflector, and intersects, at a second acute angle, with a third plane defined by the first reflector.

17. An optical device, comprising:
a first reflector;
a first polarization selective reflector; and
a second polarization selective reflector, wherein:
the first polarization selective reflector is positioned between the first reflector and the second polarization selective reflector and is oriented non-parallelly to the first reflector and the second polarization selective reflector;
the second polarization selective reflector is positioned to receive first light from the first polarization selective reflector and redirect at least a portion of the first light toward the first polarization selective reflector as second light; and
the first reflector is positioned to receive at least a portion of the second light from the first polarization selective reflector and redirect the at least a portion of the second light toward the first polarization selective reflector,
wherein the first reflector defines a first opening so that the first light received by the first polarization selective reflector has passed through the first opening.

18. An illumination system, comprising:
the optical device of claim 11;
a light source;
a homogenizing device configured to condition light from the light source as output light; and
a diverting optic positioned to direct the output light into the optical device through a first opening defined in the first reflector.

* * * * *